United States Patent
Matsuda

(10) Patent No.: US 12,380,638 B2
(45) Date of Patent: Aug. 5, 2025

(54) NON-TRANSITORY STORAGE MEDIUM STORING THEREON OPTICAL ABERRATION CORRECTION PROGRAM AND NON-TRANSITORY STORAGE MEDIUM STORING THEREON OPTICAL WAVEFRONT ESTIMATION

(71) Applicant: NATIONAL INSTITUTE OF INFORMATION AND COMMUNICATIONS TECHNOLOGY, Tokyo (JP)

(72) Inventor: Atsushi Matsuda, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 133 days.

(21) Appl. No.: 18/015,449

(22) PCT Filed: Jul. 13, 2021

(86) PCT No.: PCT/JP2021/026265
§ 371 (c)(1),
(2) Date: Jan. 10, 2023

(87) PCT Pub. No.: WO2022/014579
PCT Pub. Date: Jan. 20, 2022

(65) Prior Publication Data
US 2023/0281922 A1    Sep. 7, 2023

(30) Foreign Application Priority Data
Jul. 14, 2020    (JP) .................... 2020-120496

(51) Int. Cl.
*G06T 17/00* (2006.01)
*G02B 21/06* (2006.01)
*G02B 21/36* (2006.01)

(52) U.S. Cl.
CPC .............. *G06T 17/00* (2013.01); *G02B 21/06* (2013.01); *G02B 21/36* (2013.01); *G02B 2207/113* (2013.01)

(58) Field of Classification Search
CPC . G06T 17/00; G06T 5/73; G06T 2207/10056; G02B 21/36; G02B 27/0025; G02B 21/06; G02B 2207/113
See application file for complete search history.

(56) References Cited

U.S. PATENT DOCUMENTS 6,658,142 B1    12/2003    Kam et al.
9,500,846 B2    11/2016    Betzig et al.
(Continued)

FOREIGN PATENT DOCUMENTS

JP    2002-531840 A    9/2002
JP    2006-504114 A    2/2006
(Continued)

OTHER PUBLICATIONS

Zhang et al., "Super-resolution algorithm based on Richardson Lucy deconvolution for three-dimensional structured illumination microscopy", Journal of the Optical Society of America A, vol. 36, No. 2, Feb. 2019, pp. 173-178.
(Continued)

*Primary Examiner* — Phi Hoang
(74) *Attorney, Agent, or Firm* — Morgan, Lewis & Bockius LLP

(57) ABSTRACT

The present disclosure provides an optical aberration correction program causing a computer to execute, and a method of use thereof.

10 Claims, 30 Drawing Sheets

(56) References Cited

U.S. PATENT DOCUMENTS

| | | | |
|---|---|---|---|
| 2005/0062759 | A1 | 3/2005 | Ganser et al. |
| 2005/0083517 | A1* | 4/2005 | Asad ............... G02B 21/365 356/124 |
| 2006/0203231 | A1 | 9/2006 | Uto et al. |
| 2009/0079973 | A1 | 3/2009 | Uto et al. |
| 2011/0142310 | A1* | 6/2011 | Dowski, Jr. ....... G02B 27/0025 382/128 |
| 2013/0010158 | A1* | 1/2013 | Watanabe ............. H04N 23/81 348/231.6 |
| 2013/0293761 | A1* | 11/2013 | Guenter ............. H04N 23/661 348/E5.045 |
| 2014/0050382 | A1 | 2/2014 | Adie et al. |
| 2014/0168035 | A1* | 6/2014 | Luebke ............... G02B 27/017 345/8 |
| 2015/0226950 | A1 | 8/2015 | Booth et al. |
| 2016/0209646 | A1 | 7/2016 | Hattori et al. |
| 2016/0266366 | A1 | 9/2016 | Chung et al. |
| 2018/0061019 | A1* | 3/2018 | Wachi ................... H04N 25/61 |
| 2020/0105498 | A1 | 4/2020 | Harada et al. |
| 2020/0278257 | A1 | 9/2020 | Berlatzky |
| 2021/0161385 | A1* | 6/2021 | Ben-Yakar ............. G02B 21/10 |

FOREIGN PATENT DOCUMENTS

| | | |
|---|---|---|
| JP | 2006-250739 A | 9/2006 |
| JP | 2015-531072 A | 10/2015 |
| JP | 6127818 B2 | 5/2017 |
| JP | 2018-509622 A | 4/2018 |
| JP | 6394850 B2 | 9/2018 |
| JP | 2018-190550 A | 11/2018 |
| JP | 6524373 B1 | 5/2019 |
| JP | 2019-204002 A | 11/2019 |
| JP | 2020-515831 A | 5/2020 |
| WO | 2014/029978 A1 | 2/2014 |

OTHER PUBLICATIONS

McNally, "Computational optical-sectioning microscopy for 3D quantification of cell motion: results and challenges", SPIE, Image Reconstruction and Restoration, vol. 2302, 1994, pp. 342-351, XP-001118842.

Extended European Search Report issued in corresponding European Patent Application No. 21841209.6, dated May 29, 2024.

International Search Report (with partial translation) and Written Opinion dated Sep. 28, 2021, for corresponding International Patent Application No. PCT/JP2021/026265.

Markham et al., "Parametric blind deconvolution: a robust method for the simultaneous estimation of image and plur," Journal of the Optical Society of America A, vol. 16, No. 10: p. 2377-2391 (1999).

Hanser et al., "Phase-retrieved pupil functions in wide-field fluorescence microscopy," Journal of Microscopy, vol. 216, Part 1: p. 32-48 (2004).

Gibson et al., "Experimental test of an analytical model of aberration in an oil-immersion objective lens used in three-dimensional light microscopy," Journal of the Optical Society of America A, vol. 8, No. 10: p. 1601-1613 (1991).

Li et al., "Fast and accurate three-dimensional point spread function computation for fluorescence microscopy," Journal of the Optical Society of America A, vol. 34, No. 6: p. 1029-1034 (2017).

Wang et al., "Rapid adaptive optical recovery of optimal resolution over large volumes," Nature Methods, vol. 11: p. 625-628 (2014) and supplementary material.

Antonello et al., "Adaptive Optical Microscopy Using Image-Based Wavefront Sensing," in Wavefront Shaping for Biomedical Imaging, Advances in Microscopy and Microanalysis, Kubby ed.: p. 3-21 (2019).

Kam et al., "Computational adaptive optics for live three-dimensional biological imaging," Proceedings of the National Academy of Sciences of the United States of America, vol. 98, No. 7: p. 3790-3795 (2001).

Shemonski et al., "Computational Adaptive Optics for Broadband Optical Interferometric Tomography of Biological Tissue," in Wavefront Shaping for Biomedical Imaging, Advances in Microscopy and Microanalysis, Kubby ed: p. 404-422 (2019).

Kim et al., "Blind Deconvolution of 3D Fluorescence Microscopy Using Depth-Variant Asymmetric PSF," Microscopy Research and Technique, vol. 79, No. 6: p. 480-494 (2016).

Soulez et al., "Blind deconvolution of 3D data in wide field fluorescence microscopy," 2012 9th IEEE International Symposium on Biomedical Imaging: p. 1735-1738 (2012).

* cited by examiner

NON-TRANSITORY STORAGE MEDIUM STORING THEREON OPTICAL ABERRATION CORRECTION PROGRAM AND NON-TRANSITORY STORAGE MEDIUM STORING THEREON OPTICAL WAVEFRONT ESTIMATION

TECHNICAL FIELD

The present disclosure relates to an optical aberration correction program and an optical wavefront estimation program.

BACKGROUND ART

A three-dimensional original image of a sample containing a three-dimensional object such as a cell is acquired using a microscope. The three-dimensional original image of the sample is a multilayer body (stack image) of a plurality of two-dimensional original images of the sample obtained while moving a focal plane of an observation optical system of the microscope along an optical axis direction of the observation optical system. The plurality of two-dimensional original images include an image of light in the focal plane and an image of light outside the focal plane due to optical aberration of the observation optical system. The light outside the focal plane blurs an original image and reduces contrast of the original image.

In general, the stack image of the sample is given by convolution integration of a luminance distribution of the sample and a point spread function (PSF) of the observation optical system. NPL 1 discloses a parametric blind deconvolution method in which the luminance distribution of the sample and the PSF of the observation optical system are alternately, sequentially, and iteratively calculated using a computer and the stack image of the sample is corrected while the luminance distribution of the sample and the PSF of the observation optical system are alternately, sequentially, iteratively estimated using maximum likelihood estimation.

CITATION LIST

Non Patent Literature

NPL 1: J. Markham and J. A. Conchello, Parametric blind deconvolution: a robust method for the simultaneous estimation of image and blur, Journal of the Optical Society of America A, October 1999, Vol. 16, No. 10, p. 2377-2391

SUMMARY OF INVENTION

Technical Problem

However, in the parametric blind deconvolution method of NPL 1, the luminance distribution of the sample and the PSF of the observation optical system are alternately, sequentially, and iteratively calculated, and the luminance distribution of the sample and the PSF of the observation optical system are alternately, sequentially, and iteratively estimated. Therefore, in order to calculate a three-dimensional correction image in which the optical aberration of the observation optical system is removed or reduced, a very large number of calculation times is required to be performed. It takes a lot of time to calculate the three-dimensional correction image of the sample.

The present disclosure has been made in view of the above problems, and an object of a first aspect of the present disclosure is to provide an optical aberration correction program capable of calculating the three-dimensional correction image in which the optical aberration of the optical system is removed or reduced in a shorter time. An object of a second aspect of the present disclosure is to provide an optical wavefront estimation program capable of estimating an optical wavefront suffering from the optical aberration of the optical system in a shorter time.

Solution to Problem

An optical aberration correction program according to the present disclosure causes the computer to execute: obtaining phases of a plurality of provisional optical transfer functions of an optical system corresponding to a plurality of provisional optical aberration amounts of the optical system; generating a plurality of three-dimensional phase-modulated images by deconvolving a three-dimensional original image of a sample including an optical aberration of the optical system with each of the phases of the plurality of provisional optical transfer functions; obtaining an optimal theoretical three-dimensional point spread function that is most approximate to a three-dimensional point spread function of the optical system based on indices of luminance values of the plurality of three-dimensional phase-modulated images; calculating an optimal optical transfer function of the optical system corresponding to the optimal theoretical three-dimensional point spread function; and calculating a three-dimensional correction image by deconvolving the three-dimensional original image or another three-dimensional original image that includes the optical aberration of the optical system and is different from the three-dimensional original image with the optimal optical transfer function.

An optical wavefront estimation program according to the present disclosure causes the computer to execute: obtaining phases of a plurality of provisional optical transfer functions of an optical system corresponding to a plurality of provisional optical aberration amounts of the optical system; generating a plurality of three-dimensional phase-modulated images by deconvolving a three-dimensional original image of a sample including an optical aberration of the optical system with each of the phases of the plurality of provisional optical transfer functions; determining an optimal theoretical three-dimensional point spread function that is most approximate to a three-dimensional point spread function of the optical system based on indices of luminance values of the plurality of three-dimensional phase-modulated images; and calculating an optimal optical wavefront corresponding to the optimal theoretical three-dimensional point spread function.

Advantageous Effects of Invention

According to the optical aberration correction program of the present disclosure, the three-dimensional correction image in which the optical aberration of the optical system is removed or reduced can be calculated in a shorter time. According to the optical wavefront estimation program of the present disclosure, the optical wavefront suffering from the optical aberration of the optical system can be estimated in a shorter time.

DESCRIPTION OF EMBODIMENTS

Figure 1:
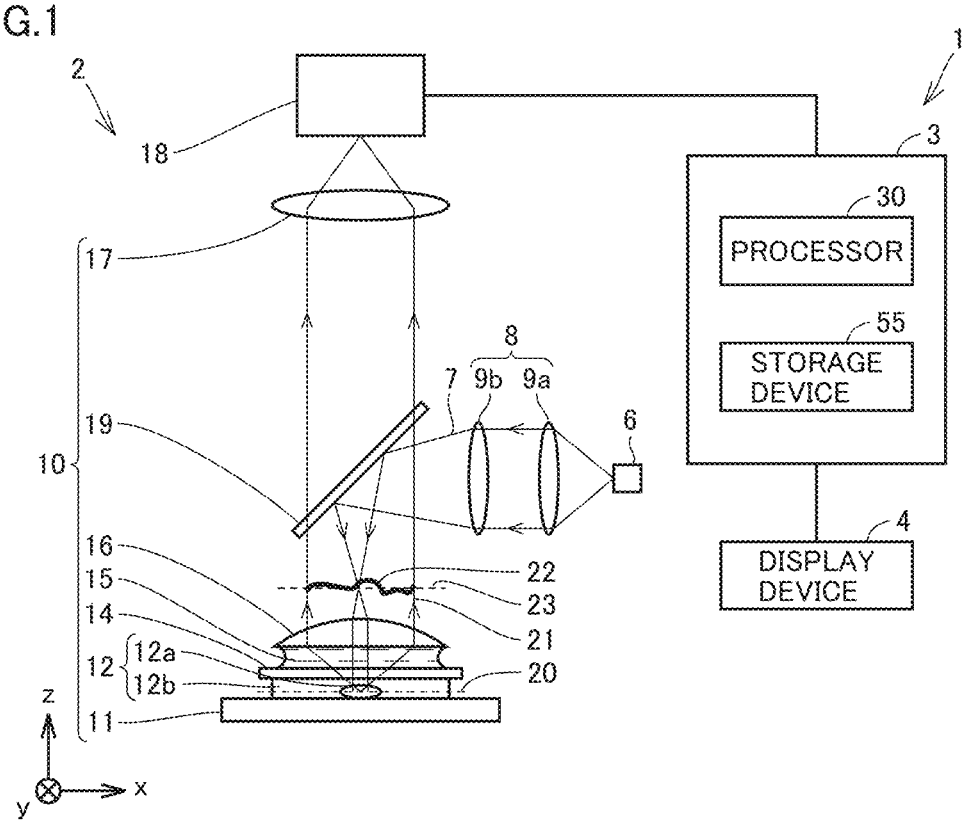
FIG. 1 is a schematic view illustrating a microscope system according to first, second, and fourth embodiments.

Hereinafter, embodiments will be described. The same components are denoted by the same reference numerals, and a repetitive description will be omitted.

First Embodiment

With reference to FIGS. 1 to 9, a microscope system 1 according to a first embodiment will be described. As illustrated in FIG. 1, microscope system 1 includes a microscope 2, a computer 3, and a display device 4. Microscope 2 is a microscope capable of obtaining a three-dimensional original image 28 (see FIG. 4) of a sample 12 (three-dimensional object 12a). In the first embodiment, microscope 2 is a fluorescence microscope. Microscope 2 may be a scanning microscope including a confocal microscope, a two-photon microscope, or a super-resolution microscope such as an Airyscan microscope.

Figure 2:
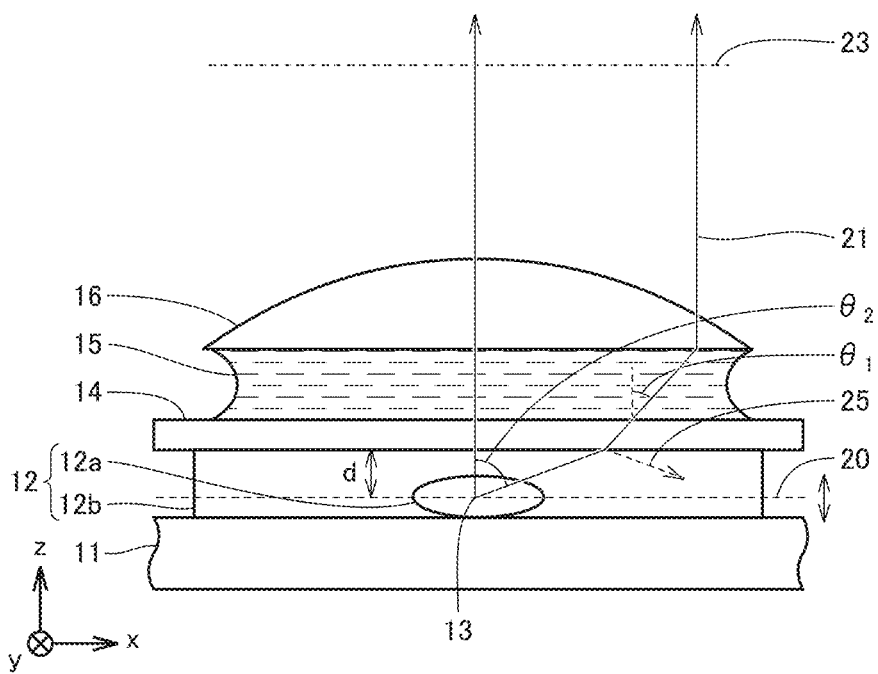
FIG. 2 is a partially enlarged sectional view illustrating the microscope of the first and second embodiments.

As illustrated in FIGS. 1 and 2, microscope 2 includes an illumination optical system 8, a sample support stage 11, an observation optical system 10, and an imaging device 18. Microscope 2 may further include a light source 6.

Sample support stage 11 supports sample 12. Sample 12 includes a three-dimensional object 12a and a surrounding medium 12b surrounding three-dimensional object 12a. Three-dimensional object 12a is a target to be observed using microscope 2. Three-dimensional object 12a is not particularly limited, but is a living cell, a molecule, a protein, or DNA. For example, three-dimensional object 12a is labeled with a fluorescent material. For example, surrounding medium 12b is a culture solution or a gel.

Sample 12 is covered with a cover glass 14. An immersion medium 15 exists between cover glass 14 and an objective lens 16. Immersion medium 15 has a refractive index larger than that of air having a refractive index of 1.00, and improves resolution of microscope 2. For example, immersion medium 15 is water, glycerin, or oil.

Light source 6 outputs illumination light 7. For example, light source 6 is a mercury lamp, a xenon lamp, or a light emitting diode (LED). Illumination light 7 can be absorbed by the fluorescent material labeling three-dimensional object 12a to excite the fluorescent material. Illumination light 7 illuminates sample 12 through illumination optical system 8. For example, illumination optical system 8 includes a lens 9a and a lens 9b. Illumination light 7 is collimated by lens 9a. Illumination light 7 passes through lens 9b and is reflected by a dichroic mirror 19. Dichroic mirror 19 reflects illumination light 7 and transmits light 21 (for example, fluorescence) from sample 12 (three-dimensional object 12a). Lens 9b condenses illumination light 7 on a pupil plane 23 (back focal plane) of objective lens 16. Illumination light 7 is collimated by objective lens 16 to irradiate sample 12 including three-dimensional object 12a.

When three-dimensional object 12a is irradiated with illumination light 7, light 21 is emitted from sample 12 (three-dimensional object 12a). For example, the fluorescent material labeled on three-dimensional object 12a is excited by the illumination light to emit light 21. For example, light 21 is incoherent light such as fluorescence. Light 21 is imaged on an imaging surface of imaging device 18 through observation optical system 10. For example, imaging device 18 is a CCD camera or a CMOS image sensor.

Observation optical system 10 includes objective lens 16, an imaging lens 17, and dichroic mirror 19. Specifically, observation optical system 10 includes sample 12, cover glass 14, immersion medium 15, objective lens 16, imaging lens 17, and dichroic mirror 19. In the present specification, an optical axis of observation optical system 10 may be referred to as a z-axis. An optical axis direction of observation optical system 10 may be referred to as a z-axis direction. Two axes perpendicular to the optical axis of observation optical system 10 and perpendicular to each other may be referred to as an x-axis and a y-axis. Two directions perpendicular to the optical axis direction (z-axis direction) of observation optical system 10 and perpendicular to each other may be referred to as an x-axis direction and a y-axis direction.

Figure 3:
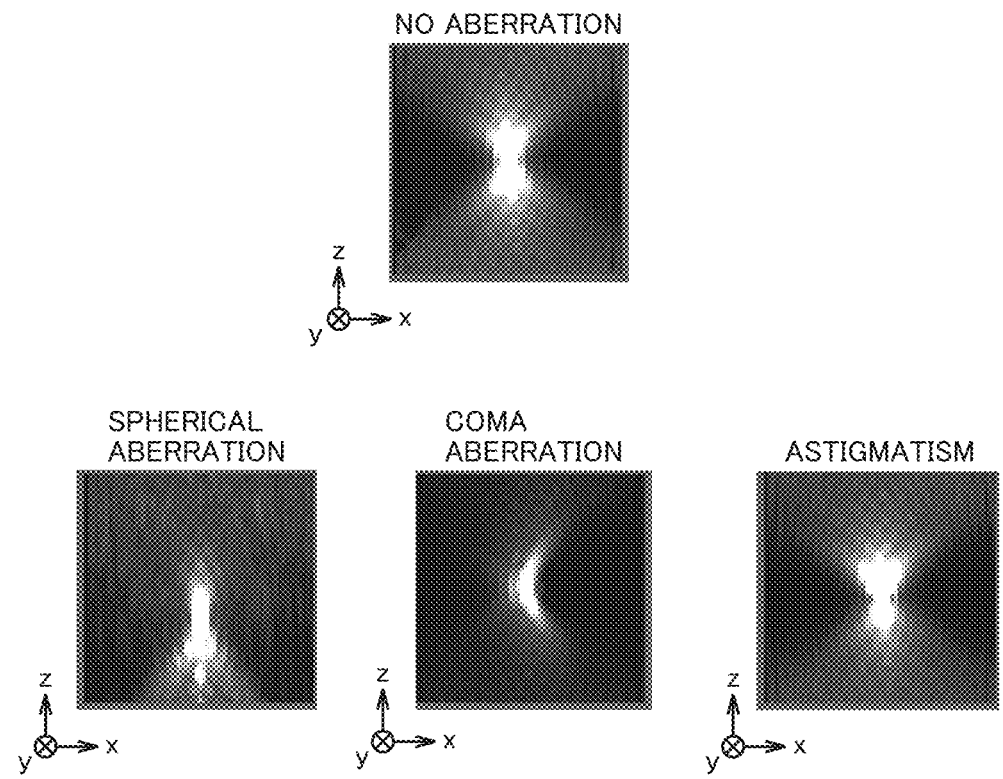
FIG. 3 is a view illustrating an example of disturbance in an image of a bright spot caused by optical aberration.

Due to variations in the thickness of objective lens 16, imperfections in the surface shape of objective lens 16, variations in the refractive index of objective lens 16 or sample 12, and the like, observation optical system 10 includes optical aberrations such as a spherical aberration, a coma aberration, or astigmatism. Due to the optical aberration of observation optical system 10, the original image obtained by microscope 2 is disturbed as illustrated in FIG. 3, and an optical wavefront 22 (see FIG. 1) of light 21 emitted from sample 12 is distorted. In the present specification, the original image means an image (in other words, an image in which the optical aberration of the optical system (for example, observation optical system 10) is not corrected) including the optical aberration of the optical system (for example, observation optical system 10). In the present specification, optical wavefront 22 means a wavefront of light 21 at pupil plane 23 (back focal plane) of objective lens 16. Optical wavefront 22 is a collection of points at which all the light beams constituting optical wavefront 22 have the same phase.

One of sample support stage 11 and objective lens 16 is movable in the optical axis direction (z-axis direction) of observation optical system 10 with respect to the other of sample support stage 11 and objective lens 16. For example, at least one of sample support stage 11 or objective lens 16 is connected to a piezo element or a motor (not illustrated). Using the piezoelectric element or the motor, one of sample support stage 11 and objective lens 16 is moved in the optical axis direction (z-axis direction) of observation optical system 10 with respect to the other of sample support stage 11 and objective lens 16.

Figure 4:
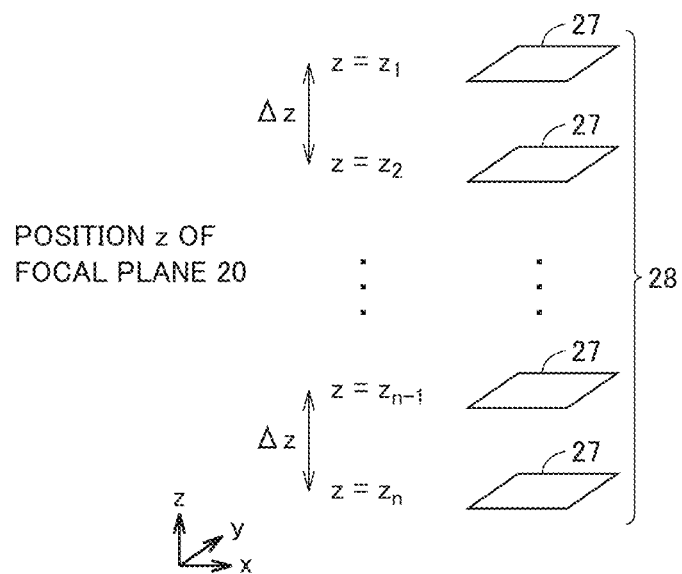
FIG. 4 is a view illustrating a two-dimensional original image obtained by the microscopes of the first and second embodiments.

As illustrated in FIG. 4, sample 12 (three-dimensional object 12 $a$) is imaged at every interval $\Delta z$ while focal plane 20 of objective lens 16 is moved along the optical axis direction (z-axis direction) of observation optical system 10. A two-dimensional original image 27 of sample 12 (three-dimensional object 12$a$) is obtained at each of a plurality of positions $z_1, z_2, \ldots, z_{n-1}$, zn of focal plane 20. On computer 3, a plurality of two-dimensional original images 27 are stacked over the plurality of positions $z_1, z_2, \ldots, z_{n-1}, z_n$ of focal plane 20, and a three-dimensional original image 28 of sample 12 (three-dimensional object 12$a$) is obtained as a multilayer body (stack image) of the plurality of two-dimensional original images 27.

Interval $\Delta z$ between focal planes 20 adjacent to each other preferably satisfies a sampling condition expressed by $\Delta z < 1/(2k_{zmax})$. Cutoff frequency $k_{zmax}$ represents a maximum range in which an optical transfer function (OTF) of observation optical system 10 extends in a frequency direction ($k_z$ direction) conjugate with respect to the optical axis direction (z-axis direction) of observation optical system 10. Cutoff frequency $k_{zmax}$ is determined by a numerical aperture (NA) of objective lens 16 included in observation optical system 10, a wavelength of light 21, and the like. In the present specification, the frequency means a spatial frequency.

With reference to FIG. 1, computer 3 is communicatively connected to microscope 2. For example, computer 3 is a personal computer, a microcomputer, a cloud server, or a smart device (smartphone, tablet terminal, and the like). Display device 4 is communicably connected to computer 3. For example, display device 4 is a liquid crystal display device or an organic EL display device. Display device 4 displays an operation state of microscope 2, two-dimensional original image 27, three-dimensional original image 28, an image processed by computer 3 such as a three-dimensional correction image in which the optical aberration of observation optical system 10 is removed or reduced, or the like.

Computer 3 includes a processor 30 and a storage device 55. For example, storage device 55 is a random access memory (RAM), a read only memory (ROM), or a hard disk. Storage device 55 stores a computer program executed by processor 30, two-dimensional original image 27, three-dimensional original image 28, an image processed by computer 3 such as the three-dimensional correction image in which optical aberration of observation optical system 10 is removed or reduced, or the like. For example, the computer program includes a microscope control program, a three-dimensional original image generation program, an optical aberration correction program, and an optical wavefront estimation program. The microscope control program, the three-dimensional original image generation program, the optical aberration correction program, and the optical wavefront estimation program may be stored in a non-transitory computer-readable storage medium.

For example, processor 30 is configured of a central processing unit (CPU), a graphics processing unit (GPU), a field-programmable gate array (FPGA), or the like. Processor 30 executes the computer program stored in storage device 55. When processor 30 executes the computer program, computer 3 implements the functions in FIGS. 5 to 9. With reference to FIGS. 5 to 9, a functional configuration of computer 3 will be described.

Figure 5:
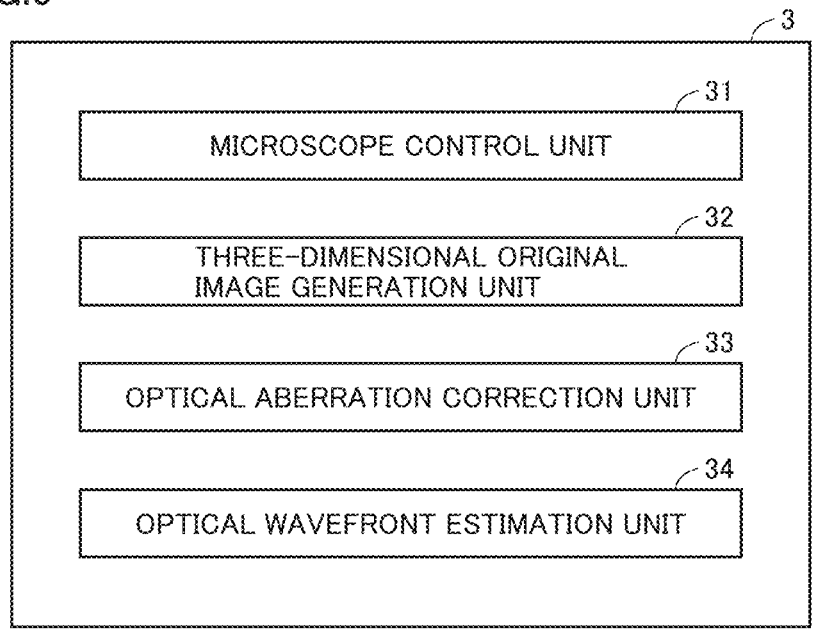
FIG. 5 is a block diagram illustrating a functional configuration of a computer according to the first, second, and fourth embodiments.
Figure 6:
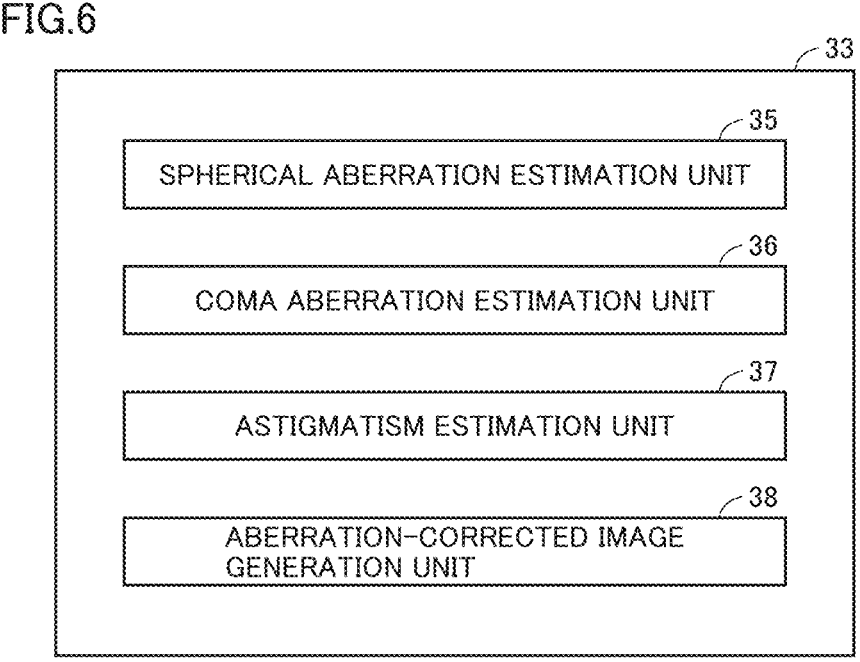
FIG. 6 is a block diagram illustrating a functional configuration of an optical aberration correction unit of the first, second, and fourth embodiments.
Figure 7:
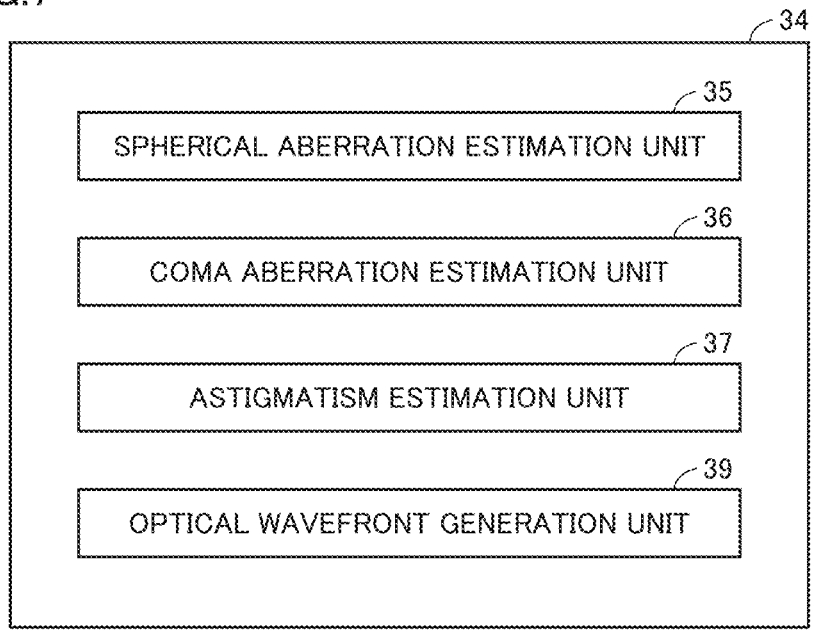
FIG. 7 is a block diagram illustrating a functional configuration of an optical wavefront estimation unit according to the first, second, and fourth embodiments.
Figure 8:
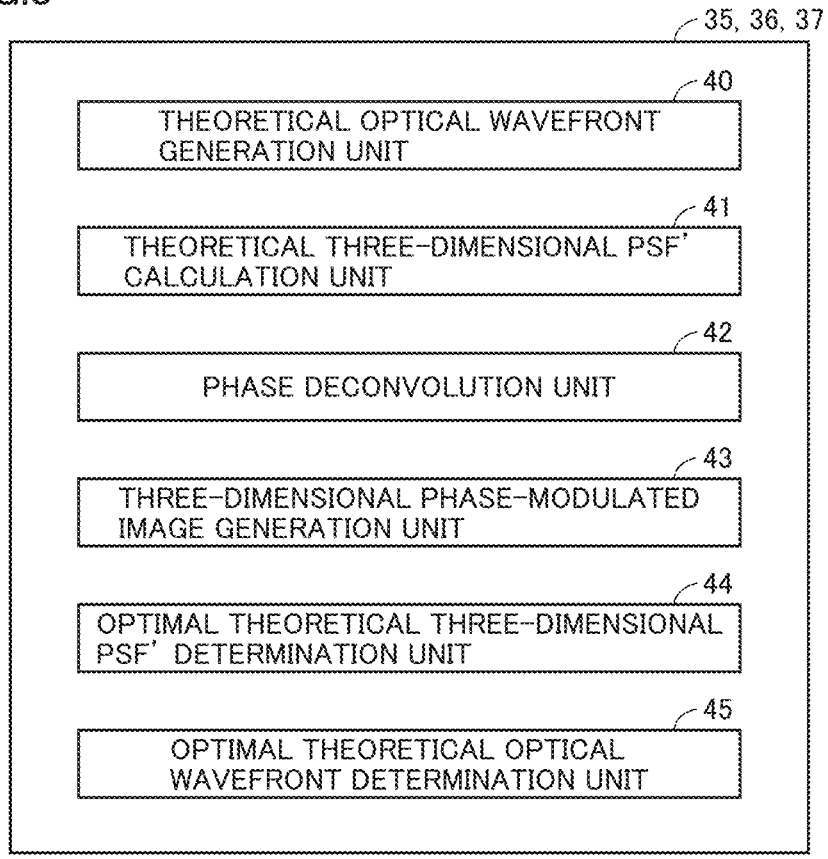
FIG. 8 is a block diagram illustrating functional configurations of a spherical aberration estimation unit, a coma aberration estimation unit, and an astigmatism estimation unit of the first and second embodiments.
Figure 9:
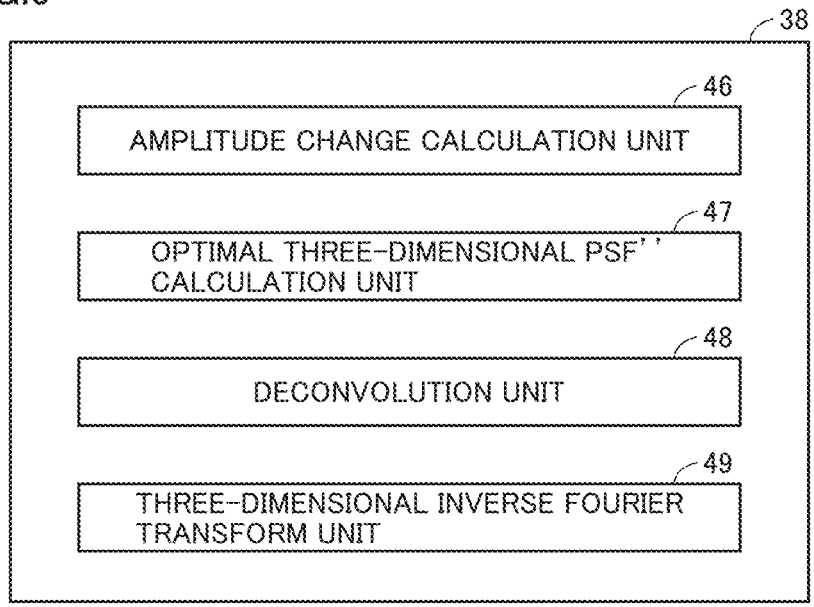
FIG. 9 is a block diagram illustrating a functional configuration of an aberration-corrected image generation unit of the first, second, and fourth embodiments.

As illustrated in FIG. 5, computer 3 includes a microscope control unit 31, a three-dimensional original image generation unit 32, an optical aberration correction unit 33, and an optical wavefront estimation unit 34. As illustrated in FIG. 6, optical aberration correction unit 33 includes a spherical aberration estimation unit 35, a coma aberration estimation unit 36, an astigmatism estimation unit 37, and an aberration-corrected image generation unit 38. As illustrated in FIG. 7, optical wavefront estimation unit 34 includes spherical aberration estimation unit 35, coma aberration estimation unit 36, astigmatism estimation unit 37, and an optical wavefront generation unit 39. As illustrated in FIG. 8, each of spherical aberration estimation unit 35, coma aberration estimation unit 36, and astigmatism estimation unit 37 includes a theoretical optical wavefront generation unit 40, a theoretical three-dimensional PSF' calculation unit 41, a phase deconvolution unit 42, a three-dimensional phase-modulated image generation unit 43, an optimal theoretical three-dimensional PSF' determination unit 44, and an optimal theoretical optical wavefront determination unit 45. As illustrated in FIG. 9, aberration-corrected image generation unit 38 includes an amplitude change calculation unit 46, an optimal three-dimensional PSF" calculation unit 47, a deconvolution unit 48, and a three-dimensional inverse Fourier transform unit 49.

When processor 30 executes the microscope control program, computer 3 implements the function as microscope control unit 31. Computer 3 is a controller of microscope 2. Microscope control unit 31 controls the piezoelectric element or motor (not illustrated) connected to at least one of sample support stage 11 and objective lens 16, and controls the position of at least one of sample support stage 11 and objective lens 16. Microscope control unit 31 controls imaging device 18 to cause imaging device 18 to capture two-dimensional original image 27 of sample 12 (three-dimensional object 12$a$).

When processor 30 executes the three-dimensional original image generation program, computer 3 implements the function as three-dimensional original image generation unit 32. Computer 3 is a three-dimensional original image generation device. Three-dimensional original image generation unit 32 performs step S11 (see FIG. 10).

When processor 30 executes the optical aberration correction program, computer 3 implements the function as optical aberration correction unit 33 (see FIGS. 5 and 6). Computer 3 is an optical aberration correction device. Optical aberration correction unit 33 performs steps S12 and S16

Figure 10:
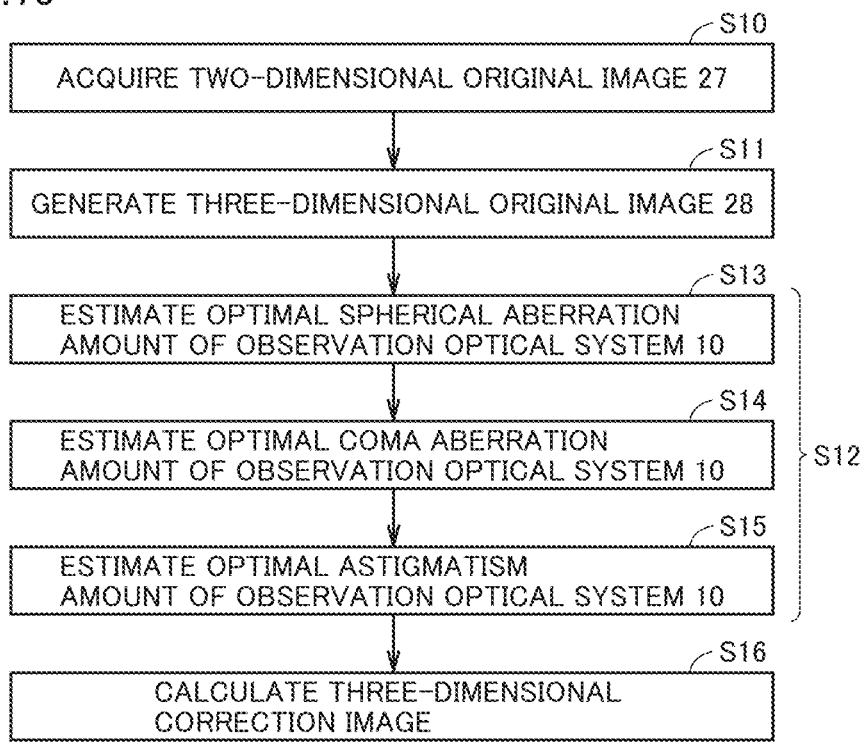
FIG. 10 is a flowchart illustrating an optical aberration correcting method of the first, second, and fourth embodiments.

(see FIG. 10). Spherical aberration estimation unit 35 performs step S13 (see FIG. 10). Coma aberration estimation unit 36 performs step S14 (see FIG. 10). Astigmatism estimation unit 37 performs step S15 (see FIG. 10). Aberration-corrected image generation unit 38 performs step S16 (see FIGS. 10 and 13).

Figure 11:
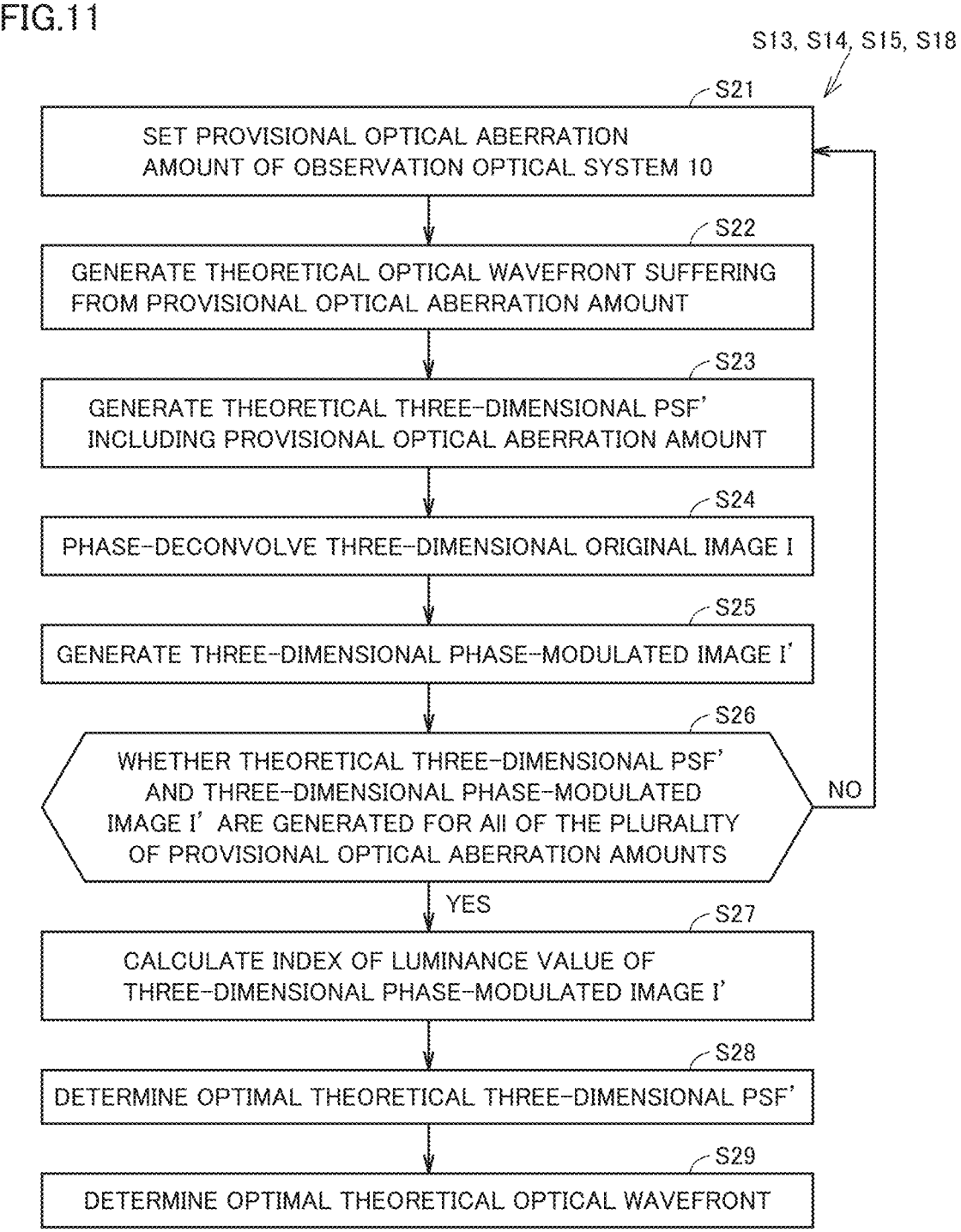
FIG. 11 is a flowchart illustrating each of a step of estimating an optimal spherical aberration amount of the first and second embodiments, a step of estimating an optimal coma aberration amount of the first and second embodiments, a step of estimating an optimal astigmatism amount of the first and second embodiments, a step of estimating an optimal higher-order optical aberration amount of the first and second embodiments, and a step of estimating an optimal higher-order optical aberration amount of the first embodiment and a third modification of the second embodiment.

Theoretical optical wavefront generation unit 40 performs steps S21, S22 (see FIG. 11). Theoretical three-dimensional PSF' calculation unit 41 performs step S23 (see FIG. 11). Phase deconvolution unit 42 performs step S24 (see FIGS. 11 and 12). Three-dimensional phase-modulated image generation unit 43 performs step S25 (see FIG. 11). Optimal theoretical three-dimensional PSF' determination unit 44 performs steps S27, S28 (see FIG. 11). Optimal theoretical optical wavefront determination unit 45 performs step S29 (see FIG. 11). Amplitude change calculation unit 46 performs step S34 (see FIGS. 13 and 29). Optimal three-dimensional PSF" calculation unit 47 performs step S35 (see FIGS. 13 and 29). Deconvolution unit 48 performs step S36 (see FIGS. 13 and 29). Three-dimensional inverse Fourier transform unit 49 performs step S39 (see FIGS. 13 and 29).

When processor 30 executes the optical wavefront estimation program, computer 3 implements the function as the optical wavefront estimation unit 34 (see FIGS. 5 and 7). Computer 3 is also an optical wavefront estimation device. Optical wavefront estimation unit 34 performs steps S12 and S17 (see FIG. 21). Spherical aberration estimation unit 35 performs step S13 (see FIG. 21). Coma aberration estimation unit 36 performs step S14 (see FIG. 21). Astigmatism estimation unit 37 performs step S15 (see FIG. 21). Optical wavefront generation unit 39 performs step S17 (see FIG. 21).

<Optical Aberration Correction Method>

With reference to FIGS. 10 to 20, a method for obtaining the three-dimensional correction image by removing or reducing the optical aberration of observation optical system 10 included in three-dimensional original image 28 will be described.

As illustrated in FIG. 10, in step S10, two-dimensional original image 27 is acquired using microscope 2. Microscope control unit 31 controls the piezoelectric element or motor (not illustrated) connected to one of sample support stage 11 and objective lens 16. One of sample support stage 11 and objective lens 16 is moved in the optical axis direction (z-axis direction) of observation optical system 10 with respect to the other of sample support stage 11 and objective lens 16. Sample 12 (three-dimensional object 12a) is imaged while focal plane 20 of microscope 2 (observation optical system 10) is moved along the optical axis direction (z-axis direction) of observation optical system 10. As illustrated in FIG. 4, two-dimensional original image 27 of sample 12 (three-dimensional object 12a) is obtained at each of the plurality of positions $z_1, z_2, \ldots, z_{n-1}, z_n$ of focal plane 20.

As illustrated in FIG. 10, in step S11, three-dimensional original image 28 of sample 12 is generated from the plurality of two-dimensional original images 27. Specifically, three-dimensional original image generation unit 32 stacks a plurality of two-dimensional original images 27 over the plurality of positions $z_1, z_2, \ldots, z_{n-1}, z_n$ of focal plane 20, and generates three-dimensional original image 27 of sample 12 (three-dimensional object 12a) as the multi-layer body (stack image) of the plurality of two-dimensional original images 28.

Figure 14:
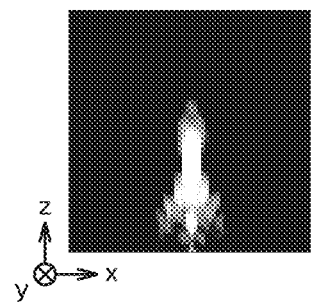
FIG. 14 is a view illustrating an example of a three-dimensional original image I of the first embodiment.

Three-dimensional original image 28 of sample 12 (three-dimensional object 12a) can be expressed by an equation (1). I(x,y,z) represents a luminance distribution of three-dimensional original image 28. Hereinafter, I(x,y,z) may be referred to as a three-dimensional original image I. FIG. 14 illustrates an example of three-dimensional original image I. O(x',y',z') indicates the luminance distribution of sample 12 (three-dimensional object 12a). A PSF(x-x',y-y',z-z') represents a point spread function (PSF) of observation optical system 10. That is, the PSF(x-x',y-y',z-z') represents a degree of influence of a bright spot at positions x', y', z' of sample 12 (three-dimensional object 12a) on the luminance of an image at a place (x,y,z) away from the bright spot through observation optical system 10. As illustrated in the equation (1), in the real space, three-dimensional original image I is given by convolution integration of the luminance distribution of sample 12 (three-dimensional object 12a) and the PSF.

[Mathematical formula 1]

$$I(x,y,z)=\iiint O(x',y',z')PSF(x-x',y-y',z-z')dx'dy'dz' \quad (1)$$

In a frequency space (Fourier space), the equation (1) can be expressed by an equation (2). A Fourier transform FT(I) of three-dimensional original image I is given by a product of a Fourier transform FT(O) of sample 12 (three-dimensional object 12a) and a Fourier transform FT(PSF) of the PSF. Fourier transform FT(I) of three-dimensional original image I represents a frequency distribution of three-dimensional original image I. The Fourier transform FT(O) of sample 12 (three-dimensional object 12a) represents the frequency distribution of sample 12 (three-dimensional object 12a). The Fourier transform FT(PSF) of the PSF is the optical transfer function (OTF) of observation optical system 10.

[Mathematical formula 2]

$$FT(I)=FT(O)FT(PSF)=FT(O)OTF \quad (2)$$

By deconvolving three-dimensional original image I in the frequency space, frequency distribution FT(O) of sample 12 (three-dimensional object 12a) from which the optical aberration of observation optical system 10 is removed or reduced is obtained. A method for deconvolving three-dimensional original image I is not particularly limited, but for example, as illustrated in an equation (3), frequency distribution FT(I) of three-dimensional original image I is subjected to an inverse filter of the OTF of observation optical system 10.

[Mathematical formula 3]

$$FT(O) = \frac{FT(I)}{OTF} = \frac{FT(I)}{|OTF|^2} OFT \quad (3)$$

By performing the inverse Fourier transform on frequency distribution FT(O) of sample 12 (three-dimensional object 12a) from which the optical aberration of observation optical system 10 is removed or reduced using an equation (4), a correction image of sample 12 (three-dimensional object 12a) from which the optical aberration of observation optical system 10 is removed or reduced is obtained.

[Mathematical formula 4]

$$O = FT^{-1}\left(\frac{FT(I)}{OTF}\right) \quad (4)$$

<Step S12 of Estimating Optical Aberration Amount of Observation Optical System 10>

The optical aberration correction method of the first embodiment is characterized by a method for deconvolving three-dimensional original image I.

With reference to FIG. 10, the optical aberration correction method of the first embodiment includes step S12 of estimating the optical aberration amount of observation optical system 10. The optical aberration of observation optical system 10 is mainly generated in objective lens 16. The optical aberration generated in objective lens 16 can be mainly expressed as Seidel optical aberration. Therefore, in the first embodiment, the Seidel optical aberration (spherical aberration, coma aberration, and astigmatism) is used as the optical aberration of observation optical system 10. Specifically, step S12 of estimating the optical aberration amount of observation optical system 10 includes: step S13 of estimating the optimal spherical aberration amount of observation optical system 10; step S14 of estimating the optimal coma aberration amount of observation optical system 10; and step S15 of estimating the optimal astigmatism amount of observation optical system 10.

In microscope 2 including objective lens 16, among the spherical aberration, the coma aberration, and the astigmatism of objective lens 16, the influence of the spherical aberration of objective lens 16 on the image is the largest and the influence of the astigmatism of objective lens 16 on the image is the smallest in many cases. Therefore, as illustrated in FIG. 10, in step S12 of the first embodiment, first step S13 is performed, then step S14 is performed, and finally step S15 is performed to estimate the optical aberration amount of observation optical system 10.

With reference to FIG. 11, step S13 of estimating the optimal spherical aberration amount of observation optical system 10 includes: step S21 of setting a provisional optical aberration amount (provisional spherical aberration amount) of observation optical system 10; step S22 of generating a theoretical optical wavefront suffering from the set provisional optical aberration amount (provisional spherical aberration amount); step S23 of generating a theoretical three-dimensional point distribution function (theoretical three-dimensional PSF') including the set provisional optical aberration amount (provisional spherical aberration amount); step S24 of phase-deconvolving three-dimensional original image I; step S25 of generating a three-dimensional phase-modulated image I'; step S26 of determining whether the theoretical three-dimensional PSF' and three-dimensional phase-modulated image I' are generated for all of the plurality of provisional optical aberration amounts (provisional spherical aberration amounts); step S27 of calculating an index of a luminance value of the three-dimensional phase-modulated image; step S28 of determining the optimal theoretical three-dimensional PSF'; and step S29 of determining the optimal theoretical optical wavefront.

With reference to FIG. 11, in step S21 in step S13, the provisional optical aberration amount (provisional spherical aberration amount) of observation optical system 10 is set on computer 3. For example, one provisional optical aberration amount (provisional spherical aberration amount) in the plurality of provisional optical aberration amounts is set on computer 3.

With reference to FIG. 11, in step S22 in step S13, theoretical optical wavefront generation unit 40 (see FIG. 8) generates a theoretical optical wavefront $W_s(u,v)$ suffering from the provisional optical aberration amount (provisional spherical aberration amount) at a pupil coordinates (u,v) of pupil plane 23 (back focal plane) of objective lens 16 using an equation (5). Theoretical optical wavefront $W_s$ is a wavefront of light 21 that is output from bright spot 13 (see FIG. 2) in sample 12 (three-dimensional object 12a) and suffers from the provisional optical aberration amount (provisional spherical aberration amount) set in step S21 in step S13. d represents a distance between cover glass 14 and bright spot 13 of sample 12 in the optical axis direction (z-axis direction) of observation optical system 10. $n_1$ represents the refractive index of immersion medium 15. $n_2$ represents the refractive index of sample 12. $\theta_1$ represents an incident angle of light 21 passing through pupil coordinates (u,v) on immersion medium 15 at an interface between immersion medium 15 and cover glass 14. $\theta_1$ is given by an equation (6). $\lambda$ represents a wavelength of light 21. $\theta_2$ represents an angle between light 21 passing through pupil coordinates (u,v) and the optical axis of observation optical system 10 at bright spot 13 of sample 12. $\theta_2$ is given by an equation (7).

[Mathematical formula 5]

$$W_s(u, v) = d(n_2 \cos(\theta_2(u, v)) - n_1 \cos(\theta_1(u, v))) \qquad (5)$$

[Mathematical formula 6]

$$\theta_1(u, v) = \sin^{-1} \frac{\sqrt{u^2 + v^2}}{n_1 \frac{2\pi}{\lambda}} \qquad (6)$$

[Mathematical formula 7]

$$\theta_2(u, v) = \sin^{-1}\left(\frac{n_2}{n_1} \sin \theta_1(u, v)\right) \qquad (7)$$

In observation optical system 10, in many cases, $n_1$ and $\lambda$ are known, and $n_2$ and d are unknown. Therefore, the provisional optical aberration amount (provisional spherical aberration amount) of observation optical system 10 from which theoretical optical wavefront $W_s$ suffers can be set by setting $n_2$ and d to arbitrary values.

With reference to FIG. 11, the theoretical three-dimensional PSF' of observation optical system 10 including the provisional optical aberration amount (provisional spherical aberration amount) set in step S21 is generated in step S23 in step S13. Theoretical three-dimensional PSF' calculation unit 41 (see FIG. 8) calculates the theoretical three-dimensional PSF' from theoretical optical wavefront $W_s$ that suffers from the provisional optical aberration amount (provisional spherical aberration amount). In the present specification, the PSF' means a point spread function mainly including a provisional optical aberration amount in its phase, or a point spread function mainly reflecting a provisional optical aberration amount in its phase. That is, " " means that the provisional optical aberration amount is mainly included in the phase, or that the provisional optical aberration amount is reflected.

Specifically, theoretical three-dimensional PSF' calculation unit 41 calculates a pupil function P'(u, v) including the provisional optical aberration amount (provisional spherical aberration amount) at pupil plane 23 of objective lens 16 using an equation (8). P(u,v) in the equation (8) is given by an equation (9). NA represents a numerical aperture of objective lens 16.

[Mathematical formula 8]

$$P'(u,v) = P(u,v)e^{i\frac{2\pi W_s(u,v)}{\lambda}} \quad (8)$$

[Mathematical formula 9]

$$P(u,v) = \begin{cases} 1, & u^2 + v^2 < \frac{NA}{\lambda} \\ 0, & u^2 + v^2 \geq \frac{NA}{\lambda} \end{cases} \quad (9)$$

Assuming that light 21 travels as a spherical wave in the optical axis direction (z-axis direction) of observation optical system 10, a defocused wavefront $W_d$ of light 21 is given by an equation (10).

[Mathematical formula 10]

$$W_d(u,v,z) = z\sqrt{\left(\frac{2\pi n_1}{\lambda}\right)^2 - (u^2 + v^2)} \quad (10)$$

Theoretical three-dimensional PSF' calculation unit 41 calculates a pupil function P'(u,v,z) corresponding to position z of focal plane 20 using an equation (11). The pupil function P'(u,v,z) includes not only information about intensity of light 21 but also information about the phase of light 21 on which information about the provisional optical aberration amount (provisional spherical aberration amount) is mainly reflected.

[Mathematical formula 11]

$$P'(u,v,z) = P'(u,v)e^{iW_d(u,v,z)} \quad (11)$$

Theoretical three-dimensional PSF' calculation unit 41 calculates two-dimensional light intensity PSF$_z$'(u,v,z) at position z of focal plane 20 from pupil function P'(x,y,z) using an equation (12). In the equation (12), Re ( ) represents a real part in a parentheses. $FT_{2D}^{-1}$ represents a two-dimensional inverse Fourier transform. For example, in the equation (12), $FT_{2D}^{-1}$ means the two-dimensional inverse Fourier transform in a uv-space. In the equation (12), * represents a complex conjugate.

[Mathematical formula 12]

$$PSF_z'(x,y,z) = Re(FT_{2D}^{-1}(P'(u,v,z))FT_{2D}^{-1}(P'(u,v,z))^*) \quad (12)$$

Theoretical three-dimensional PSF' calculation unit 41 calculates a theoretical three-dimensional PSF'(x,y,z) as the multilayer body (aggregate) of the two-dimensional light intensity PSF$_z$' at a plurality of positions z of focal plane 20. Information about the phase of light 21 on which the provisional optical aberration amount (provisional spherical aberration amount) is mainly reflected is reflected in a theoretical three-dimensional PSF'(x,y,z). The theoretical three-dimensional PSF'(x,y,z) including the optimal optical aberration amount (optimal spherical aberration amount) closest to the optical aberration amount (spherical aberration amount) of observation optical system 10 is all the provisional optical aberration amounts (provisional spherical aberration amounts) can be obtained using the theoretical three-dimensional PSF'(x,y,z) and three-dimensional original image I.

Figure 12:
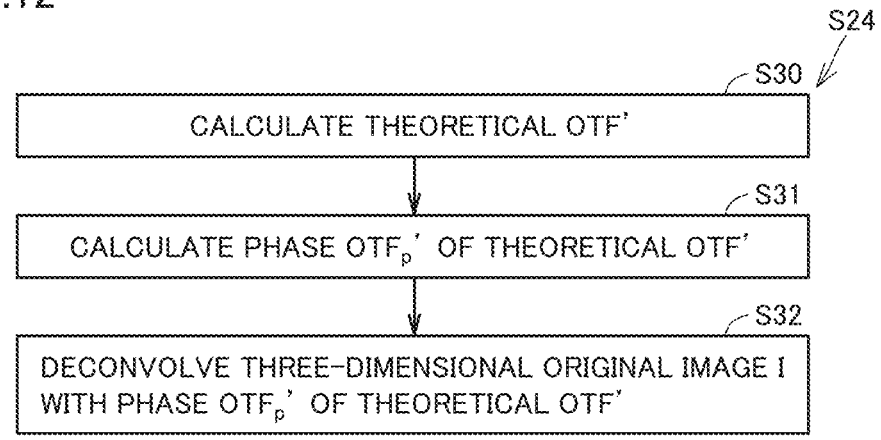
FIG. 12 is a flowchart illustrating a step of phase-deconvolving the three-dimensional original image of the first and second embodiments.

With reference to FIGS. 11 and 12, in step S24, three-dimensional original image I is subjected to phase-deconvolution. Step S24 includes: step S30 of calculating a theoretical OTF' (provisional optical transfer function); step S31 of calculating a phase OTF$_p$' (the phase of the provisional optical transfer function) of the theoretical OTF'; and step S32 of deconvolving three-dimensional original image I with the phase OTF$_p$' of the theoretical OTF'. As used herein, for example, the "theoretical" OTF' means the "OTF made on computer 3".

With reference to FIG. 12, in step S30, phase deconvolution unit 42 (see FIG. 8) performs the three-dimensional Fourier transform on the theoretical three-dimensional PSF' (x,y,z) using an equation (13), and calculates a theoretical OTF'(k$_x$,k$_y$,k$_z$) of observation optical system 10 (provisional optical transfer function) including the provisional optical aberration amount (for example, the provisional spherical aberration amount). $FT_{3D}$ represents the three-dimensional Fourier transform. In the present specification, the OTF' means an optical transfer function mainly including the provisional optical aberration amount in its phase, or the optical transfer function mainly including the provisional optical aberration amount reflected in its phase.

[Mathematical formula 13]

$$OTF'(k_x,k_y,k_z) = FT_{3D}(PSF'(x,y,z)) \quad (13)$$

The provisional optical aberration amount (for example, the provisional spherical aberration amount) is mainly reflected in the phase OTF$_p$' of the theoretical OTF'. With reference to FIG. 12, in step S31, phase deconvolution unit 42 calculates the phase OTF$_p$' (the phase of the provisional optical transfer function) of the theoretical OTF' from theoretical OTF' using an equation (14). arg [ ] is a function obtaining the phase in the parentheses.

[Mathematical formula 14]

$$OTF_p'(k_x,k_y,k_z) = e^{i\arg[OTF'(k_x,k_y,k_z)]} \quad (14)$$

With reference to FIG. 12, in step S32, phase deconvolution unit 42 deconvolves three-dimensional original image I using the phase OTF$_p$' of the theoretical OTF'. Specifically, phase deconvolution unit 42 performs the three-dimensional Fourier transform on three-dimensional original image I using an equation (15) to calculate a frequency distribution D(k$_x$,k$_y$,k$_z$) of three-dimensional original image I. Then, the phase deconvolution unit 42 deconvolves frequency distribution D of the three-dimensional original image I with the phase OTF$_p$' of the theoretical OTF' in the frequency space. For example, as illustrated in the equation (15), by applying an inverse filter of the phase OTF$_p$' of the theoretical OTF' to frequency distribution D of three-dimensional original image I, frequency distribution D of three-dimensional original image I may be deconvolved with the phase OTF$_p$' of the theoretical OTF'. Thus, a frequency distribution D'(k$_x$,k$_y$,k$_z$) of three-dimensional original image I is calculated. In the phase of frequency distribution D' of three-dimensional original image I, the provisional optical aberration amount (provisional spherical aberration amount) is removed or reduced.

[Mathematical formula 15]

$$D(k_x,k_y,k_z) = FT_{3D}(I(x,y,z)) \quad (15)$$

[Mathematical formula 16]

$$D'(k_x,k_y,k_z) = \begin{cases} \dfrac{D(k_x,k_y,k_z)}{OTF_p'(k_x,k_y,k_z)}, & k_x < k_{xmax}, k_y < k_{ymax}, \text{ and } k_z < k_{zmax} \\ 0, & k_x \geq k_{xmax}, k_y \geq k_{ymax}, \text{ or } k_z \geq k_{zmax} \end{cases} \quad (16)$$

As illustrated in an equation (16), the phase deconvolution is performed only in the frequency space within cutoff frequencies $k_{xmax}, k_{ymax}, k_{zmax}$ of the optical transfer function (OTF) of observation optical system 10. The reason is as follows. In the frequency region exceeding cutoff frequencies $k_{xmax}, k_{ymax}, k_{zmax}$, no signal exists, and only noise exists. Therefore, when the phase deconvolution is performed in the frequency region exceeding cutoff frequencies $k_{xmax}, k_{ymax}, k_{zmax}$, an artifact caused by noise is generated. In order to avoid the artifact, the phase deconvolution is performed only in the frequency space within cutoff frequencies $k_{xmax}, k_{ymax}, k_{zmax}$.

Cutoff frequency $k_{xmax}$ represents the maximum range in which the optical transfer function (OTF) of observation optical system 10 extends in the frequency direction ($k_x$ direction) conjugate with respect to the x-axis direction. Cutoff frequency $k_{ymax}$ represents a maximum range in which the optical transfer function (OTF) of observation optical system 10 extends in the frequency direction ($k_y$ direction) conjugate with respect to the y-axis direction. Cutoff frequencies $k_{xmax}, k_{ymax}$ are determined by the numerical aperture (NA) of objective lens 16 included in observation optical system 10, the wavelength of light 21, and the like.

With reference to FIG. 11, three-dimensional phase-modulated image I'(x,y,z) in which the provisional optical aberration amount (provisional spherical aberration amount) set in step S21 is corrected is generated in step S25 of step S13. Specifically, three-dimensional phase-modulated image generation unit 43 (see FIG. 8) performs the three-dimensional inverse Fourier transform on D' using an equation (17) to generate three-dimensional phase-modulated image I'. $FT_{3D}^{-1}$ means a three-dimensional inverse Fourier transform. For example, $FT_{3D}^{-1}$ in equation (17) means a three-dimensional inverse Fourier transform in a frequency space ($k_x k_y k_z$ space).

[Mathematical formula 17]

$$I'(x,y,z) = FT_{3D}^{-1}(D'(k_x, k_y, k_z)) \quad (17)$$

With reference to FIG. 11, in step S26 of step S13, computer 3 determines whether the theoretical three-dimensional PSF' and three-dimensional phase-modulated image I' are generated for all of the plurality of provisional optical aberration amounts (provisional spherical aberration amounts). When the generation of the theoretical three-dimensional PSF' and three-dimensional phase-modulated image I' is not yet completed for all of the plurality of provisional optical aberration amounts (provisional spherical aberration amounts), steps S22 to S26 are repeatedly performed while the provisional optical aberration amount (provisional spherical aberration amount) is changed. For example, the provisional spherical aberration amount of observation optical system 10 can be changed by changing at least one of $n_2$ and d. In this way, theoretical three-dimensional PSF' and three-dimensional phase-modulated image I' are generated for all of the plurality of provisional optical aberration amounts (provisional spherical aberration amounts). That is, a plurality of theoretical three-dimensional PSF's and a plurality of three-dimensional phase-modulated images I' are generated by repeatedly performing steps S22 to S26 while changing the provisional optical aberration amount (provisional spherical aberration amount). Each of the plurality of theoretical three-dimensional PSF's includes a corresponding one of the plurality of provisional optical aberration amounts. Each of the plurality of three-dimensional phase-modulated images I' is generated by deconvolving the three-dimensional original image I with the phase $OTF_p'$ (the phase of the provisional optical transfer function) of the theoretical OTF' corresponding one of the plurality of the theoretical three-dimensional PSF's. Each of the plurality of three-dimensional phase-modulated images I' is obtained by correcting three-dimensional original image I with a corresponding one of the plurality of provisional optical aberration amounts.

Figure 15:
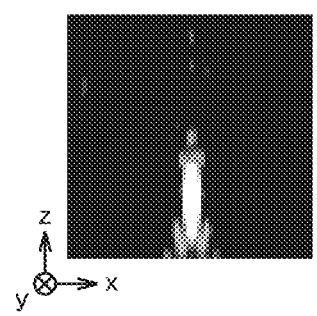
FIG. 15 is a view illustrating an example of a theoretical three-dimensional PSF' calculated for a first provisional spherical aberration amount.
Figure 16:
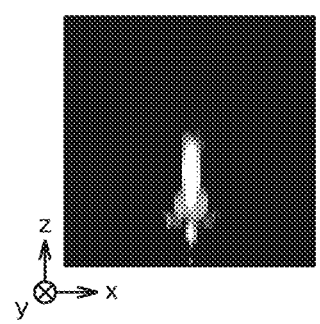
FIG. 16 is a view illustrating an example of the theoretical three-dimensional PSF' calculated for a second provisional spherical aberration amount.
Figure 17:
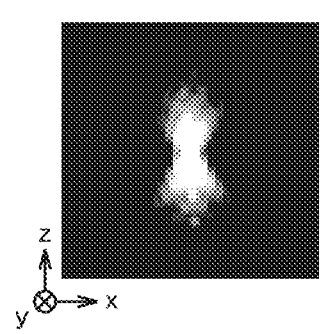
FIG. 17 is a view illustrating an example of the theoretical three-dimensional PSF' calculated for a third provisional spherical aberration amount.
Figure 18:
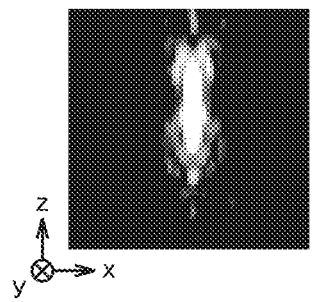
FIG. 18 is a view illustrating an example of a three-dimensional phase-modulated image I' calculated for the first provisional spherical aberration amount.
Figure 19:
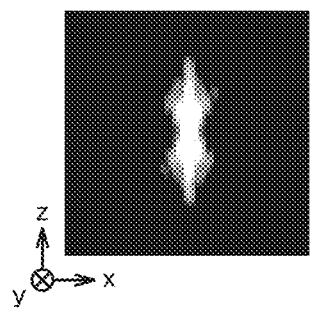
FIG. 19 is a view illustrating an example of the three-dimensional phase-modulated image I' calculated for the second provisional spherical aberration amount.
Figure 20:
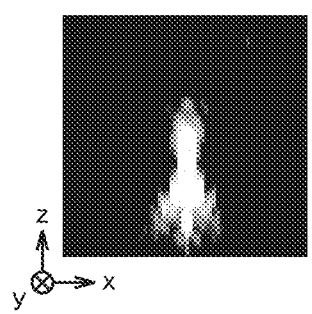
FIG. 20 is a view illustrating an example of the three-dimensional phase-modulated image I' calculated for the third provisional spherical aberration amount.

FIGS. 15 to 17 illustrate examples of theoretical three-dimensional PSF' calculated for the plurality of provisional spherical aberration amounts. FIGS. 18 to 20 illustrate examples of three-dimensional phase-modulated image I' calculated for the plurality of provisional spherical aberration amounts. FIGS. 15 and 18 illustrate the theoretical three-dimensional PSF' and three-dimensional phase-modulated image I' calculated for a first provisional spherical aberration amount. FIGS. 16 and 19 illustrate the theoretical three-dimensional PSF' and three-dimensional phase-modulated image I' calculated for a second provisional spherical aberration amount. FIGS. 17 and 20 illustrate the theoretical three-dimensional PSF' and three-dimensional phase-modulated image I' calculated for a third provisional spherical aberration amount.

In three-dimensional phase-modulated image I' corresponding to the theoretical three-dimensional PSF' including the optimal optical aberration amount (optimal spherical aberration amount) closest to the optical aberration amount (spherical aberration amount) of observation optical system 10 in all the provisional optical aberration amounts (provisional spherical aberration amounts), the light spread due to the optical aberration of observation optical system 10 gathers at the center of the image of bright spot 13, and the luminance of three-dimensional phase-modulated image I' increases.

With reference to FIG. 11, in step S27 of step S13, optimal theoretical three-dimensional PSF' determination unit 44 (see FIG. 8) calculates the index of the luminance value of three-dimensional phase-modulated image I'. For example, the index of the luminance value of three-dimensional phase-modulated image I' is variance of the luminance value of three-dimensional phase-modulated image I', a standard deviation of the luminance value of three-dimensional phase-modulated image I', or the maximum value of the luminance value of three-dimensional phase-modulated image I'. For example, the variance of the luminance value of three-dimensional phase-modulated image I' is the variance of the luminance value of the image (MIP image) obtained using maximum intensity projection. The maximum value projection method is a method in which projection processing is performed on image data constructed three-dimensionally in an arbitrary viewpoint direction to display a maximum value in a projection path on a projection plane. When the variance of the luminance value of three-dimensional phase-modulated image I' related to the spherical aberration is calculated using the maximum value projection method, the maximum value projection method is applied to three-dimensional phase-modulated image I' in the x-axis direction and the y-axis direction.

With reference to FIG. 11, in step S28 of step S13, optimal theoretical three-dimensional PSF' determination unit 44 (see FIG. 8) determines the optimal theoretical three-dimensional PSF' from the plurality of theoretical three-dimensional PSF's based on the indices of the luminance values of the plurality of three-dimensional phase-modulated images I'. The optimal theoretical three-dimensional PSF' includes the optimal optical aberration amount (optimal spherical aberration amount) closest to the optical aberration amount (spherical aberration amount) of observation optical system 10 in the plurality of theoretical three-dimensional PSF's. The optimal theoretical three-dimensional PSF' is most approximate to the three-dimensional point spread function of the observation optical system 10 in the plurality of theoretical three-dimensional PSF's in terms of the optical aberration amount (spherical aberration amount) of observation optical system 10. Specifically, optimal theoretical three-dimensional PSF' determination unit 44 determines the theoretical three-dimensional PSF' corresponding to three-dimensional phase-modulated image I' having the maximum index of the luminance value as the optimal theoretical three-dimensional PSF'.

For example, in three-dimensional phase-modulated image I' of FIG. 19, the light is concentrated at the center of the bright spot image as compared with three-dimensional phase-modulated image I' in FIGS. 18 and 20. The index of the luminance value of three-dimensional phase-modulated image I' in FIG. 19 is larger than the index of the luminance value of three-dimensional phase-modulated image I' in FIGS. 18 and 20. Optimal theoretical three-dimensional PSF' determination unit 44 determines the theoretical three-dimensional PSF' in FIG. 16 corresponding to three-dimensional phase-modulated image I' in FIG. 19 as the optimal theoretical three-dimensional PSF'.

With reference to FIG. 11, in step S29 of step S13, optimal theoretical optical wavefront determination unit 45 (see FIG. 8) determines optimal theoretical optical wavefront $W_s$ corresponding to the optimal theoretical three-dimensional PSF'. Optimal theoretical optical wavefront $W_s$ is an optical wavefront suffering from the optimal optical aberration amount (optimal spherical aberration amount) closest to the optical aberration amount (spherical aberration amount) of observation optical system 10. Optimal theoretical optical wavefront $W_s$ is most approximate to optical wavefront 22 in terms of the amount of optical aberration (spherical aberration amount) of observation optical system 10. Specifically, optimal theoretical optical wavefront determination unit 45 determines optimal theoretical optical wavefront $W_s$ corresponding to the optimal theoretical three-dimensional PSF' from the equations (5) to (12) and the like.

As illustrated in FIG. 10, the optical aberration correction method of the first embodiment includes step S14 of estimating the optimal coma aberration amount of observation optical system 10. Coma aberration estimation unit 36 (see FIGS. 6 and 8) executes step S14. As illustrated in FIG. 11, step S14 of estimating the optimal coma aberration amount of observation optical system 10 is basically similar to step S13 of estimating the optimal spherical aberration amount of observation optical system 10, but the spherical aberration is replaced with the coma aberration in the above description of step S13, and the following points are different.

With reference to FIG. 11, in step S22 of step S14, theoretical optical wavefront generation unit 40 generates a theoretical optical wavefront $W_c(u,v)$ suffering from the provisional optical aberration amount (provisional coma aberration amount) at pupil coordinates (u,v) of pupil plane 23 (rear focal plane) of objective lens 16 using an equation (18). Theoretical optical wavefront $W_c$ is a wavefront of light 21 that is output from bright spot 13 in sample 12 and suffers from the provisional optical aberration amount (provisional coma aberration amount) set in step S21 in step S14. By setting the coefficients cu and cv to arbitrary values, it is possible to set the provisional optical aberration amount (provisional coma aberration amount) of observation optical system 10 from which theoretical optical wavefront $W_c$ suffer can be set by setting coefficients $c_u$, $c_v$ to arbitrary values.

[Mathematical formula 18]

$$W_c(u,v)=[c_u(u^2+v^2)u+c_v(u^2+v^2)v] \quad (18)$$

With reference to FIG. 11, in step S23 of step S14, theoretical optical wavefront generation unit 40 calculates pupil function P'(u,v) including the provisional optical aberration amount (provisional coma aberration amount) of observation optical system 10 using an equation (19). $W_s$ in the equation (19) is optimal theoretical optical wavefront $W_s$ determined in step S29 of step S13.

[Mathematical formula 19]

$$P'(u, v) = P(u, v)e^{i\frac{2\pi(W_s(u,v)+W_c(u,v))}{\lambda}} \quad (19)$$

With reference to FIG. 11, in step S26 of step S14, computer 3 determines whether the theoretical three-dimensional PSF' and three-dimensional phase-modulated image I' are generated for all of the plurality of provisional optical aberration amounts (provisional coma aberration amounts). When the generation of the theoretical three-dimensional PSF' and three-dimensional phase-modulated image I' is not yet completed for all of the plurality of provisional optical aberration amounts (provisional coma aberration amounts), steps S22 to S26 are repeatedly performed while the provisional optical aberration amount (provisional coma aberration amount) is changed. For example, the provisional coma aberration amount of observation optical system 10 can be changed by changing at least one of coefficients $c_u$, $c_v$. In this way, the theoretical three-dimensional PSF' and three-dimensional phase-modulated image I' are generated for all of the plurality of provisional optical aberration amounts (provisional coma aberration amounts).

With reference to FIG. 11, the variance of the luminance value of three-dimensional phase-modulated image I' calculated using the maximum value projection method will be described as an example of the index of the luminance value of three-dimensional phase-modulated image I' in step S27 of step S14. When the variance of the luminance value of three-dimensional phase-modulated image I' related to the x-axis direction coma aberration is calculated using the maximum value projection method, the maximum value projection method is applied to the three-dimensional phase-modulated image I' in the y-axis direction and the z-axis direction. When the variance of the luminance value of three-dimensional phase-modulated image I' related to the y-axis coma aberration is calculated using the maximum value projection method, the maximum value projection method is applied to three-dimensional phase-modulated image I' in the z-axis direction and the x-axis direction.

With reference to FIG. 11, in step S28 of step S14, optimal theoretical three-dimensional PSF' determination unit 44 (see FIG. 8) determines the optimal theoretical three-dimensional PSF' from the plurality of theoretical three-dimensional PSF's based on the indices of the luminance values of the plurality of three-dimensional phase-modulated images I'. The optimal theoretical three-dimensional PSF' includes the optimal optical aberration amount (optimal coma aberration amount) closest to the optical aberration amount (coma aberration amount) of observation optical system 10 in the plurality of theoretical three-dimensional PSF's. The optimal theoretical three-dimensional PSF' is most approximate to the three-dimensional point spread function of observation optical system 10 in the plurality of theoretical three-dimensional PSF's in terms of the optical aberration amount (coma aberration amount) of observation optical system 10. Specifically, optimal theoretical three-dimensional PSF' determination unit 44 determines the theoretical three-dimensional PSF' corresponding to three-dimensional phase-modulated image I' having the maximum index of the luminance value as the optimal theoretical three-dimensional PSF'.

With reference to FIG. 11, in step S29 of step S14, optimal theoretical optical wavefront determination unit 45 (see FIG. 8) determines optimal theoretical optical wavefront $W_c$ corresponding to the optimal theoretical three-dimensional PSF'. Optimal theoretical optical wavefront $W_c$ is an optical wavefront suffering from the optimal optical aberration amount (optimal coma aberration amount) closest to the optical aberration amount (coma aberration amount) of observation optical system 10. Optimal theoretical optical wavefront $W_c$ is most approximate to optical wavefront 22 in terms of the amount of optical aberration (coma aberration amount) of observation optical system 10. Specifically, optimal theoretical optical wavefront determination unit 45 determines optimal theoretical optical wavefront $W_c$ corresponding to the optimal theoretical three-dimensional PSF' from the equation (18) and the like.

As illustrated in FIG. 10, the optical aberration correction method of the first embodiment includes step S15 of estimating the optimal astigmatism amount of observation optical system 10. Coma aberration estimation unit 36 (see FIGS. 6 and 8) executes step S15. As illustrated in FIG. 11, step S15 of estimating the optimal astigmatism amount of observation optical system 10 is basically similar to step S13 of estimating the optimal spherical aberration amount of observation optical system 10, but the spherical aberration in the above description of step S13 is replaced with the astigmatism, and the following points are different.

With reference to FIG. 11, in step S22 of generating the optical wavefront in step S15, theoretical optical wavefront generation unit 40 generates theoretical optical wavefront $W_a(u,v)$ suffering from the provisional optical aberration amount (provisional astigmatism amount) at pupil coordinate (u,v) of pupil plane 23 (back focal plane) of objective lens 16 using an equation (20). Theoretical optical wavefront $W_a$ is the wavefront of light 21 that is output from bright spot 13 in sample 12 and suffers from the provisional optical aberration amount (provisional astigmatism amount) set in step S21 of step S15. When pupil coordinate (u,v) is rotated about the z-axis by an angle $r_a$, the astigmatism can be produced for various directions within pupil plane 23. The provisional optical aberration amount (provisional astigmatism amount) of observation optical system 10 from which theoretical optical wavefront $W_a$ suffers can be set by setting at least one of coefficient au or angle $r_a$ to an arbitrary value.

[Mathematical formula 20]

$$W_a(u,v) = a_u u^2 \quad (20)$$

With reference to FIG. 11, in step S23 of step S15, theoretical optical wavefront generation unit 40 calculates pupil function P'(u,v) including the provisional optical aberration amount (provisional astigmatism amount) of observation optical system 10 using an equation (21). $W_s$ and $W_c$ in the equation (21) are the optimal theoretical optical wavefronts $W_s$ and $W_c$ determined in steps S13 and S14, respectively.

[Mathematical formula 21]

$$P'(u, v) = P(u, v) e^{i\frac{2\pi(W_S(u,v)+W_C(u,v)+W_a(u,v))}{\lambda}} \quad (21)$$

With reference to FIG. 11, in step S26 of step S15, computer 3 determines whether the theoretical three-dimensional PSF' and three-dimensional phase-modulated image I' are generated for all of the plurality of provisional optical aberration amounts (provisional astigmatism amounts). When the generation of the theoretical three-dimensional PSF' and three-dimensional phase-modulated image I' is not yet completed for all of the plurality of provisional optical aberration amounts (provisional astigmatism amounts), steps S22 to S26 are repeatedly performed while the provisional optical aberration amount (provisional astigmatism amount) is changed. For example, the provisional astigmatism amount can be changed by changing at least one of coefficient $a_u$ and angle $r_a$. Thus, the theoretical three-dimensional PSF' and three-dimensional phase-modulated image I' are generated for all of the plurality of provisional optical aberration amounts (provisional astigmatism amounts).

With reference to FIG. 11, the variance of the luminance value of the three-dimensional phase-modulated image I' calculated using the maximum value projection method will be described as an example of the index of the luminance value of three-dimensional phase-modulated image I' in step S27 of step S15. When the variance of the luminance value of three-dimensional phase-modulated image I' related to the astigmatism is calculated using the maximum value projection method, the maximum value projection method is applied to three-dimensional phase-modulated image I' in the x-axis direction and the y-axis direction.

With reference to FIG. 11, in step S28 of step S15, optimal theoretical three-dimensional PSF' determination unit 44 (see FIG. 8) determines the optimal theoretical three-dimensional PSF' from the plurality of theoretical three-dimensional PSF's based on the indices of the luminance values of the plurality of three-dimensional phase-modulated images I'. The optimal theoretical three-dimensional PSF' includes the optimal optical aberration amount (optimal astigmatism amount) closest to the optical aberration amount (astigmatism amount) of observation optical system 10 in the plurality of theoretical three-dimensional PSF's. The optimal theoretical three-dimensional PSF' is most approximate to the three-dimensional point spread function of observation optical system 10 in the plurality of theoretical three-dimensional PSF's in terms of the optical aberration amount (astigmatism amount) of observation optical system 10. Specifically, optimal theoretical three-dimensional PSF' determination unit 44 determines the theoretical three-dimensional PSF' corresponding to three-dimensional phase-modulated image I' having the maximum index of the luminance value as the optimal theoretical three-dimensional PSF'.

With reference to FIG. 11, in step S29 of step S15, optimal theoretical optical wavefront determination unit 45 (see FIG. 8) determines optimal theoretical optical wavefront $W_a$ corresponding to the optimal theoretical three-dimensional PSF'. Optimal theoretical optical wavefront $W_a$ is an optical wavefront suffering from the optimal optical aberration amount (optimal astigmatism amount) closest to the optical aberration amount (astigmatism amount) of observation optical system 10. Optimal theoretical optical wavefront $W_a$ is most approximate to optical wavefront 22 in terms of the optical aberration amount (astigmatism amount) of observation optical system 10. Specifically, optimal theoretical optical wavefront determination unit 45 determines optimal theoretical optical wavefront $W_a$ corresponding to the optimal theoretical three-dimensional PSF' from the equation (20) and the like.

<Step S16 of Calculating Three-Dimensional Correction Image>

With reference to FIG. 10, the optical aberration correcting method of the first embodiment includes step S16 of calculating the three-dimensional correction image. The optical aberration of observation optical system 10 mainly changes the phase of optical wavefront 22 and the phase of the OTF of observation optical system 10, but secondarily changes the amplitude of light 21 or the amplitude of the PSF or the OTF of observation optical system 10. In the first embodiment, the change in the amplitude of light 21 caused by the optical aberration of the observation optical system 10 or the change in the amplitude of the PSF or the OTF of observation optical system 10 is corrected in step S16 of calculating the three-dimensional correction image. The change in the amplitude of light 21 or the change in the amplitude of the PSF or the OTF of observation optical system 10 due to the optical aberration of observation optical system 10 includes the change in the amplitude of the wavefront generated at the interface (see FIG. 2) between sample 12 and cover glass 14 due to the spherical aberration of observation optical system 10.

Figure 13:
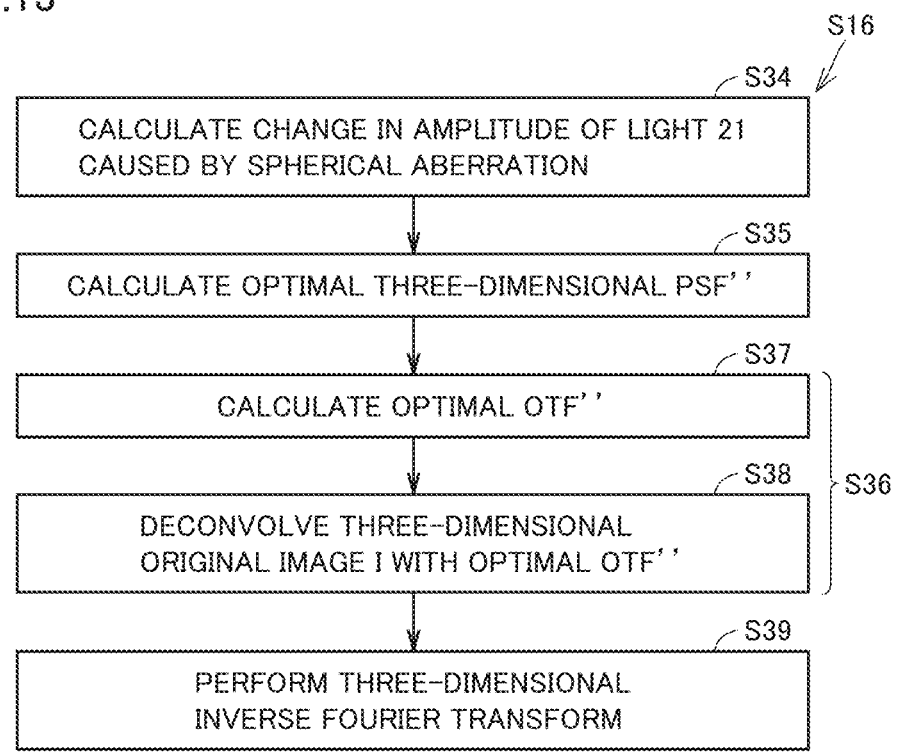
FIG. 13 is a flowchart illustrating a step of calculating a three-dimensional correction image of the first and fourth embodiments.

As illustrated in FIG. 13, step S16 of calculating the three-dimensional correction image includes: step S34 of calculating the change in amplitude of light 21 caused by the spherical aberration; step S35 of calculating the optimal three-dimensional PSF"; step S36 of deconvolving three-dimensional original image I; and step S39 of performing the three-dimensional inverse Fourier transform. Step S36 includes: step S37 of calculating the optimal OTF" from the optimal three-dimensional PSF"; and step S38 of deconvolving the three-dimensional original image I with the normalized optimal OTF".

With reference to FIG. 13, step S34 of calculating the change in amplitude of light 21 caused by the spherical aberration will be described. As illustrated in FIG. 2, when refractive index $n_2$ of sample 12 is smaller than the refractive index of cover glass 14, a part of light 21 is reflected as reflected light 25 at the interface between sample 12 and cover glass 14. Therefore, the amplitude of light 21 changes at the interface between sample 12 and cover glass 14 due to the spherical aberration of observation optical system 10. In step S34, amplitude change calculation unit 46 (see FIG. 9) calculates a change $A_r(u,v)$ in the amplitude of light 21 caused by the reflection on pupil plane 23 of objective lens 16 using an equation (22).

[Mathematical formula 22]

$$A_t(u, v) = \left[\frac{\sin\theta_1(u, v)\cos\theta_2(u, v)}{\sin(\theta_1(u, v) + \theta_2(u, v))}\right]\left[1 + \frac{1}{\cos(\theta_2(u, v) - \theta_1(u, v))}\right] \quad (22)$$

Furthermore, it is known that a phenomenon called compression of the wavefront is generated at the interface between sample 12 and cover glass 14 due to spherical aberration of observation optical system 10 (B. M. Hanser et. al., Journal of Microscopy, 2004, Vol. 216 Part 1, p. 32-48). In step S34, amplitude change calculation unit 46 calculates a change $A_w(u,v)$ in the amplitude of light 21 caused by the compression of the wavefront at pupil plane 23 of objective lens 16 using an equation (23).

[Mathematical formula 23]

$$A_w(u, v) = \frac{n_1 \tan\theta_2(u, v)}{n_2 \tan\theta_1(u, v)} \quad (23)$$

With reference to FIG. 13, step S35 of calculating the optimal three-dimensional PSF" will be described. In the present specification, PSF" means a point spread function in which the provisional optical aberration amount is also included in the amplitude, or a point spread function in which the provisional optical aberration amount is also reflected in the amplitude. Optimal three-dimensional PSF" calculation unit 47 calculates pupil function P"(u,v) using an equation (24). $W_s$, $W_c$, and $W_a$ in the equation (24) are optimal theoretical optical wavefronts $W_s$, $W_c$, and $W_a$ determined in step S29 of steps S13, S14, S15.

[Mathematical formula 24]

$$P''(u, v) = P(u, v)A_t(u, v)A_w(u, v)e^{i\frac{2\pi(W_s(u,v)+W_c(u,v)+W_a(u,v))}{\lambda}} \quad (24)$$

Optimal three-dimensional PSF" calculation unit 47 calculates pupil function P"(u,v,z) corresponding to position z of focal plane 20 using an equation (25).

[Mathematical formula 25]

$$P''(u,v,z) = P''(u,v)e^{iW_d(u,v,z)} \quad (25)$$

Optimal three-dimensional PSF" calculation unit 47 calculates two-dimensional light intensity $PSF_z''(u,v,z)$ at position z of focal plane 20 from pupil function P"(x,y,z) using an equation (26).

[Mathematical formula 26]

$$PSF_z''(x,y,z) = \text{Re}(FT_{2D}^{-1}(P''(u,v,z))FT_{2D}^{-1}(P''(u,v,z))^*) \quad (26)$$

Optimal three-dimensional PSF" calculation unit 47 calculates the optimal three-dimensional PSF"(x,y,z) as the multilayer body (aggregate) of two-dimensional light intensity $PSF_z''$ at the plurality of positions z of focal plane 20.

With reference to FIG. 13, in step S36, deconvolution unit 48 deconvolves three-dimensional original image I. Step S36 includes: step S37 of calculating the optimal OTF"; and step S38 of deconvolving three-dimensional original image I with the optimal OTF".

With reference to FIG. 13, in step S37, deconvolution unit 48 performs the three-dimensional Fourier transform on the optimal three-dimensional PSF" using an equation (27), and calculates the optimal OTF"($k_x,k_y,k_z$) of observation optical system 10 including the change in phase due to the optimal optical aberration amount corresponding to the optimal theoretical optical wavefront and the change in amplitude due to the spherical aberration. The phase of the optimal OTF" includes the optimal optical aberration amount closest to the optical aberration amount of observation optical system 10. The amplitude of the optimal OTF" includes the spherical aberration of observation optical system 10. In the present specification, the OTF" means the optical transfer function in which the amplitude also includes the provisional optical aberration amount, or the optical transfer function in which the amplitude also reflects the provisional optical aberration amount.

[Mathematical formula 27]

$$OTF''(k_x,k_y,k_z)=FT_{3D}(PSF''(x,y,z)) \qquad (27)$$

With reference to FIG. 13, in step S38, deconvolution unit 48 deconvolves three-dimensional original image I with the optimal OTF". Specifically, deconvolution unit 48 calculates frequency distribution $D(k_x,k_y,k_z)$ of three-dimensional original image I by performing three-dimensional Fourier transform on three-dimensional original image I using the equation (15). Deconvolution unit 48 deconvolves frequency distribution D of three-dimensional original image I with the optimal OTF" in the frequency space. For example, frequency distribution D of three-dimensional original image I may be deconvolved with the optimal OTF" by applying a Wiener filter of the optimal OTF" to frequency distribution D of three-dimensional original image I using an equation (28). In the equation (28), w is a constant. Thus, frequency distribution $D''(k_x,k_y,k_z)$ of three-dimensional original image I is calculated. The optimal optical aberration amount closest to the optical aberration amount of observation optical system 10 is removed from the phase of frequency distribution D" of three-dimensional original image I. The spherical aberration is removed from the amplitude of frequency distribution D" of three-dimensional original image I.

[Mathematical formula 28]

$$D''(k_x, k_y, k_z) = \begin{cases} \dfrac{D(k_x, k_y, k_z)}{OTF''(k_x, k_y, k_z) + w}, & k_x < k_{xmax}, k_y < k_{ymax}, \text{ and } k_z < k_{zmax} \\ 0, & k_x \geq k_{xmax}, k_y \geq k_{ymax}, \text{ or } k_z \geq k_{zmax} \end{cases} \qquad (28)$$

The deconvolution method in step S38 is not particularly limited, and for example, the deconvolution may be performed by applying the inverse filter of the optimal OTF" to three-dimensional Fourier transform D of three-dimensional original image I. In order to avoid the artifact, the deconvolution is performed only in the frequency space within cutoff frequencies $k_{xmax}$, $k_{ymax}$, $k_{zmax}$ of the optical transfer function (OTF) of observation optical system 10 as illustrated in the equation (28).

With reference to FIG. 13, in step S39, three-dimensional inverse Fourier transform unit 49 performs three-dimensional inverse Fourier transform on frequency distribution D" of three-dimensional original image I using an equation (29). In this way, three-dimensional correction image I"(x, y,z) in which the optical aberration of observation optical system 10 is removed or reduced is calculated.

[Mathematical formula 29]

$$I''(x,y,z)=FT_{3D}^{-1}(D''(k_x,k_y,k_z)) \qquad (29)$$

<Optical Wavefront Estimation Method>

Figure 21:
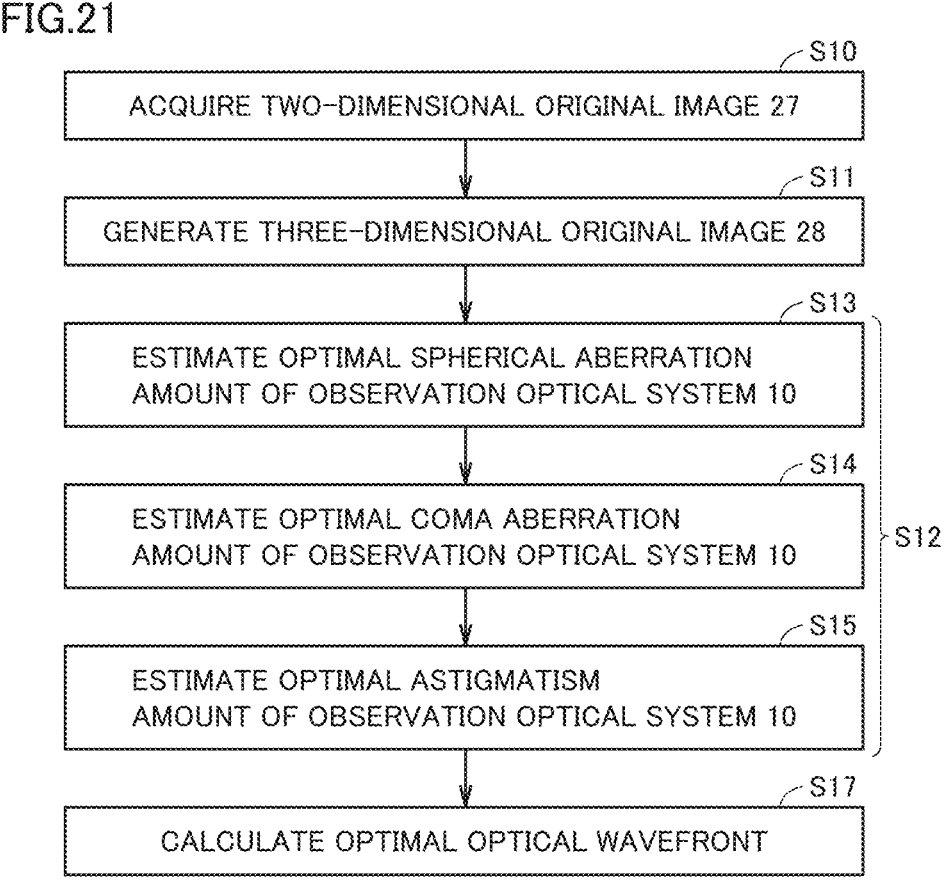
FIG. 21 is a schematic diagram illustrating a flowchart of an optical wavefront estimation method of the first and fourth embodiments.

With reference to FIG. 21, a method for estimating optical wavefront 22 of the first embodiment will be described. Optical wavefront 22 is specifically the optical wavefront of light 21 at pupil plane 23 (back focal plane) of objective lens 16. Defocused wavefront $W_d$ is zero at pupil plane 23 (rear focal plane) of objective lens 16. The method for estimating optical wavefront 22 of the first embodiment includes step S12 of estimating the optical aberration amount of observation optical system 10 and step S17 of calculating the optimal optical wavefront most approximate to optical wavefront 22. The optimal optical wavefront at pupil plane 23 (back focal plane) of objective lens 16 is most approximate to optical wavefront 22 at pupil plane 23 (back focal plane) of objective lens 16 in terms of the optical aberration amount (for example, the spherical aberration amount, the coma aberration amount, and the astigmatism amount) of observation optical system 10. In step S17 of generating the optimal optical wavefront, optical wavefront estimation unit 34 (see FIGS. 5 and 7) calculates the optimal optical wavefront in pupil plane 23 (back focal plane) of objective lens 16 using optimal theoretical optical wavefronts $W_s$, $W_c$, $W_a$ determined in step S29 of step S12 and an equation (30).

[Mathematical formula 30]

$$e^{j\frac{2\pi(W_s(u,v)+W_c(u,v)+W_a(u,v))}{\lambda}} \qquad (30)$$

Example 1

Figure 22:
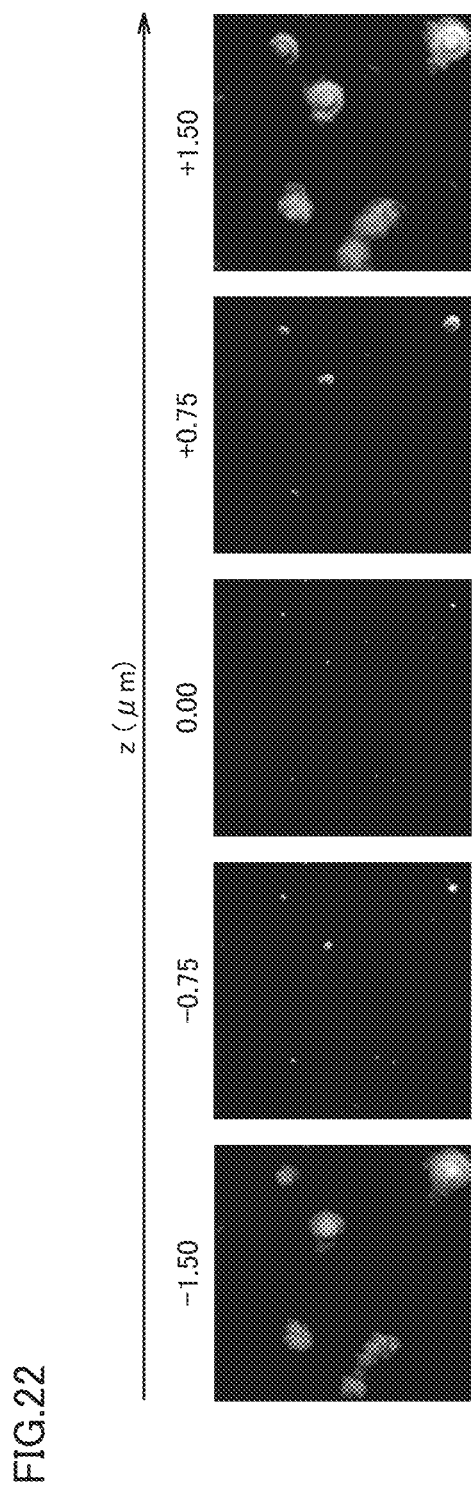
FIG. 22 is a view illustrating a three-dimensional original image of Example 1 and Example 2.
Figure 23:
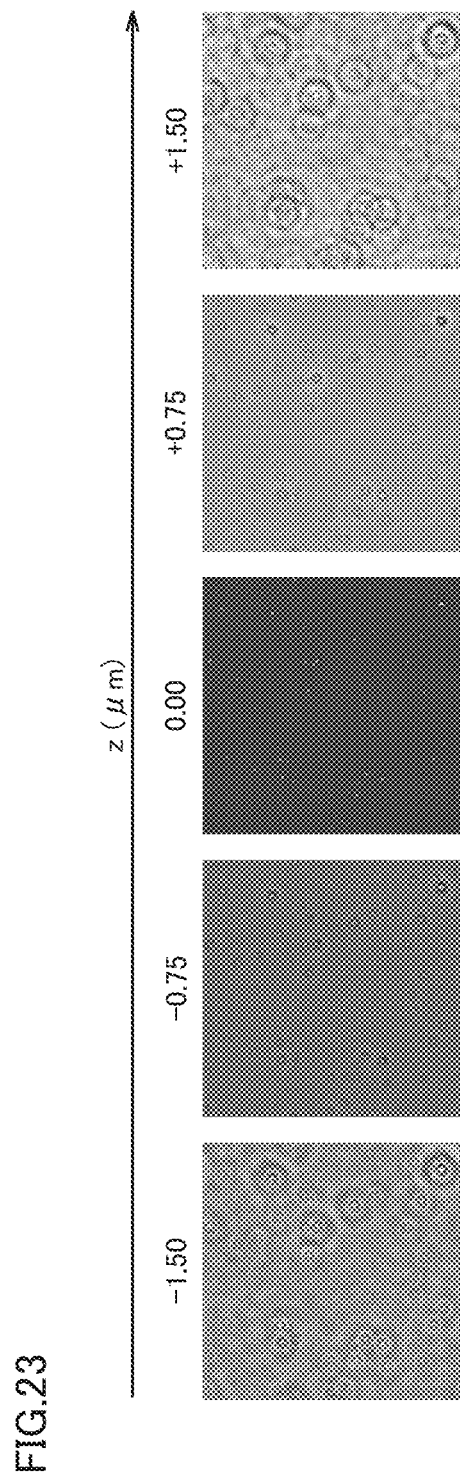
FIG. 23 is a view illustrating a three-dimensional correction image of Example 1.

With reference to FIGS. 22 and 23, Example 1 that is an example of the first embodiment will be described. In Example 1, microscope 2 is a fluorescence microscope. Three-dimensional object 12a included in sample 12 is a fluorescent bead having a diameter of 0.10 μm. Light 21 is fluorescence emitted from the fluorescent bead. Because the diameter of the fluorescent bead is smaller than a diffraction limit of observation optical system 10, the fluorescent bead can be regarded as a point light source in observation optical system 10.

In the three-dimensional correction image in FIG. 23, the image of z=0 is clearer than the three-dimensional original image I in FIG. 22, and the image is rapidly blurred when deviating from z=0. The three-dimensional correction image in FIG. 23 is similar to three-dimensional original image I in FIG. 22 in the way the image is blurred when shifted from z=0 in the +z-direction and the way the image is blurred when shifted from z=0 in the −z-direction. Accordingly, it can be seen that the optical aberration of observation optical system 10 is removed or reduced in the three-dimensional correction image in FIG. 23 as compared with three-dimensional original image I in FIG. 22.

Figure 24:
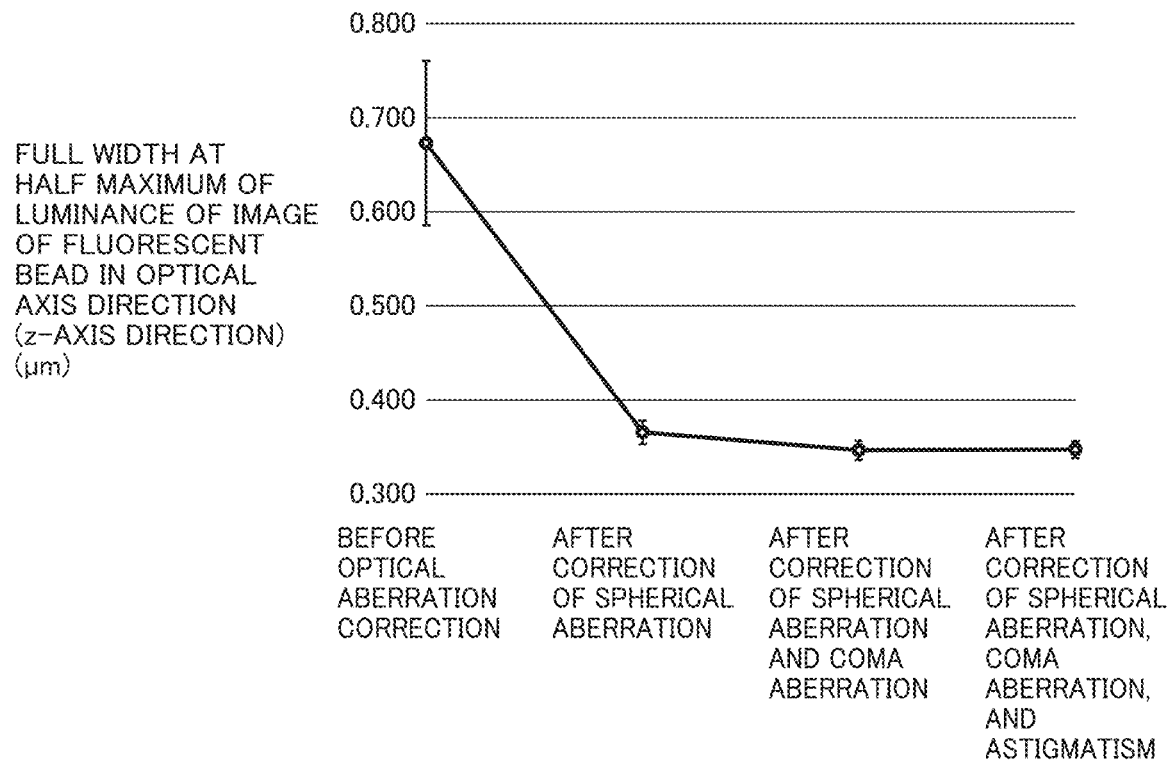
FIG. 24 is a view illustrating a change in full width at half maximum of luminance of the image of a fluorescent bead in an optical axis direction (z-axis direction) before and after optical aberration correction of Example 1.
Figure 25:
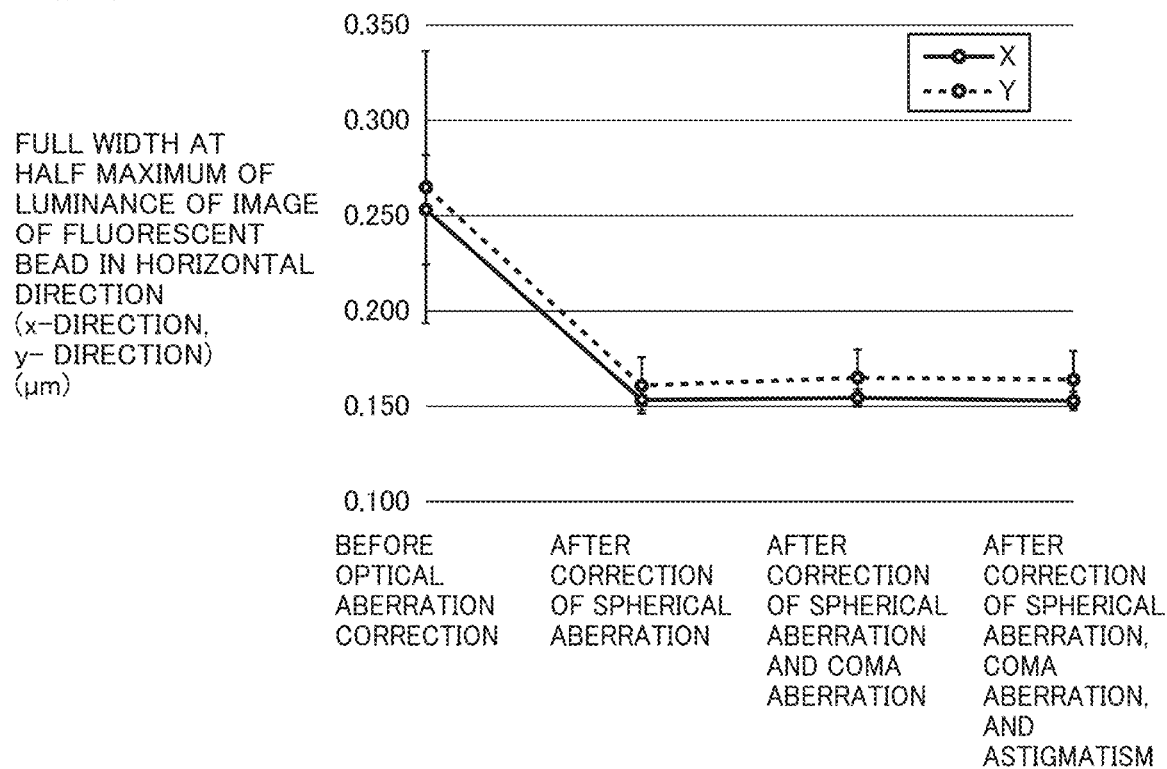
FIG. 25 is a view illustrating a change in full width at half maximum of the luminance of the image of the fluorescent bead in a horizontal direction (an x-axis direction and a y-axis direction) perpendicular to the optical axis direction before and after the optical aberration correction of Example 1.

Specifically, with reference to FIGS. 24 and 25, the full width at half maximum of the luminance of the image of the fluorescent bead is reduced by performing step S13 of estimating the optimal spherical aberration amount of observation optical system 10 and step S16 of calculating the three-dimensional correction image. The full width at half maximum of the luminance of the image of the fluorescent bead is reduced by performing step S14 of estimating the optimal coma aberration amount of observation optical system 10 and step S16 of calculating the three-dimensional correction image. The full width at half maximum of the luminance of the image of the fluorescent bead is reduced by performing step S15 of estimating the optimal astigmatism amount of observation optical system 10 and step S16 of calculating the three-dimensional correction image. The quality of the three-dimensional correction image is improved more than the quality of three-dimensional original image I.

(Modification of First Embodiment)

In a first modification of the first embodiment, at least one of step S13 of estimating the optimal spherical aberration amount of observation optical system 10, step S14 of estimating the optimal coma aberration amount of observation optical system 10, and step S15 of estimating the optimal astigmatism amount of observation optical system 10 may be performed in step S12 of estimating the optical aberration amount of observation optical system 10.

In a second modification of the first embodiment, at least two of step S13 of estimating the optimal spherical aberration amount of observation optical system 10, step S14 of estimating the optimal coma aberration amount of observation optical system 10, and step S15 of estimating the optimal astigmatism amount of observation optical system 10 may be performed in step S12 of estimating the optical aberration amount of observation optical system 10. Specifically, step S13 of estimating the optimal spherical aberration amount of observation optical system 10, and at least one of step S14 of estimating the optimal coma aberration amount of observation optical system 10 or step S15 of estimating the optimal astigmatism amount of observation optical system 10 may be performed in step S12 of estimating the optical aberration amount of observation optical system 10.

Figure 26:
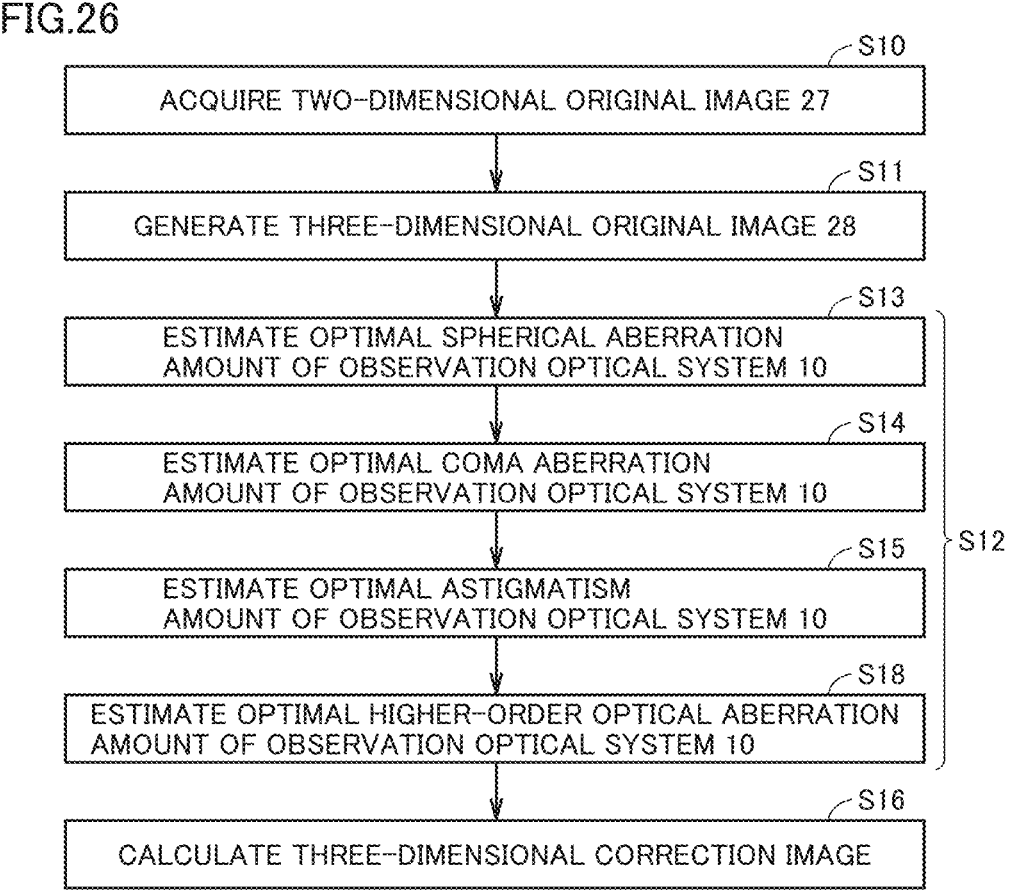
FIG. 26 is a flowchart illustrating an optical aberration correction method according to a third modification of the first and second embodiments.

With reference to FIG. 26, a third modification of the first embodiment will be described. The optical aberration of observation optical system 10 includes not only the optical aberration of objective lens 16 but also the optical aberration caused by sample 12. Therefore, the optical aberration of observation optical system 10 includes optical aberrations more complicated than the Seidel optical aberration (the higher-order optical aberration than the Seidel optical aberration). In the third modification of the first embodiment, in order to remove or reduce the optical aberration more complicated than the Seidel optical aberration (higher-order optical aberration than the Seidel optical aberrations), step S12 of estimating the optical aberration amount of observation optical system 10 further includes step S18 of estimating the optimal higher-order optical aberration amount of observation optical system 10 in addition to steps S13, S14, and S15.

Step S18 of estimating the optimal higher-order optical aberration amount of observation optical system 10 is basically similar to step S13 of estimating the optimal spherical aberration amount of observation optical system 10, but the spherical aberration is replaced with the higher-order optical aberration in the above description of step S13, and is different in the following points.

With reference to FIG. 11, in step S22 of generating the optical wavefront in step S18, theoretical optical wavefront generation unit 40 generates a theoretical optical wavefront $W_{ze}(u,v)$ suffering from the provisional higher-order optical aberration of observation optical system 10 at pupil coordinates (u,v) of pupil plane 23 (back focal plane) of objective lens 16 using an equation (31). Theoretical optical wavefront $W_{ze}(u,v)$ is the wavefront of light 21 that is output from bright spot 13 (see FIG. 2) in sample 12 and suffers from the provisional higher-order optical aberration amount set in step S21 of step S18. $Z_j$ represents a Zernike polynomial in an expansion mode j. For example, the Zernike polynomial may be a standard Zernike polynomial or a Fringe Zernike polynomial. $M_j$ represents an amplitude of deployment mode j. $M_j$ is an unknown constant. The provisional higher-order optical aberration amount of observation optical system 10 from which theoretical optical wavefront $W_ze$ suffers can be set by setting $M_j$ to an arbitrary value. The provisional higher-order optical aberration amount of observation optical system 10 from which theoretical optical wavefront $W_ze$ suffers can change by changing $M_j$.

[Mathematical formula 31]

$$W_{ze}(u, v) = \sum_j M_j Z_j(u, v) \quad (31)$$

With reference to FIG. 11, in step S23 of step S18, theoretical optical wavefront generation unit 40 calculates pupil function P'(u,v) including the provisional optical aberration amount (provisional higher-order optical aberration amount) of observation optical system 10 using an equation (32). $W_s$, $W_c$, $W_a$ in an equation (32) are optimal theoretical optical wavefronts $W_s$, $W_c$, $W_a$ determined in step S29 of steps S13, S14, S15.

[Mathematical formula 32]

$$P'(u, v) = P(u, v) e^{i \frac{2\pi(W_s(u,v) + W_c(u,v) + W_a(u,v) + W_{ze}(u,v))}{\lambda}} \quad (32)$$

With reference to FIG. 11, in step 26 of step 18, computer 3 determines whether the theoretical three-dimensional PSF' and three-dimensional phase-modulated image I' are generated for all of the plurality of provisional optical aberration amounts (higher-order optical aberration amounts). When the generation of the theoretical three-dimensional PSF' and three-dimensional phase-modulated image I' is not yet completed for all of the plurality of provisional optical aberration amounts (provisional higher-order optical aberration amounts), steps S22 to S26 are repeatedly performed while the provisional optical aberration amount (provisional higher-order optical aberration amount) is changed. For example, the provisional higher-order optical aberration amount can be changed by changing the value of $M_j$. In this way, the theoretical three-dimensional PSF' and three-dimensional phase-modulated image I' are generated for all of the plurality of provisional optical aberration amounts (provisional higher-order optical aberration amounts).

With reference to FIG. 11, in step S28 of step S18, the optimal theoretical three-dimensional PSF' determination unit 44 (see FIG. 8) determines the optimal theoretical three-dimensional PSF' from the plurality of theoretical three-dimensional PSF's based on the indices of the luminance values of the plurality of three-dimensional phase-modulated images I'. The optimal theoretical three-dimensional PSF' includes the optimal optical aberration amount (optimal higher-order optical aberration amount) closest to the optical aberration amount (higher-order optical aberration amount) of observation optical system 10 in the plurality of theoretical three-dimensional PSF's. The optimal theoretical three-dimensional PSF' is most approximate to the three-dimensional point spread function of observation optical system 10 in the plurality of theoretical three-dimensional PSF's in terms of the optical aberration amount (higher-order optical aberration amount) of observation optical system 10. Specifically, optimal theoretical three-dimensional PSF' determination unit 44 determines the theoretical three-dimensional PSF' corresponding to three-dimensional phase-modulated image I' having the maximum index of the luminance value as the optimal theoretical three-dimensional PSF'.

With reference to FIG. 11, in step S29 of step S18, optimal theoretical optical wavefront determination unit 45 (see FIG.

8) determines optimal theoretical optical wavefront $W_{ze}$ corresponding to the optimal theoretical three-dimensional PSF'. Optimal theoretical optical wavefront $W_{ze}$ is the optical wavefront suffering from the optimal optical aberration amount (optimal higher-order optical aberration amount) closest to the optical aberration amount (higher-order optical aberration amount) of observation optical system 10. Optimal theoretical optical wavefront $W_{ze}$ is most approximate to optical wavefront 22 in terms of the amount of optical aberration (higher-order optical aberration amount) of observation optical system 10. Specifically, optimal theoretical optical wavefront determination unit 45 determines optimal theoretical optical wavefront $W_{ze}$ corresponding to the optimal theoretical three-dimensional PSF' from the equation (31) or the like.

In step S35 of the third modification of the first embodiment, optimal three-dimensional PSF" calculation unit 47 (see FIG. 9) calculates the pupil function P"(u,v) using an equation (33). $W_s$, $W_c$, $W_a$, $W_{ze}$ in the equation (33) are optimal theoretical optical wavefronts $W_s$, $W_c$, $W_a$, $W_{ze}$ determined in steps S13, S14, S15, S18, S29.

[Mathematical formula 33]

$$P''(u, v) = P(u, v)A_t(u, v)A_w(u, v)e^{i\frac{2\pi(W_s(u,v)+W_c(u,v)+W_a(u,v)+W_{ze}(u,v))}{\lambda}} \quad [33]$$

In step S17 of the third modification of the first embodiment, optical wavefront estimation unit 34 (see FIGS. 5 and 7) calculates the optimal optical wavefront most approximate to optical wavefront 22 using optimal theoretical optical wavefronts $W_s$, $W_c$, $W_a$, $W_{ze}$ determined in steps S13, S14, S15, S18, S29 and an equation (34).

[Mathematical formula 34]

$$e^{i\frac{2\pi(W_s(u,v)+W_c(u,v)+W_a(u,v)+W_{ze}(u,v))}{\lambda}} \quad (34)$$

The advantageous effect of a fourth modification of the first embodiment will be described below. The optical wavefront suffering from the Seidel optical aberration can also be expressed using the Zernike polynomial. Accordingly, in the fourth modification of the first embodiment, the optical wavefront is expressed using only the Zernike polynomial. In the fourth modification of the first embodiment, step S12 of estimating the optical aberration of observation optical system 10 does not include steps S13, S14, S15, but includes step S18 (however, the "higher-order optical aberration" in step S18 is replaced with the "optical aberration").

In the fourth modification of the first embodiment, in step S23 of step S18, theoretical optical wavefront generation unit 40 calculates pupil function P'(u,v) using the equation (32). In step S35 of the fourth modification of the first embodiment, theoretical optical wavefront generation unit 40 calculates pupil function P"(u,v) using the equation (33). In step S17 of the fourth modification of the first embodiment, optical wavefront estimation unit 34 generates the optimal optical wavefront using the equation (34). However, in the fourth modification of the first embodiment, $W_s$, $W_c$, and $W_a$ are zero.

Figure 27:
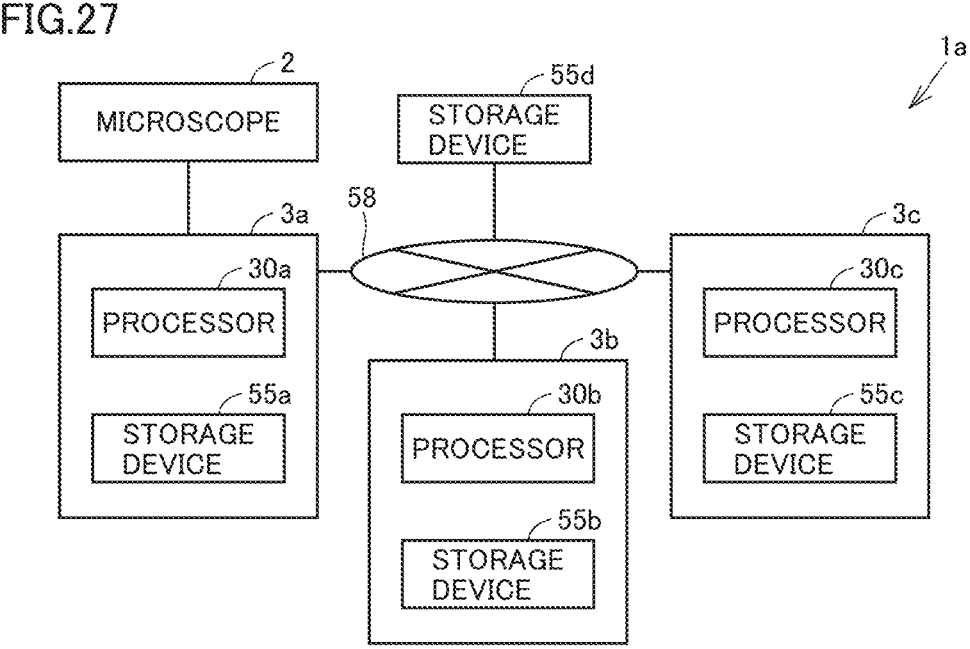
FIG. 27 is a schematic view illustrating a microscope system of a fifth modification of the first and second embodiments.

With reference to FIG. 27, in a microscope system 1a of a fifth modification of the first embodiment, the function of computer 3 of the first embodiment may be distributed and implemented in computers 3a, 3b, 3c and a storage device 55d communicably connected to each other through a network 58 such as the Internet. Computer 3a includes a processor 30a and a storage device 55a. Computer 3b includes a processor 30b and a storage device 55b. Computer 3c includes a processor 30c and a storage device 55c.

Specifically, storage device 55a stores the microscope control program of the first embodiment. Processor 30a executes the microscope control program. Computer 3a functions as microscope control unit 31 (see FIG. 5) and three-dimensional original image generation unit 32. Computer 3a is the controller of microscope 2. Computer 3a outputs two-dimensional original image 27 (see FIG. 4) of sample 12 (three-dimensional object 12a) or three-dimensional original image 28 (see FIG. 4) of sample 12 (three-dimensional object 12a) to at least one of storage devices 55a, 55b, 55c, 55d. Two-dimensional original image 27 (see FIG. 4) of sample 12 (three-dimensional object 12a) or three-dimensional original image 28 (see FIG. 4) of sample 12 (three-dimensional object 12a) is stored in at least one of storage devices 55a, 55b, 55c, 55d.

Storage device 55b stores the optical aberration correction program of the first embodiment. Processor 30b executes the optical aberration correction program. Computer 3b functions as the optical aberration correction unit 33. Computer 3b is an optical aberration correction device. Computer 3b outputs the three-dimensional correction image of sample 12 (three-dimensional object 12a) to at least one of storage devices 55b, 55d. Three-dimensional correction image of sample 12 (three-dimensional object 12a) is stored in at least one of storage devices 55b, 55d.

Storage device 55c stores the optical wavefront estimation program of the first embodiment. Processor 30c executes the optical wavefront estimation program. Computer 3c functions as optical wavefront estimation unit 34. Computer 3c is an optical wavefront estimation device. Computer 3c outputs the estimated optical wavefront (optimal optical wavefront most approximate to optical wavefront 22) to at least one of storage devices 55c, 55d. The estimated optical wavefront (optimal optical wavefront most approximate to optical wavefront 22) is stored in at least one of storage devices 55c, 55d.

In microscope system 1a of the fifth modification of the first embodiment, the functions of computer 3b and computer 3c may be implemented in one computer.

In a sixth modification of the first embodiment, the three-dimensional original image used to determine the optimal theoretical three-dimensional point spread function (optimal theoretical three-dimensional PSF') may be different from three-dimensional original image 28 of sample 12 corrected in the step of calculating the three-dimensional correction image (for example, steps S38, S39). The three-dimensional original image used to determine the optimal theoretical three-dimensional point spread function (optimal theoretical three-dimensional PSF') may be entire three-dimensional original image 28 of sample 12 obtained by microscope system 1, 1a, or may be the three-dimensional image of a partial region of sample 12 obtained by microscope system 1, 1a. However, the three-dimensional original image corrected in the step (for example, steps S38, S39) of calculating the three-dimensional correction image is common to three-dimensional original image 28 of sample 12 used in the step (for example, step S12) of determining the optimal theoretical three-dimensional point spread function (optimal theoretical three-dimensional PSF') in that the three-dimensional original image is obtained through observation optical system 10 and includes the optical aberration of observation optical system 10.

For example, three-dimensional original image 28 of sample 12 used in the step (for example, step S12) of determining the optimal theoretical three-dimensional point spread function (optimal theoretical three-dimensional PSF') may be the three-dimensional test original image of a test sample such as the fluorescent bead obtained through observation optical system 10, and the three-dimensional original image corrected in the step (for example, steps S38, S39) of calculating the three-dimensional correction image may be the three-dimensional original image of a sample such as a cell obtained through observation optical system 10. In another example, three-dimensional original image 28 of sample 12 used in the step (for example, step S12) of determining the optimal theoretical three-dimensional point spread function (optimal theoretical three-dimensional PSF') may be the three-dimensional original image of a partial region of sample 12 obtained through observation optical system 10, and the three-dimensional original image corrected in the step (for example, steps S38, S39) of calculating the three-dimensional correction image may be three-dimensional original image 28 of entire sample 12 obtained through observation optical system 10.

Effects of the first embodiment will be described.

The optical aberration correction program of the first embodiment causes computer 3 to execute the steps of: obtaining (for example, steps S26, S31) phases of a plurality of provisional optical transfer functions of the optical system (observation optical system 10) respectively corresponding to a plurality of provisional optical aberration amounts of the optical system (phase $OTF_p'$ of theoretical OTF'); generating the plurality of three-dimensional phase-modulated images I' by deconvolving three-dimensional original image 28 of sample 12 including the optical aberration of the optical system with each of the phases of the plurality of provisional optical transfer functions (for example, steps S25, S26, S32); obtaining (for example, step S28) the optimal theoretical three-dimensional point spread function (optimal theoretical three-dimensional PSF') that is most approximate to the three-dimensional point spread function of the optical system based on indices of luminance values of the plurality of three-dimensional phase-modulated images I', calculating (for example, steps S34, S35, S37) the optimal optical transfer function (optimal OTF") of the optical system corresponding to the optimal theoretical three-dimensional point spread function, and calculating (for example, steps S38, S39) the three-dimensional correction image by deconvolving, with the optimal optical transfer function, three-dimensional original image 28 of sample 12 or another three-dimensional original image that includes optical aberration of the optical system (observation optical system 10) and is different from three-dimensional original image 28 of sample 12.

An optical aberration correction method of the first embodiment includes: obtaining (for example, steps S26, S31) phases (phase $OTF_p'$ of theoretical OTF') of the plurality of provisional optical transfer functions of the optical system respectively corresponding to the plurality of provisional optical aberration amounts of the optical system (observation optical system 10); generating a plurality of three-dimensional phase-modulated images I' by deconvolving three-dimensional original image 28 of sample 12 including the optical aberration of the optical system with each of the phases of the plurality of provisional optical transfer functions (for example, steps S25, S26, S32); obtaining (for example, step S28) the optimal theoretical three-dimensional point spread function (optimal theoretical three-dimensional PSF') that is most approximate to the three-dimensional point spread function of the optical system based on indices of the luminance values of the plurality of three-dimensional phase-modulated images I'; calculating the optimal optical transfer function (optimal OTF") of the optical system corresponding to the optimal theoretical three-dimensional point spread function; and calculating the three-dimensional correction image by deconvolving (for example, steps S38, S39) three-dimensional original image 28 of sample 12 or another three-dimensional original image which includes the optical aberration of the optical system (observation optical system 10) and is different from three-dimensional original image 28 of sample 12 with the optimal optical transfer function.

In the first embodiment, the luminance distribution of sample 12 and the PSF of the optical system (observation optical system 10) are not alternately and sequentially and iteratively calculated. Consequently, the three-dimensional correction image in which the optical aberration of the optical system is removed or reduced can be calculated in a shorter time. In addition, in the first embodiment, the optimal theoretical three-dimensional point spread function (optimal theoretical three-dimensional PSF') most approximate to the three-dimensional point spread function of the optical system is obtained based on the indices of the luminance values of the plurality of three-dimensional phase-modulated images I'. Accordingly, the more accurate optimal theoretical three-dimensional point spread function can be obtained. The three-dimensional correction image in which the optical aberration of the optical system is removed or reduced can be calculated with higher accuracy.

In the optical aberration correction program and the optical aberration correction method of the first embodiment, obtaining the optimal theoretical three-dimensional point spread function (optimal theoretical three-dimensional PSF') is the determining the optimal theoretical three-dimensional point spread function from the plurality of theoretical three-dimensional point spread functions of the optical system based on the indices of the luminance values of the plurality of three-dimensional phase-modulated images (for example, step S28). Each of the plurality of theoretical three-dimensional point spread functions includes a corresponding one of the plurality of provisional optical aberration amounts.

In the first embodiment, the luminance distribution of sample 12 and the PSF of the optical system (observation optical system 10) are not alternately and sequentially and iteratively calculated. Consequently, the three-dimensional correction image in which the optical aberration of the optical system is removed or reduced can be calculated in a shorter time. In addition, in the first embodiment, the optimal theoretical three-dimensional point spread function (optimal theoretical three-dimensional PSF') most approximate to the three-dimensional point spread function of the optical system is determined based on the indices of the luminance values of the plurality of three-dimensional phase-modulated images I'. Therefore, the optimal theoretical three-dimensional point spread function can be more accurately determined from the plurality of theoretical three-dimensional point spread functions. The three-dimensional correction image in which the optical aberration of the optical system is removed or reduced can be calculated with higher accuracy.

In the optical aberration correction program and the optical aberration correction method of the first embodiment, the optimal theoretical three-dimensional point spread function (optimal theoretical three-dimensional PSF') includes at least two of the spherical aberration, the coma aberration, and the astigmatism of the optical system. Accordingly, the three-dimensional correction image in which the optical aberration of the optical system is removed or reduced can be calculated with higher accuracy.

The optical wavefront estimation program of the first embodiment causes computer 3 to execute: obtaining (for example, steps S26, S31) phases of the plurality of provisional optical transfer functions of the optical system (observation optical system 10) respectively corresponding to the plurality of provisional optical aberration amounts of the optical system (the phase OTF$_p$' of the theoretical OTF'); deconvolving the three-dimensional original image 28 of the sample 12 including the optical aberration of the optical system with each of the phases of the plurality of provisional optical transfer functions to generate the plurality of three-dimensional phase-modulated images I' (for example, steps S25, S26, S32); obtaining (for example, step S28) the optimal theoretical three-dimensional point spread function (optimal theoretical three-dimensional PSF') that is most approximate to the three-dimensional point spread function of the optical system based on the indices of luminance values of the plurality of three-dimensional phase-modulated images I'; and calculating (for example, steps S17, S29) the optimal optical wavefront corresponding to the optimal theoretical three-dimensional point spread function.

The optical wavefront estimation method of the first embodiment includes: obtaining (for example, steps S26, S31) phases of the plurality of provisional optical transfer functions of the optical system (observation optical system 10) respectively corresponding to the plurality of provisional optical aberration amounts of the optical system (the phase OTF$_p$' of the theoretical OTF'); deconvolving three-dimensional original image 28 of sample 12 including the optical aberration of the optical system with each of the phases of the plurality of provisional optical transfer functions to generate the plurality of three-dimensional phase-modulated images I' (for example, steps S25, S26, S32); obtaining (for example, step S28) the optimal theoretical three-dimensional point spread function (optimal theoretical three-dimensional PSF') that is most approximate to the three-dimensional point spread function of the optical system based on the indices of luminance values of the plurality of three-dimensional phase-modulated images I'; and calculating (for example, steps S17, S29) the optimal optical wavefront corresponding to the optimal theoretical three-dimensional point spread function.

In the first embodiment, the luminance distribution of sample 12 and the PSF of the optical system (observation optical system 10) are not alternately and sequentially and iteratively calculated. Consequently, optical wavefront 22 suffering from the optical aberration of the optical system can be calculated in a shorter time. In addition, in the first embodiment, the optimal theoretical three-dimensional point spread function (optimal theoretical three-dimensional PSF') most approximate to the three-dimensional point spread function of the optical system is obtained based on the indices of the luminance values of the plurality of three-dimensional phase-modulated images I'. Therefore, the optimal theoretical three-dimensional point spread function can be more accurately obtained from the plurality of theoretical three-dimensional point spread functions. Optical wavefront 22 suffering from the optical aberration of the optical system can be estimated with higher accuracy.

In the optical wavefront estimation program and the optical wavefront estimation method of the first embodiment, the optimal theoretical three-dimensional point spread function (optimal theoretical three-dimensional PSF') includes at least two of the spherical aberration, the coma aberration, and the astigmatism of the optical system. Consequently, optical wavefront 22 suffering from the optical aberration of the optical system can be estimated with higher accuracy.

Second Embodiment

With reference to FIGS. 1 to 8, 10 to 12, and 28 to 32, a second embodiment will be described. The second embodiment is the same as the first embodiment, but aberration-corrected image generation unit 38 (see FIG. 28) and step S36 of deconvolving three-dimensional original image I are different from those in the first embodiment.

Figure 28:
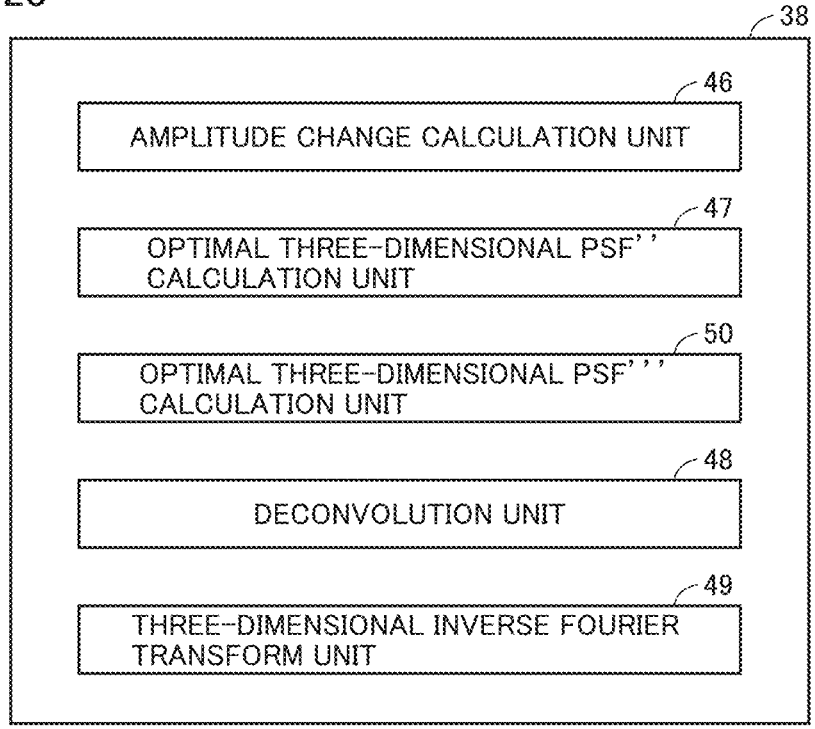
FIG. 28 is a block diagram illustrating a functional configuration of the aberration-corrected image generation unit of the second embodiment.

With reference to FIGS. 1 to 8 and 28, a microscope system 1 of the second embodiment will be described. As illustrated in FIG. 28, in the second embodiment, aberration-corrected image generation unit 38 further includes a normalized optimal three-dimensional PSF''' calculation unit 50. Normalized optimal three-dimensional PSF''' calculation unit 50 performs step S40 (see FIG. 29).

With reference to FIGS. 10 to 12 and 29, an optical aberration correction method of the second embodiment will be described. The optical aberration of observation optical system 10 is mainly reflected in the phase of the optical transfer function (OTF) of observation optical system 10, but also slightly affects the amplitude of the OTF of observation optical system 10 (except for the change in the amplitude of light 21 considered in step S36 of the first embodiment). In the optical aberration correction method of the second embodiment, in step S36 of deconvolving three-dimensional original image I, the influence of the optical aberration of observation optical system 10 on the amplitude of the OTF of the observation optical system (except for the change in the amplitude of light 21 considered in step S36 of the first embodiment) is further removed.

Step S36 of deconvolving three-dimensional original image I includes step S40 of calculating a normalized optimal OTF''' and step S41 of deconvolving three-dimensional original image I with the normalized optimal OTF''' in addition to step S37 of calculating the optimal OTF''.

Figure 29:
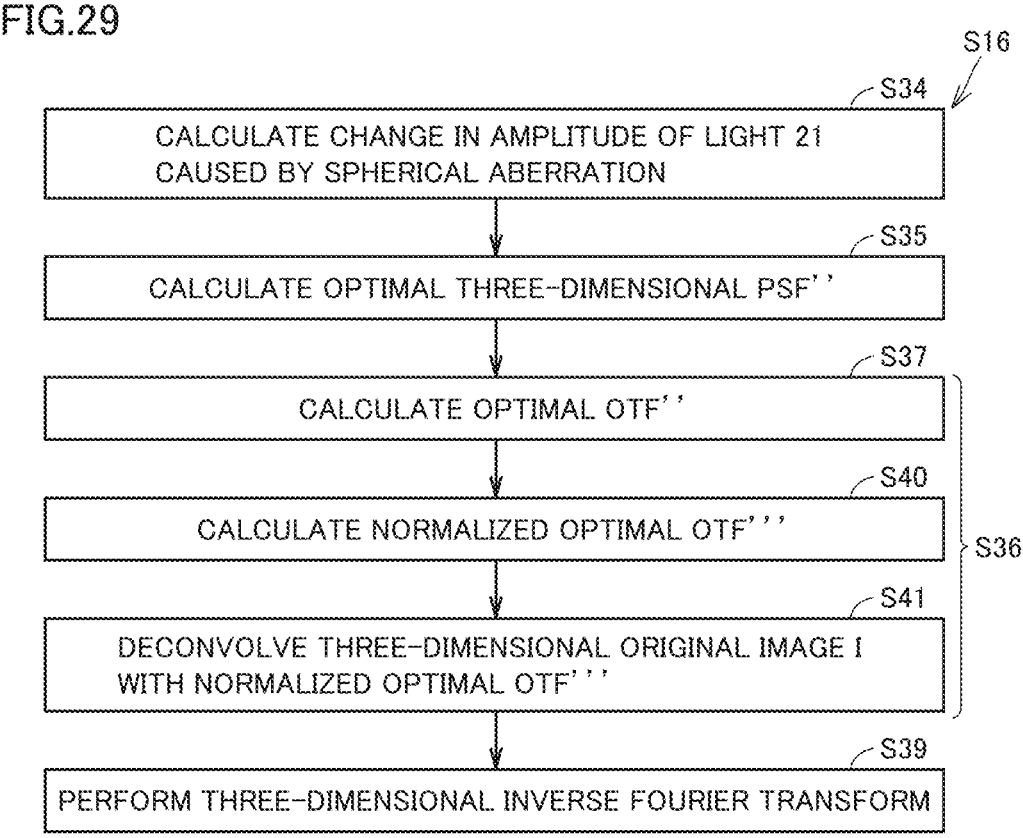
FIG. 29 is a flowchart illustrating a step of calculating a three-dimensional correction image of the second embodiment.

With reference to FIG. 29, in step S40, deconvolution unit 48 (see FIG. 28) normalizes the amplitude of the optimal OTF'' with the amplitude $|FT_{3D}(PSF(x,y,z))|$ of the optical transfer function of observation optical system 10 in the case where there is no optical aberration of observation optical system 10 (in the case of $W_s=W_c=W_a=0$) using an equation (35). Thus, the normalized optimal OTF''' is calculated. By this normalization, only the amplitude and phase change amounts caused by the optimal optical aberration closest to the optical aberration of observation optical system 10 are introduced into the normalized optimal OTF'''.

[Mathematical formula 35]

$$OTF'''(k_x, k_y, k_z) = \frac{OTF''(k_x, k_y, k_z)}{|FT_{3D}(PSF(x, y, z))|} = \frac{|FT_{3D}(PSF''(x, y, z))|}{|FT_{3D}(PSF(x, y, z))|} e^{i\arg[FT_{3D}(PSF''(x,y,z))]} \qquad (35)$$

With reference to FIG. 29, in step S41, deconvolution unit 48 deconvolves three-dimensional original image I with the normalized optimal OTF'''. Specifically, deconvolution unit 48 calculates frequency distribution $D(k_x,k_y,k_z)$ of three-dimensional original image I by performing three-dimensional Fourier transform on three-dimensional original image I using the equation (15). Deconvolution unit 48 deconvolves frequency distribution D of three-dimensional original image I with the normalized optimal OTF''' in the frequency space. For example, frequency distribution D of three-dimensional original image I may be deconvolved with the normalized optimal OTF''' by applying the inverse filter of the normalized optimal OTF''' to frequency distribution D of three-dimensional original image I using an equation (36). In this way, deconvolution unit 48 calculates a frequency distribution D'''($k_x,k_y,k_z$) of three-dimensional original image I. The optimal optical aberration amount closest to the optical aberration amount of observation optical system 10 is removed from the amplitude and phase of frequency distribution D''' of three-dimensional original image I.

[Mathematical formula 36]

$$D'''(k_x, k_y, k_z) = \begin{cases} \dfrac{D(k_x, k_y, k_z)}{OTF'''(k_x, k_y, k_z)}, & k_x < k_{xmax}, k_y < k_{ymax}, \text{ and } k_z < k_{zmax} \\ 0, & k_x \geq k_{xmax}, k_y \geq k_{ymax}, \text{ or } k_z \geq k_{zmax} \end{cases} \quad (36)$$

The deconvolution method in step S41 is not particularly limited, and for example, deconvolution may be performed by applying a Wiener filter of the normalized optimal OTF''' to three-dimensional Fourier transform D of three-dimensional original image I. In order to avoid artifact, the deconvolution is performed only in the frequency space within cutoff frequencies $k_{xmax}$, $k_{ymax}$, $k_{zmax}$ of optical transfer function (OTF) of observation optical system 10 as illustrated in the equation (36).

With reference to FIG. 29, in step S39, three-dimensional inverse Fourier transform unit 49 (see FIG. 28) performs three-dimensional inverse Fourier transform on frequency distribution D''' of three-dimensional original image I using an equation (37). In this way, a three-dimensional correction image I'''(x,y,z) in which the optical aberration of observation optical system 10 is removed or reduced is calculated.

[Mathematical formula 37]

$$I'''(x,y,z) = FT_{3D}^{-1}(D'''(k_x,k_y,k_z)) \quad (37)$$

The optical aberration correction program of the second embodiment causes computer 3 to execute the optical aberration correction method of the second embodiment.

Example 2

With reference to FIGS. 22 and 30 to 32, Example 2 that is an example of the second embodiment will be described. In Example 2, similarly to Example 1, microscope 2 is a fluorescence microscope, and three-dimensional object 12a included in sample 12 is a fluorescent bead having a diameter of 0.10 µm.

Figure 30:
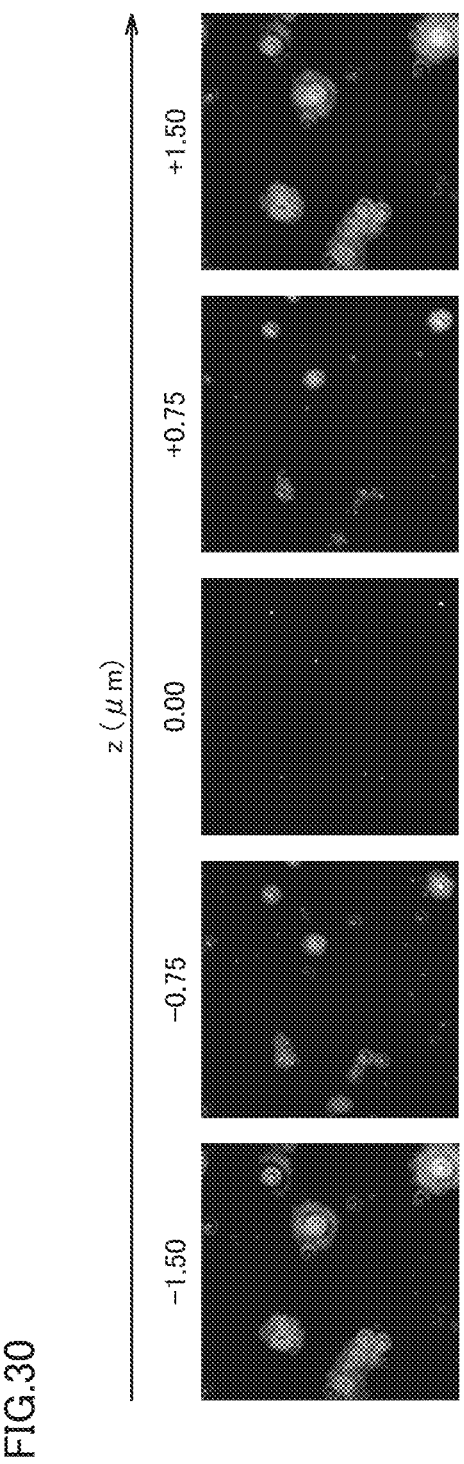
FIG. 30 is a view illustrating a three-dimensional correction image of Example 2.

In the three-dimensional correction image of FIG. 30, the image of z=0 is clearer than the three-dimensional original image in FIG. 22, and the image is blurred rapidly when deviated from z=0. In addition, in the three-dimensional correction image of FIG. 30, the manner of blurring of the image in the case of being shifted from z=0 in the +z-direction and the manner of blurring of the image in the case of being shifted from z=0 in the −z-direction are similar to those of the three-dimensional original image in FIG. 22. Accordingly, it can be seen that the optical aberration of observation optical system 10 is corrected in the three-dimensional correction image of FIG. 30 more than in the three-dimensional original image of FIG. 22.

Figure 31:
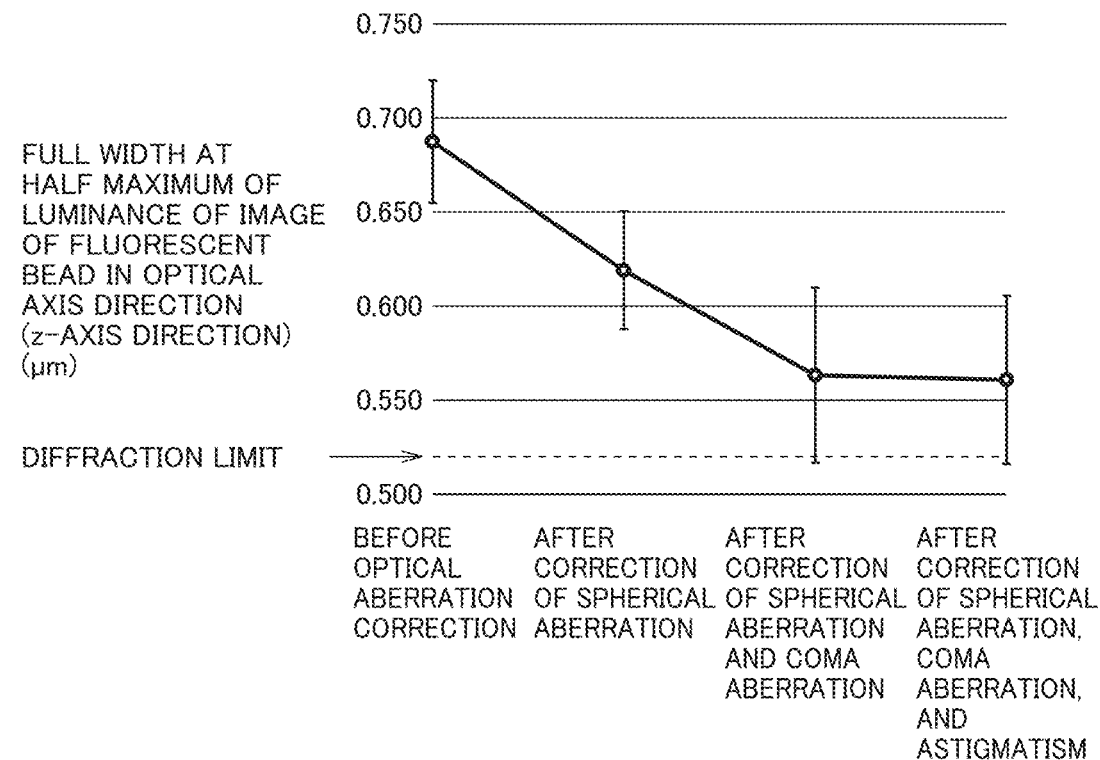
FIG. 31 is a view illustrating a change in full width at half maximum of the luminance of the image of the fluorescent bead in the optical axis direction (z-axis direction) before and after the optical aberration correction of Example 2.
Figure 32:
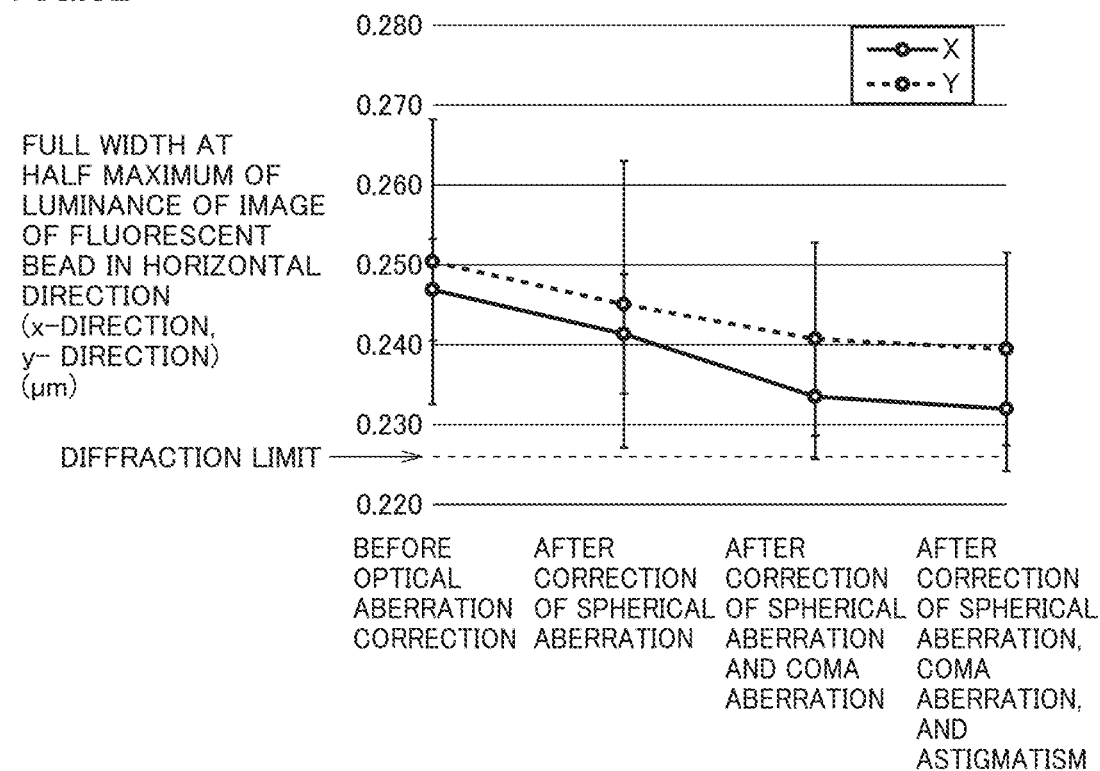
FIG. 32 is a view illustrating a change in full width at half maximum of the luminance of the image of the fluorescent bead in the horizontal direction (the x-axis direction and the y-axis direction) perpendicular to the optical axis direction before and after the optical aberration correction of Example 2.

Specifically, with reference to FIGS. 31 and 32, the full width at half maximum of the luminance of the image of the fluorescent bead is reduced by performing step S13 (see FIG. 10) of estimating the optimal spherical aberration amount of observation optical system 10 and step S16 (see FIG. 10) of calculating the three-dimensional correction image. The full width at half maximum of the luminance of the image of the fluorescent bead is further reduced by performing step S14 (see FIG. 10) of estimating the optimal coma aberration amount of observation optical system 10 and step S16 of calculating the three-dimensional correction image. The full width at half maximum of the luminance of the image of the fluorescent bead is further reduced by performing step S15 (see FIG. 10) of estimating the optimal astigmatism amount of observation optical system 10 and step S16 of calculating the three-dimensional correction image. The quality of the three-dimensional correction image is improved over the quality of the three-dimensional original image and is improved to near the diffraction limit.

The second embodiment has the following effects in addition to the effects of the first embodiment.

In the optical aberration correction program and the optical aberration correction method of the second embodiment, the optimal optical transfer function is normalized by the amplitude of the optical transfer function of the optical system (observation optical system 10) in the case where there is no optical aberration of the optical system (observation optical system 10).

According to the optical aberration correction method and the optical aberration correction program of the second embodiment, the influence of the optical aberration of observation optical system 10 on the luminance of the plurality of three-dimensional correction images can be further reduced or removed. Accordingly, the luminance of the image can be compared in the plurality of three-dimensional correction images. In addition, a degree of correction of the optical aberration of observation optical system 10 (for example, a Strehl ratio) can be quantitatively grasped and the comparison with the diffraction limit of observation optical system 10 can be performed. Consequently, the field of use of the three-dimensional correction image can be expanded.

Third Embodiment

With reference to FIGS. 33 to 37, a microscope system 1b according to a third embodiment will be described. Microscope system 1b of the third embodiment has the same configuration as microscope system 1 of the first embodiment, but is mainly different in that a structured illumination microscope (SIM) 2b is provided instead of microscope 2, and in the functional configuration of computer 3.

Figure 33:
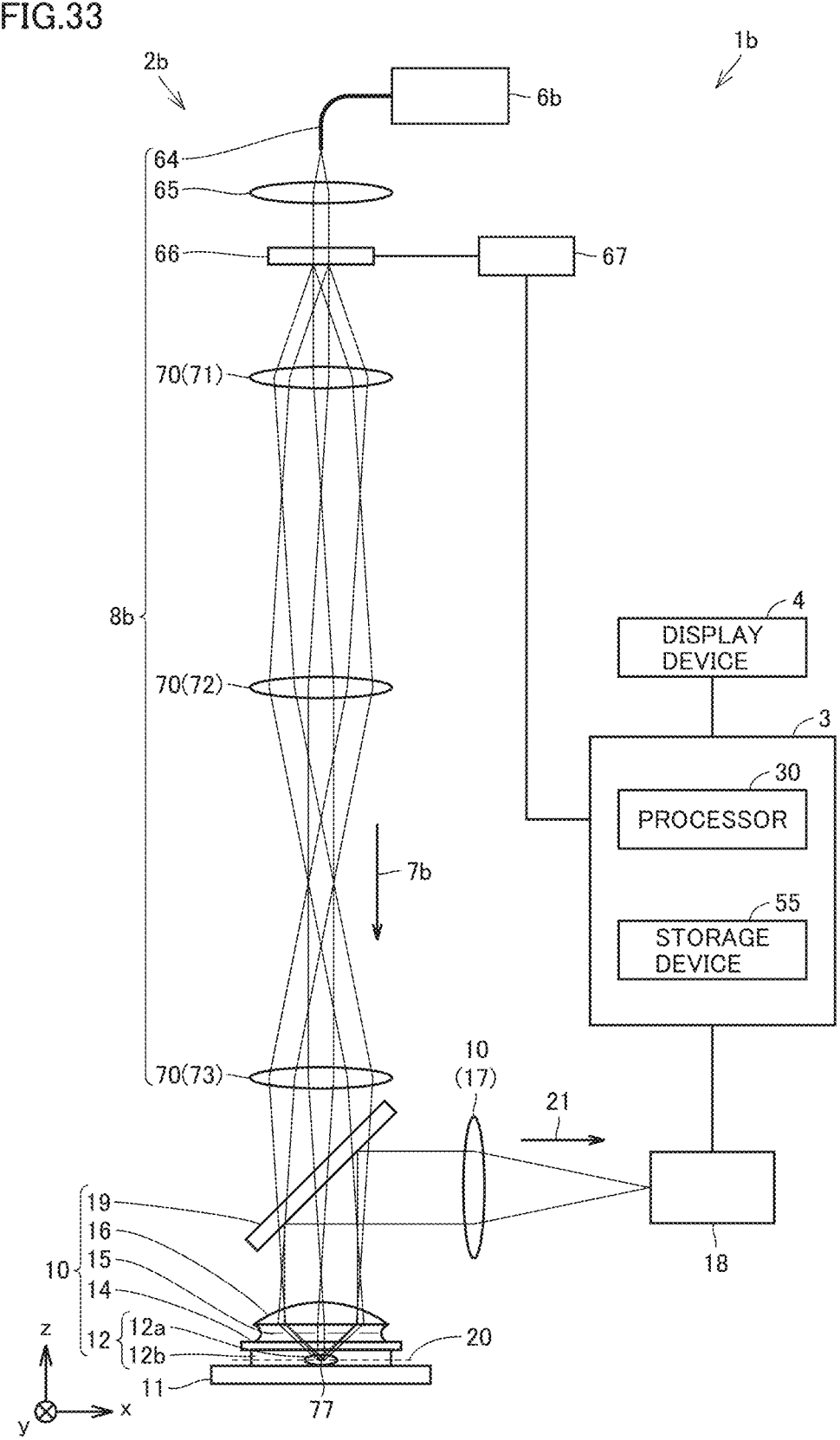
FIG. 33 is a schematic view illustrating a microscope system according to a third embodiment.

With reference to FIG. 33, structured illumination microscope 2b includes the same configuration as that of microscope 2 (see FIGS. 1 and 2) of the first embodiment, but is different from microscope 2 of the first embodiment in the following points. Structured illumination microscope 2b includes an illumination optical system 8b, sample support stage 11, observation optical system 10, imaging device 18, and a drive device 67. Illumination optical system 8b includes a collimator lens 65, an optical branching element 66, and a relay lens 70. Illumination optical system 8b may further include an optical fiber 64. Structured illumination microscope 2b may further include a light source 6b.

Light source 6b outputs illumination light 7b. For example, light source 6b is a semiconductor laser, and illumination light 7b is a laser beam. Illumination light 7b can be absorbed by the fluorescent material labeling three-dimensional object 12a to excite the fluorescent material. Illumination light 7b output from light source 6b is incident on optical fiber 64. Illumination light 7b output from optical fiber 64 is collimated by collimator lens 65 to enter optical branching element 66. For example, optical branching element 66 is a diffraction grating. Light branching element 66 branches illumination light 7b into a plurality of light fluxes. For example, light branching element 66 branches illumination light 7b into 0th-order diffracted light, +1th-order diffracted light, and −1th-order diffracted light. Optical branching element 66 may be a spatial light modulator such as a liquid crystal spatial light modulator.

Figure 35:
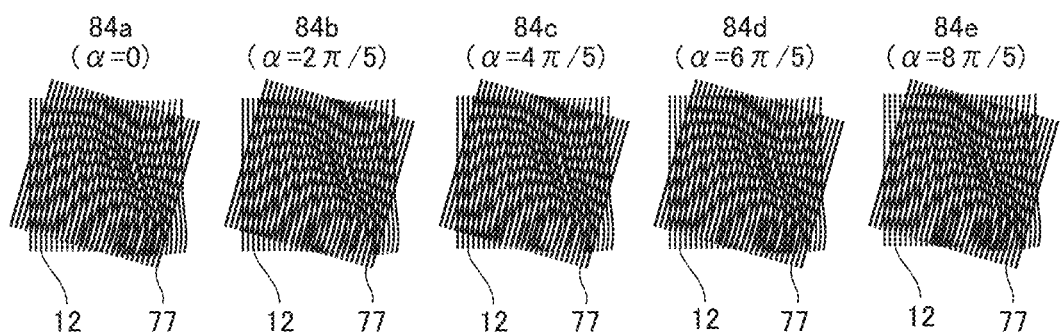
FIG. 35 is a view illustrating an example of a two-dimensional original SIM image of a sample modulated by interference fringes having phases different from each other.

Illumination light 7b is incident on relay lens 70. Relay lens 70 includes a lens 71, a lens 72, and a lens 73. Illumination light 7b is incident on dichroic mirror 19 through relay lens 70. Dichroic mirror 19 transmits illumination light 7b and reflects light 21 (for example, fluorescence) from sample 12 (three-dimensional object 12a). Illumination light 7b enters objective lens 16 through dichroic mirror 19. Objective lens 16 forms focal plane 20 optically conjugate with optical branching element 66 on sample 12 (three-dimensional object 12a). The 0th-order diffracted light, the +1th-order diffracted light, and the −1th-order diffracted light of illumination light 7b interfere with each other to form an interference fringe 77 (or structured illumination light). Sample 12 (three-dimensional object 12a) is irradiated with interference fringes 77 of illumination light 7b. As illustrated in FIG. 35, interference fringes 77 are structured illumination patterns in which linear bright portions and linear dark portions are periodically arranged. In the present specification, a direction in which the bright portion and the dark portion are arranged is referred to as a periodic direction of interference fringes 77.

Specifically, interference fringe 77 includes a 0th-order component (direct-current component) formed only by the 0th-order diffracted light, a first-order component formed by the interference (the interference between the 0th-order diffracted light and the +1th-order diffracted light and the interference between the 0th-order diffracted light and the −1th-order diffracted light) between the 0th-order diffracted light and the ±1th-order diffracted light, and a second-order component formed by the interference between the ±1th-order diffracted light. The 0th-order component of interference fringe 77 has one spatial frequency component (specifically, a spatial frequency of zero) in which order m is zero The first-order component of interference fringe 77 has two spatial frequency components in which order m is ±1. The second-order component of interference fringe 77 has two spatial frequency components in which order m is ±2. Interference fringes 77 include five spatial frequency components (order m=0, ±1, ±2).

The fluorescent material labeling three-dimensional object 12a is excited by the bright portion of interference fringe 77 in sample 12 (three-dimensional object 12a). Light 21 is generated from the excited fluorescent material. Light 21 passes through objective lens 16, is reflected by dichroic mirror 19, and enters imaging lens 17. Imaging lens 17 forms a surface (image surface) optically conjugate with focal plane 20 of objective lens 16 on the imaging surface of imaging device 18. Light 21 enters imaging device 18 through imaging lens 17. Two-dimensional original SIM images 81, 82, 83 (see FIG. 34) of sample 12 (three-dimensional object 12a) are acquired using imaging device 18.

With reference to FIG. 33, drive device 67 is connected to optical branching element 66. Drive device 67 can move optical branching element 66 in a plane (xy-plane) perpendicular to the optical axis (z-axis) of observation optical system 10. When optical branching element 66 is linearly moved using drive device 67, interference fringes 77 can be moved in the periodic direction of interference fringes 77. That is, a phase α of interference fringe 77 can be changed.

Drive device 67 can rotate optical branching element 66 around the optical axis (z-axis) of observation optical system 10. When optical branching element 66 is rotated about the optical axis (z-axis) of observation optical system 10 using drive device 67, an azimuth d (direction of interference fringe 77) of interference fringe 77 can be changed in focal plane 20. For example, drive device 67 is a piezoelectric element or a motor. Drive device 67 is communicably connected to computer 3 and can be controlled using computer 3. When optical branching element 66 is the spatial light modulator, drive device 67 electrically changes the orientation of a pattern formed on the spatial light modulator.

Figure 34:
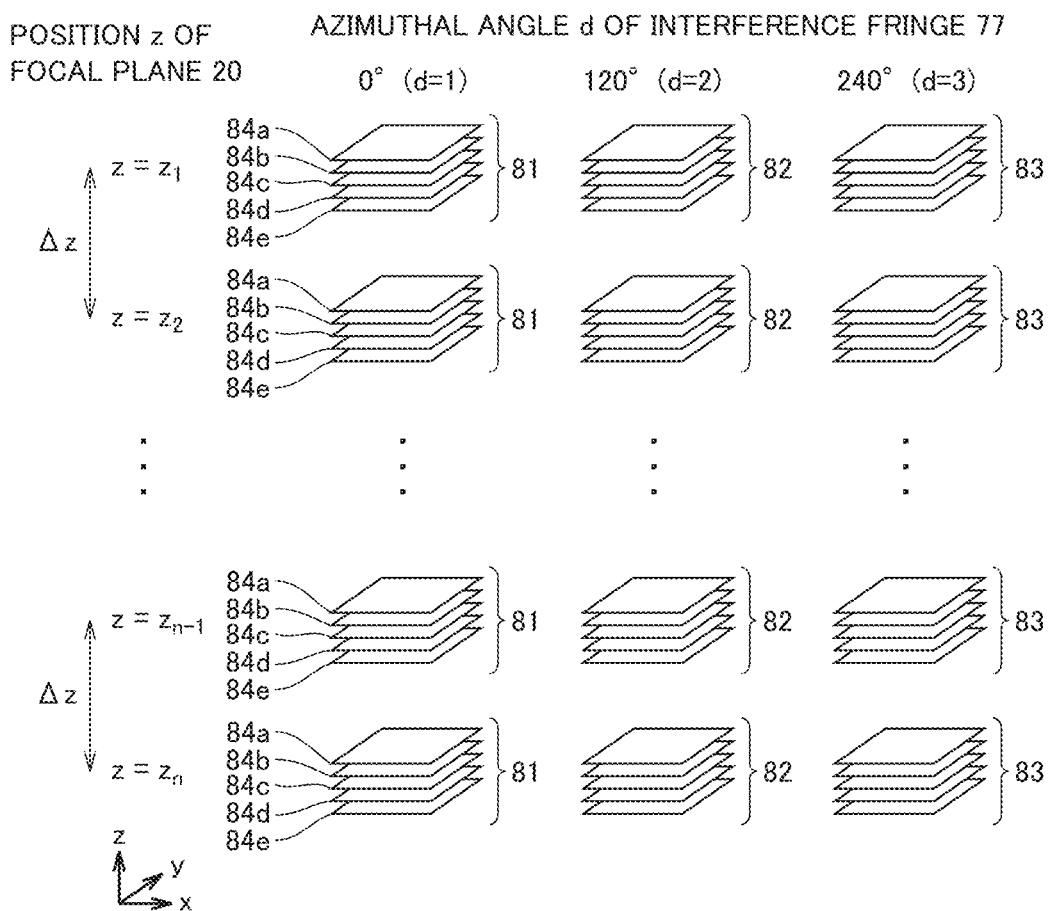
FIG. 34 is a view illustrating a two-dimensional original SIM image obtained by a structured illumination microscope of the third embodiment.

One of sample support stage 11 and objective lens 16 is movable in the optical axis direction (z-axis direction) of observation optical system 10 with respect to the other of sample support stage 11 and objective lens 16. For example, at least one of sample support stage 11 or objective lens 16 is connected to a piezo element or a motor (not illustrated). Using the piezoelectric element or the motor, one of sample support stage 11 and objective lens 16 is moved in the optical axis direction (z-axis direction) of observation optical system 10 with respect to the other of sample support stage 11 and objective lens 16. As illustrated in FIG. 34, sample 12 is imaged at each of the plurality of positions $z_1, z_2, \ldots, z_{n-1}, z_n$ of focal plane 20 while moving focal plane 20 along the optical axis direction (z-axis direction) of observation optical system 10. In this way, two-dimensional original SIM images 81, 82, 83 of sample 12 are acquired at each of the plurality of positions $z_1, z_2, \ldots, z_{n-1}$, and $z_n$ of focal plane 20. Interval Δz between focal planes 20 adjacent to each other preferably satisfies a sampling condition expressed by $\Delta z < 1/(2k_{zmax})$.

Specifically, azimuth d of interference fringe 77 is set by rotating optical branching element 66 about the optical axis (z-axis) of observation optical system 10 using drive device 67. As illustrated in FIG. 34, two-dimensional original SIM images 81, 82, 83 of sample 12 are captured in azimuth d of interference fringe 77. For example, azimuth d of interference fringes 77 includes the azimuth of 0° represented as d=1, the azimuth of 120° represented as d=2, and the azimuth of 240° represented as d=3. For example, the angle (azimuth angle) of azimuth d is defined as an angle of azimuth d with respect to the +x-direction. The number of the azimuths d of interference fringes 77 is not limited to three, and may be plural.

Two-dimensional original SIM image 81 is the image acquired by imaging sample 12 (three-dimensional object 12a) illuminated by interference fringes 77 of azimuth d=1 using imaging device 18. Two-dimensional original SIM image 81 is a moire image of sample 12 modulated by interference fringes 77 of azimuth d=1. Two-dimensional original SIM image 82 is an image acquired by imaging sample 12 (three-dimensional object 12a) illuminated by interference fringes 77 of azimuth d=2 using imaging device 18. Two-dimensional original SIM image 82 of sample 12 is the moire image of sample 12 modulated by interference fringes 77 of azimuth d=2. Two-dimensional original SIM image 83 is an image acquired by imaging sample 12 (three-dimensional object 12a) illuminated by interference fringes 77 of azimuth d=3 using imaging device 18. Two-dimensional original SIM image 83 of sample 12 is the moire image of sample 12 modulated by interference fringes 77 of azimuth d=3.

As illustrated in FIG. 34, two-dimensional original SIM images 84a, 84b, 84c, 84d, 84e of sample 12 are captured for the plurality of phases α of interference fringes 77 in each of the plurality of azimuths d of interference fringes 77. Specifically, two-dimensional original SIM images 84a, 84b, 84c, 84d, 84e of sample 12 are imaged while linearly moving optical branching element 66 using drive device 67 to change phase α of interference fringe 77. As illustrated in FIGS. 34 and 35, each of two-dimensional original SIM images 81, 82, 83 includes two-dimensional original SIM images 84a, 84b, 84c, 84d, 84e.

Two-dimensional original SIM image 84a is the image acquired by imaging sample 12 (three-dimensional object 12a) illuminated by interference fringes 77 of azimuth d and phase α=0 using imaging device 18. Two-dimensional original SIM image 84a is the moire image of sample 12 modulated by interference fringes 77 of azimuth d and phase α=0. Two-dimensional original SIM image 84b is the image acquired by imaging sample 12 (three-dimensional object 12a) illuminated by interference fringes 77 of azimuth d and phase α=2π/5 using imaging device 18. Two-dimensional original SIM image 84b is the moire image of sample 12 modulated by interference fringes 77 of azimuth d and phase α=2π/5. Two-dimensional original SIM image 84c is the image acquired by imaging sample 12 (three-dimensional object 12a) illuminated by interference fringes 77 of azimuth d and phase α=4π/5 using imaging device 18. Two-dimensional original SIM image 84c is the moire image of sample 12 modulated by interference fringes 77 of azimuth d and phase α=4π/5.

Two-dimensional original SIM image 84d is the image acquired by imaging sample 12 (three-dimensional object 12a) illuminated by interference fringes 77 of azimuth d and phase α=6π/5 using imaging device 18. Two-dimensional original SIM image 84d is the moire image of sample 12 modulated by interference fringes 77 of azimuth d and phase α=6π/5. Two-dimensional original SIM image 84e is the image acquired by imaging sample 12 (three-dimensional object 12a) illuminated by interference fringes 77 of azimuth d and phase α=8π/5 using imaging device 18. Two-dimensional original SIM image 84e is the moire image of sample 12 modulated by interference fringes 77 of azimuth d and phase α=8π/5.

Two-dimensional original SIM images 81, 82, 83 of sample 12 obtained as described above are reconstructed using computer 3, whereby the three-dimensional original image of sample 12 (three-dimensional object 12a) is obtained.

Computer 3 is communicatively connected to structured illumination microscope 2b. Display device 4 is communicably connected to computer 3. Display device 4 displays an operation state of structured illumination microscope 2b, two-dimensional original SIM images 81, 82, 83, the image processed by computer 3 such as the three-dimensional correction image in which the optical aberration is corrected, or the like. Storage device 55 stores a computer program executed by processor 30, two-dimensional original SIM images 81, 82, 83, the image processed by computer 3 such as the three-dimensional correction image in which the optical aberration is corrected, or the like.

Processor 30 executes the computer program stored in storage device 55. For example, the computer program includes the microscope control program, an image reconstruction program including the optical aberration correction program, and the optical wavefront estimation program. The microscope control program, the image reconstruction program including the optical aberration correction program, and the optical wavefront estimation program may be stored in the non-transitory computer-readable storage medium.

Figure 36:
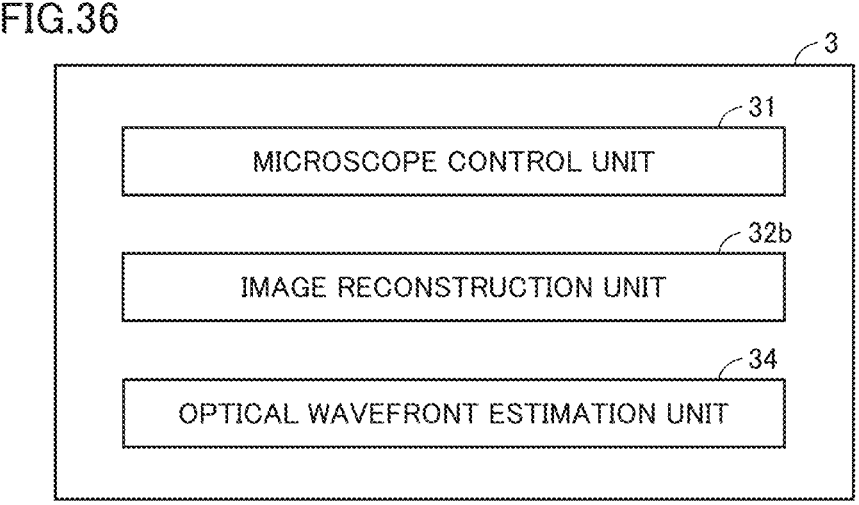
FIG. 36 is a block diagram illustrating the functional configuration of the computer of the second embodiment.
Figure 37:
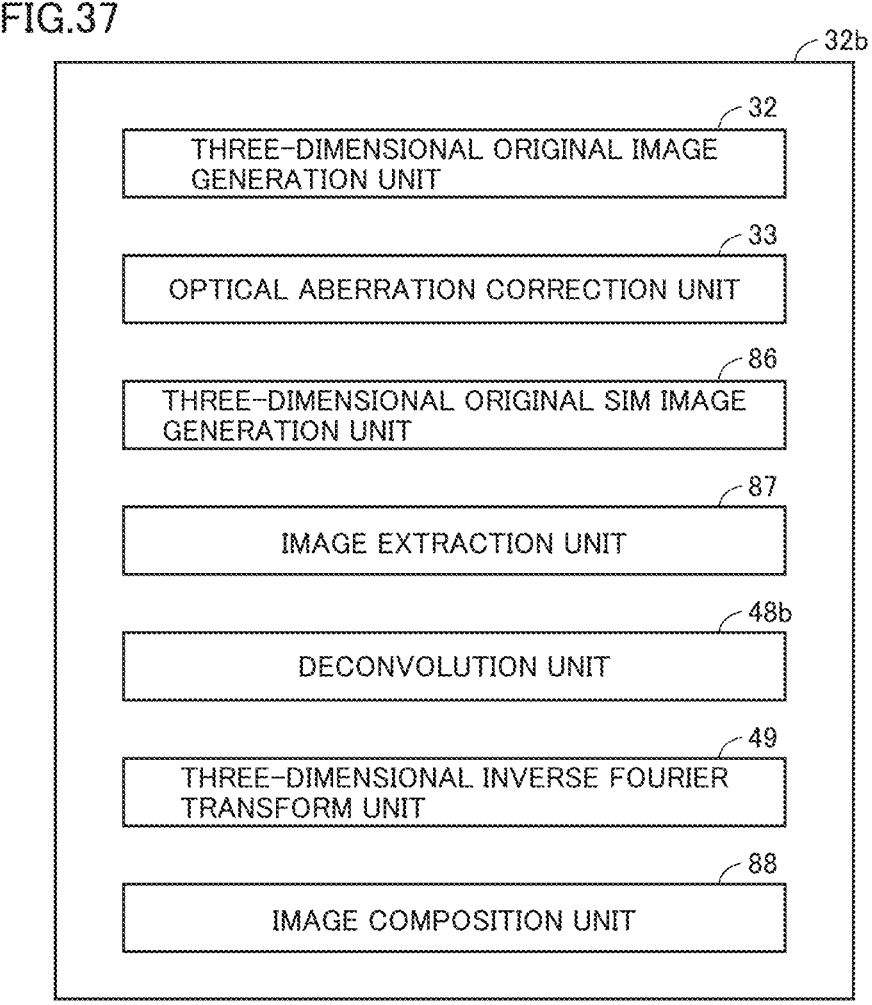
FIG. 37 is a block diagram illustrating a functional configuration of an image reconstruction unit of the third embodiment.

The third embodiment is an embodiment in which the optical aberration correction program, the optical wavefront estimation program, the optical aberration correction method, and the optical wavefront estimation method of the first embodiment are applied to structured illumination microscope 2b. When processor 30 executes the computer program, computer 3 implements the functions in FIGS. 36 and 37. With reference to FIGS. 36 and 37, a functional configuration of computer 3 will be described.

As illustrated in FIG. 36, computer 3 includes microscope control unit 31, an image reconstruction unit 32b, and optical wavefront estimation unit 34. As illustrated in FIG. 37, image reconstruction unit 32b includes three-dimensional original image generation unit 32, optical aberration correction unit 33, a three-dimensional original SIM image generation unit 86, an image extraction unit 87, a deconvolution unit 48b, three-dimensional inverse Fourier transform unit 49, and an image composition unit 88.

When processor 30 executes the microscope control program, computer 3 implements the function as microscope control unit 31. Computer 3 is the controller of structured illumination microscope 2b. Microscope control unit 31 controls the piezoelectric element or motor (not illustrated) connected to at least one of sample support stage 11 and objective lens 16, and controls the position of at least one of sample support stage 11 and objective lens 16. Microscope control unit 31 controls drive device 67 to control the direction and position of optical branching element 66. Microscope control unit 31 controls imaging device 18 to cause imaging device 18 to capture two-dimensional original SIM images 81, 82, 83 of sample 12.

When processor 30 executes the image reconstruction program including the optical aberration correction program, computer 3 implements the function as image reconstruction unit 32b. Computer 3 is an optical aberration correction device and an image reconstruction device. Alternatively, computer 3 is an image reconstruction device including an optical aberration correction function. Image reconstruction unit 32b calculates the three-dimensional correction image of sample 12 from which the optical aberration of observation optical system 10 is removed or reduced from two-dimensional original SIM images 81, 82, 83.

Figure 38:
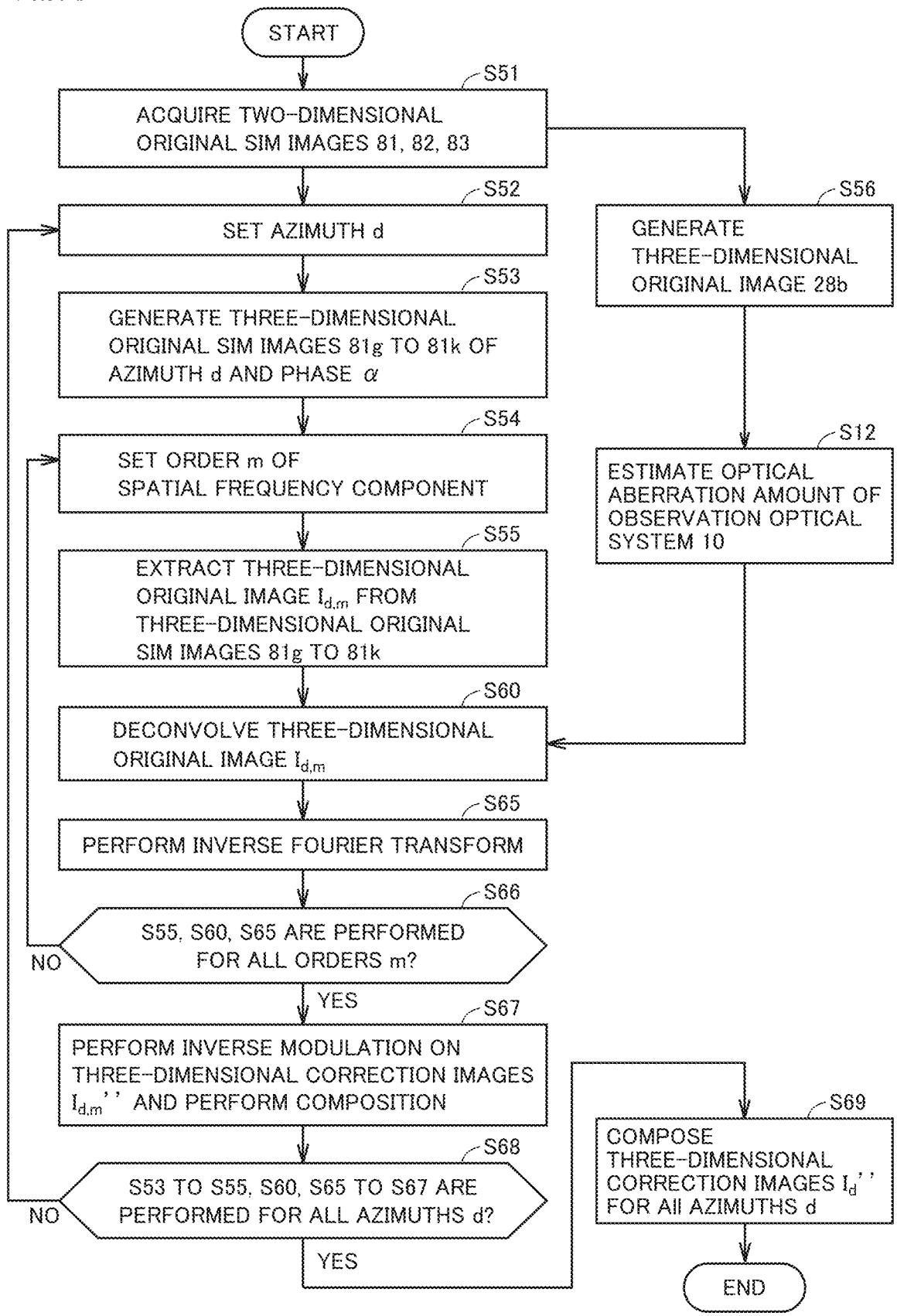
FIG. 38 is a flowchart illustrating an image reconstruction method of the third embodiment.
Figure 39:
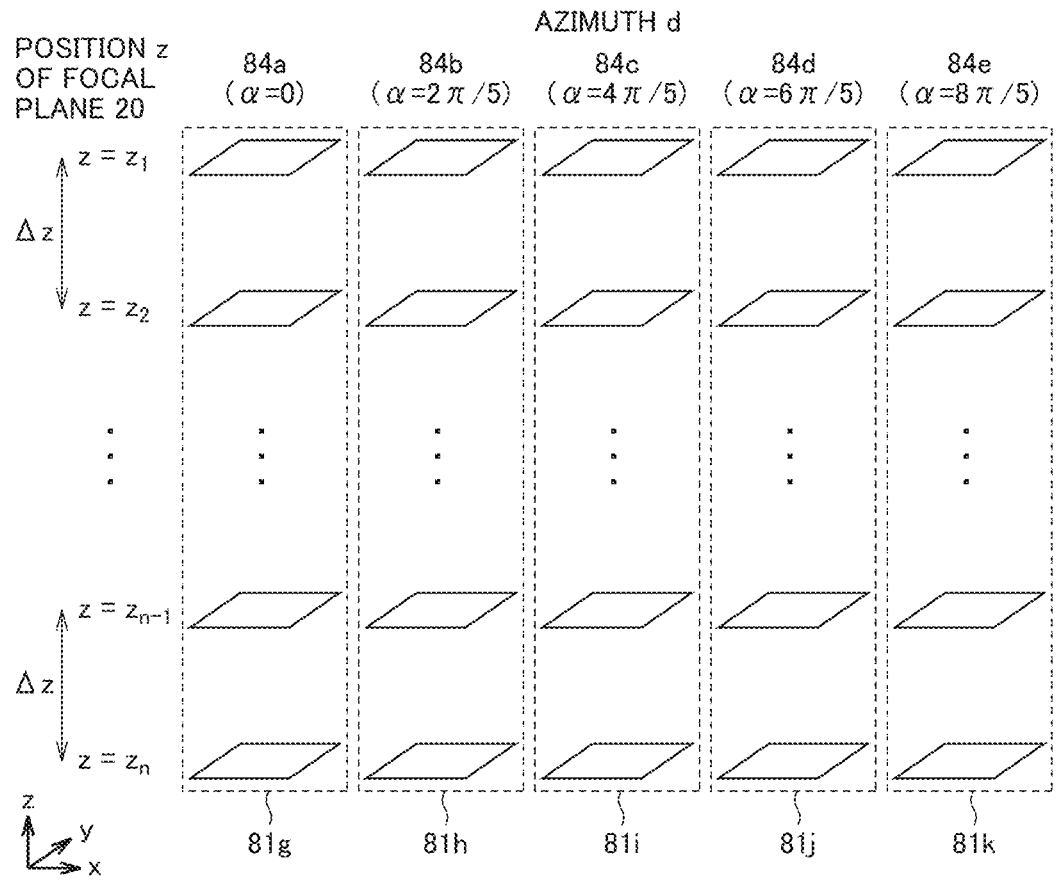
FIG. 39 is a view illustrating a step of extracting a three-dimensional original image $I_{d,m}$ of a spatial frequency component of an order m from a three-dimensional original SIM image of an azimuth d in the third embodiment.
Figure 40:
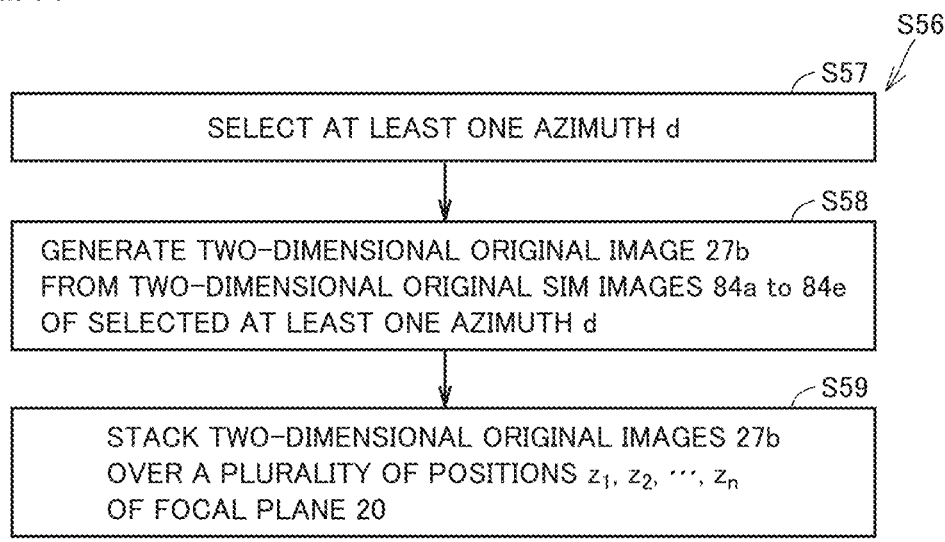
FIG. 40 is a view illustrating a flowchart of a step of generating a three-dimensional original image of the third embodiment.

Three-dimensional original image generation unit 32 performs step S56 (see FIGS. 38 and 40). Optical aberration correction unit 33 performs steps S12 and S60 (see FIG. 38). Three-dimensional original SIM image generation unit 86 performs step S53 (see FIG. 38). Image extraction unit 87 performs step S55 (see FIG. 38). Deconvolution unit 48b performs step S60 (see FIG. 38). Three-dimensional inverse Fourier transform unit 49 performs step S65 (see FIG. 38). Image composition unit 88 performs steps S67 and S69 (see FIG. 38).

When processor 30 executes the optical wavefront estimation program, computer 3 implements the function as optical wavefront estimation unit 34. Computer 3 is also an optical wavefront estimation device. Optical wavefront estimation unit 34 of the third embodiment generates the optimal optical wavefront most approximate to optical wavefront 22 similarly to optical wavefront estimation unit 34 of the first embodiment.

<Image Reconstruction Method>

With reference to FIGS. 38 to 41, an image reconstruction method of the third embodiment will be described. The image reconstruction method of the third embodiment includes step S12 and steps S51 to S69.

With reference to FIG. 38, in step S51, two-dimensional original SIM images 81, 82, 83 of sample 12 (three-dimensional object 12a) are acquired using structured illumination microscope 2b.

Specifically, microscope control unit 31 (see FIG. 36) controls the piezoelectric element or motor (not illustrated) connected to at least one of sample support stage 11 or objective lens 16. For example, the position of focal plane 20 is set to $z_1$. Microscope control unit 31 controls drive device 67 connected to optical branching element 66 to rotate optical branching element 66 around the optical axis (z-axis) of observation optical system 10. The azimuth of optical branching element 66 is set. For example, azimuth d of interference fringes 77 of illumination light 7b is set to azimuth d=1.

Microscope control unit 31 controls drive device 67 connected to optical branching element 66 to linearly move optical branching element 66 along azimuth d. Interference fringe 77 moves in the periodic direction of interference fringe 77, and phase α of interference fringe 77 changes. Sample 12 (three-dimensional object 12a) illuminated by interference fringes 77 is imaged in a plurality of phases α (for example, at least five phases α) using imaging device 18 while moving interference fringes 77. Thus, as illustrated in FIG. 34, two-dimensional original SIM image 81 can be acquired at position $z_1$ of focal plane 20. Two-dimensional original SIM image 81 includes two-dimensional original SIM images 84a, 84b, 84c, 84d, 84e.

Similarly, while linearly moving interference fringe 77 in each of all remaining azimuths d (for example, d=2, 3), sample 12 (three-dimensional object 12a) illuminated by interference fringe 77 is imaged in the plurality of phases α (for example, at least five phases α) using imaging device 18. Thus, as illustrated in FIG. 34, two-dimensional original SIM image 82 and two-dimensional original SIM image 83 can be acquired at position $z_1$ of focal plane 20. Two-dimensional original SIM image 82 includes two-dimensional original SIM images 84a, 84b, 84c, 84d, 84e. Two-dimensional original SIM image 83 includes two-dimensional original SIM images 84a, 84b, 84c, 84d, 84e.

Similarly, two-dimensional original SIM images 81, 82, 83 are obtained at each of positions $z_2, \ldots, z_n$ of all remaining focal planes 20.

Then, in the image reconstruction method of the third embodiment, the optical aberration of observation optical system 10 included in two-dimensional original SIM images 81, 82, 83 is removed or reduced, and two-dimensional original SIM images 81, 82, 83 are reconstructed to calculate the three-dimensional correction image in which the optical aberration of observation optical system 10 is removed or reduced.

Each of two-dimensional original SIM images 81, 82, 83 (two-dimensional original SIM images 84a, 84b, 84c, 84d, 84e) is the moire image of sample 12 (three-dimensional object 12a) modulated by interference fringes 77 of illumination light 7b. As described above, interference fringe 77 includes spatial frequency components of five orders m. Therefore, each of two-dimensional original SIM images 81, 82, 83 (two-dimensional original SIM images 84a, 84b, 84c, 84d, 84e) is the moire image of sample 12 (three-dimensional object 12a) modulated by the spatial frequency components of interference fringes 77 of five orders m.

In the frequency space (Fourier space), the frequency distribution of the moire image of sample 12 (three-dimensional object 12a) modulated by the spatial frequency component of interference fringe 77 of order m corresponds to the original frequency distribution of sample 12 (three-dimensional object 12a) shifted by the spatial frequency component of interference fringe 77 of order m. Therefore, in the original frequency distribution of sample 12 (three-dimensional object 12a), the original frequency region (hereinafter, the component is referred to as a "super-resolution component of sample 12 (three-dimensional object 12a)") of sample 12 (three-dimensional object 12a) exceeding cutoff frequencies $k_{xmax}$, $k_{ymax}$, $k_{zmax}$ of the optical transfer function (OTF) of observation optical system 10 is located within cutoff frequencies $k_{xmax}$, $k_{ymax}$, and $k_{zmax}$ of the optical transfer function (OTF) of observation optical system 10. A high-resolution image of sample 12 (three-dimensional object 12a) corresponding to the super-resolution component of sample 12 (three-dimensional object 12a) can be transmitted by observation optical system 10. Each of two-dimensional original SIM images 81, 82, 83 (two-dimensional original SIM images 84a, 84b, 84c, 84d, 84e) includes the high-resolution image of sample 12 (three-dimensional object 12a) corresponding to the super-resolution component of sample 12 (three-dimensional object 12a).

In each of two-dimensional original SIM images 81, 82, 83 (two-dimensional original SIM images 84a, 84b, 84c, 84d, 84e), the moire images of five samples 12 (three-dimensional objects 12a) modulated by the spatial frequency components of interference fringes 77 of five orders m are superimposed. Therefore, the moire images of five samples 12 (three-dimensional objects 12a) modulated by the spatial frequency components of interference fringes 77 of five orders m are required to be separated and reconstructed. Therefore, the image reconstruction method of the third embodiment includes steps S52 to S69 (see FIGS. 38, 40, and 41).

Specifically, with reference to FIG. 38, in step S52, azimuth d of interference fringe 77 is set on computer 3. For example, azimuth d of interference fringes 77 is set to 1 (azimuth angle of 0°). Computer 3 selects the two-dimensional original SIM image (for example, two-dimensional original SIM image 81) of set azimuth d from two-dimensional original SIM images 81, 82, 83.

With reference to FIG. 38, in step S53, three-dimensional original SIM image generation unit 86 (see FIG. 37) generates three-dimensional original SIM images 81g, 81h, 81i, 81j, 81k having azimuth d and phase α set in step S52 from the two-dimensional original SIM image having azimuth d set in step S52. Specifically, with reference to FIGS. 34 and 39, three-dimensional original SIM image generation unit 86 sorts the two-dimensional original SIM images of azimuth d set in step S52 for each phase α. Three-dimensional original SIM image generation unit 86 stacks the two-dimensional original SIM images of azimuth d set in step S52 over the plurality of positions $z_1, z_2, \ldots, z_{n-1}, z_n$ of focal plane 20 for each phase α to generate three-dimensional original SIM images 81g, 81h, 81i, 81j, 81k of azimuth d and phase α.

With reference to FIG. 38, in step S54, order m of the spatial frequency component of interference fringe 77 is set on computer 3. For example, any one of 0, ±1, and ±2 is set as order m.

With reference to FIG. 38, in step S55, image extraction unit 87 (see FIG. 37) extracts a three-dimensional original image $I_{d,m}$ from three-dimensional original SIM images 81g, 81h, 81i, 81j, 81k. Three-dimensional original image $I_{d,m}$ is the spatial frequency component of order m of three-dimensional original SIM images 81g to 81k. Three-dimensional original image $I_{d,m}$ is the three-dimensional original image of sample 12 modulated by interference fringes 77 having azimuth d and order m of the spatial frequency. Specifically, image extraction unit 87 analyzes the correspondence between the way of changing the luminance at an arbitrary point of three-dimensional original SIM images 81g, 81h, 81i, 81j, 81k and the luminance distribution expected from the frequency and the phase of illumination light 7b, and extracts five three-dimensional original images $I_{d,m}$ from three-dimensional original SIM image 81g to 81k.

With reference to FIG. 38, step S12 of estimating the optical aberration amount of observation optical system 10 is the same as step S12 of estimating the optical aberration amount of observation optical system 10 of the first embodiment. However, in the third embodiment, sample 12 (three-dimensional object 12a) is illuminated with interference fringes 77 of illumination light 7b, whereas in the first embodiment, sample 12 (three-dimensional object 12a) is illuminated with illumination light 7 (see FIG. 1) without interference fringes 77. Accordingly, in the third embodiment, step S56 is performed before step S12 of estimating the optical aberration amount of observation optical system 10 is performed. With reference to FIG. 40, step S56 includes steps S57, S58, S59.

With reference to FIG. 38, in step S56, three-dimensional original image generation unit 32 (see FIG. 37) generates a three-dimensional original image 28b from two-dimensional original SIM images 81, 82, 83.

Specifically, with reference to FIG. 40, in step S57, three-dimensional original image generation unit 32 selects at least one azimuth d (for example, azimuth d=1). Three-dimensional original image generation unit 32 selects the two-dimensional original SIM image (for example, two-dimensional original SIM image 81) of azimuth d selected among two-dimensional original SIM images 81, 82, 83. As illustrated in FIG. 34, the two-dimensional original SIM image (for example, two-dimensional original SIM image 81) of the selected orientation d includes two-dimensional original SIM images 84a, 84b, 84c, 84d, 84e having different phases α.

With reference to FIG. 40, in step S58, three-dimensional original image generation unit 32 generates a two-dimensional original image 27b from the two-dimensional original SIM image of azimuth d selected in step S57. Specifically, three-dimensional original image generation unit 32 adds two-dimensional original SIM images 84a, 84b, 84c, 84d, 84e for each of the plurality of positions $z_1, z_2, \ldots, z_n$ of focal plane 20. As illustrated in FIG. 35, phases α of two-dimensional original SIM images 84a, 84b, 84c, 84d, 84e are different from each other. Therefore, two-dimensional original image 27b of sample 12 (three-dimensional object 12a) illuminated with illumination light 7 (see FIG. 1) without interference fringes 77 is obtained by adding two-dimensional original SIM images 84a, 84b, 84c, 84d, 84e to each other. Two-dimensional original image 27b is equivalent to two-dimensional original image 27 (FIG. 4) of the first embodiment.

With reference to FIG. 40, in step S59, three-dimensional original image generation unit 32 stacks a plurality of two-dimensional original images 27b over the plurality of positions $z_1, z_2, \ldots, z_{n-1}, z_n$ of focal plane 20, and generates three-dimensional original image 28b of sample 12 (three-dimensional object 12a) as the multilayer body (stack image) of the plurality of two-dimensional original images 27b. Three-dimensional original image 28b is equivalent to three-dimensional original image 28 (FIG. 4) of the first embodiment.

With reference to FIG. 38, in step S12, optical aberration correction unit 33 (see FIG. 37) estimates the optical aberration of observation optical system 10 using three-dimensional original image 28b. Step S12 of the third embodiment is the same as step S12 of the first embodiment.

Figure 41:
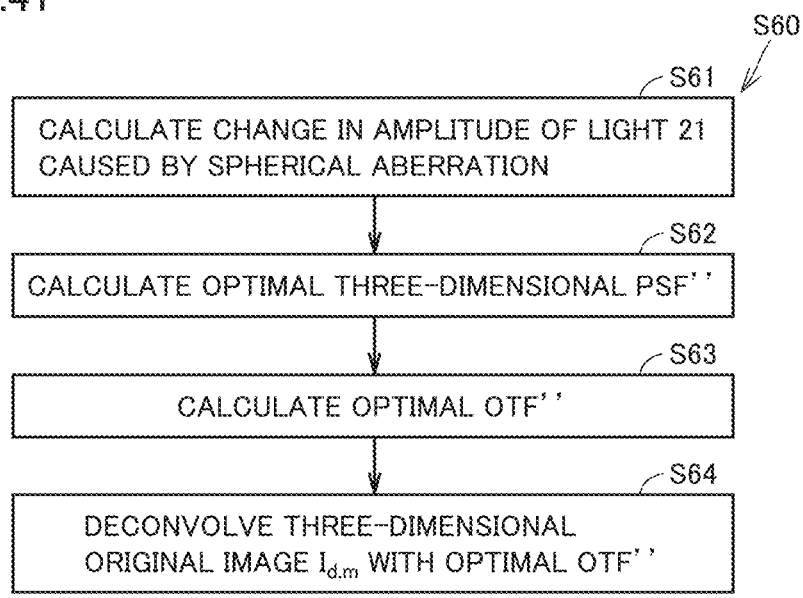
FIG. 41 is a flowchart illustrating a step of deconvolving the three-dimensional original image of the third embodiment.

With reference to FIG. 38, deconvolution unit 48b (see FIG. 37) performs step S60 of deconvolving three-dimensional original image $I_{d,m}$ extracted in step S55. With reference to FIG. 41, step S60 includes: step S61 of calculating the change in amplitude of light 21 caused by the spherical aberration of observation optical system 10; step S62 of calculating the optimal three-dimensional PSF"; step S63 of calculating the optimal OTF"; and step S64 of deconvolving three-dimensional original image $I_{d,m}$ with the optimal OTF".

Steps S61, S62, S63 in the third embodiment are similar to steps S34, S35, S37 (see FIG. 13) in the first embodiment, respectively.

Step S64 in the third embodiment is similar to step S38 (see FIG. 13) in the first embodiment. Step S38 of the first embodiment is performed on three-dimensional original image I, but step S64 of the third embodiment is performed on three-dimensional original image $I_{d,m}$. That is, similarly to the sixth modification of the first embodiment, three-dimensional original image $I_{d,m}$ corrected in step S64 of the third embodiment is different from three-dimensional original image 28b used in the step (for example, step S12) of determining the optimal theoretical three-dimensional point spread function (optimal theoretical three-dimensional PSF') of observation optical system 10 in step S12 of the third embodiment. Three-dimensional original image $I_{d,m}$ is common to three-dimensional original image 28b in that three-dimensional original image $I_{d,m}$ is the image that is obtained through observation optical system 10 and includes the optical aberration of observation optical system 10. Specifically, in step S64, deconvolution unit 48b performs three-dimensional Fourier transform on three-dimensional original image $I_{d,m}$ using an equation (38) to obtain a frequency distribution $D_{d,m}$ of three-dimensional original image $I_{d,m}$.

[Mathematical formula 38]

$$D_{d,m}(k_x,k_y,k_z)=FT_{3D}(I_{d,m}(x,y,z)) \qquad (38)$$

Then, deconvolution unit 48b deconvolves frequency distribution $D_{d,m}$ of three-dimensional original image $I_{d,m}$ with the optimal OTF" of observation optical system 10 in the frequency space. For example, frequency distribution $D_{d,m}$ of three-dimensional original image $I_{d,m}$ may be deconvolved with the optimal OTF" by applying a Wiener filter of the optimal OTF" to frequency distribution $D_{d,m}$ of three-dimensional original image $I_{d,m}$ using an equation (39). Thus, a frequency distribution $D_{d,m}"(k_x,k_y,k_z)$ of three-dimensional original image $I_{d,m}$ is calculated. The optimal optical aberration amount closest to the optical aberration amount of observation optical system 10 is removed from the phase of frequency distribution $D_{d,m}"$ of three-dimensional original image $I_{d,m}$. The spherical aberration is removed from the amplitude of frequency distribution $D_{d,m}''$ of three-dimensional original image $I_{d,m}$. Thus, in step S60, three-dimensional original image $I_{d,m}$ that includes the optical aberration of observation optical system 10 of structured illumination microscope 2b and is modulated by interference fringes 77 having azimuth d and order m of the spatial frequency is deconvolved at the optimal OTF".

[Mathematical formula 39]

$$D_{d,m}''(k_x, k_y, k_z) = \begin{cases} \dfrac{D_{d,m}(k_x, k_y, k_z)}{OTF''(k_x, k_y, k_z) + w}, & k_x < k_{xmax}, k_y < k_{ymax}, \text{ and } k_z < k_{zmax} \\ 0, & k_x \geq k_{xmax}, k_y \geq k_{ymax}, \text{ or } k_z \geq k_{zmax} \end{cases} \quad (39)$$

The deconvolution method in step S64 is not particularly limited, and for example, frequency distribution $D_{d,m}$ of three-dimensional original image $I_{d,m}$ may be subjected to the inverse filter of the optimal OTF" to perform the deconvolution. In order to avoid the artifact, the deconvolution is performed only in the frequency space within cutoff frequencies $k_{xmax}$, $k_{ymax}$, $k_{zmax}$ of the optical transfer function (OTF) of observation optical system 10 as illustrated in an equation (39).

With reference to FIG. 38, in step S65, three-dimensional inverse Fourier transform unit 49 performs three-dimensional inverse Fourier transform on frequency distribution $D_{d,m}''$ of three-dimensional original image $I_{d,m}$ using an equation (40). In this way, three-dimensional correction image $I_{d,m}''(x,y,z)$ from which the optical aberration of observation optical system 10 is removed or reduced is calculated. Three-dimensional correction image $I_{d,m}''$ is the image that includes the super-resolution component of sample 12 (three-dimensional object 12a) in azimuth d and is modulated with the spatial frequency component of order m in azimuth d.

[Mathematical formula 40]

$$I_{d,m}''(x,y,z) = FT_{3D}^{-1}(D_{d,m}''(k_x,k_y,k_z)) \quad (40)$$

With reference to FIG. 38, in step S66, computer 3 checks whether steps S55, S60, S65 are performed for all orders m. When steps S55, S60, S65 are not performed for all orders m, steps S55, S60, S65 are repeatedly performed while changing orders m until steps S55, S60, S65 are performed for all orders m.

With reference to FIG. 38, when steps S55, S60, S65 are performed for all orders m, image composition unit 88 (see FIG. 37) performs step S67 of performing inverse modulation on three-dimensional correction images $I_{d,m}''$ and performing composition.

Specifically, image composition unit 88 (see FIG. 37) inversely modulates three-dimensional correction image $I_{d,m}''$ with a sawtooth wave pattern corresponding to the spatial frequency component of interference fringe 77 of order m for each of all orders m. As a result, in the frequency space (Fourier space), the super-resolution component of sample 12 (three-dimensional object 12a) shifted by the spatial frequency component of interference fringe 77 of order m can be returned (rearranged) to the original position of the super-resolution component of sample 12 (three-dimensional object 12a).

Then, image composition unit 88 adds inversely-modulated three-dimensional correction images $I_{d,m}''$ for all orders m. Thus, image composition unit 88 can calculate three-dimensional correction image $I_d''$ of sample 12 (three-dimensional object 12a) including the super-resolution component in azimuth d. The resolution in azimuth d of three-dimensional correction image $I_d''$ is increased, and the optical aberration of observation optical system 10 is removed or reduced in three-dimensional correction image $I_d''$.

With reference to FIG. 38, in step S68, computer 3 checks whether steps S53 to S55, S60, S65 to S67 are performed for all azimuths d. When steps S53 to S55, S60, S65 to S67 are not performed for all azimuths d, steps S53 to S55, S60, S65 to S67 are repeatedly performed while changing azimuth d until steps S53 to S55, S60, S65 to S67 are performed for all azimuths d.

With reference to FIG. 38, when steps S53 to S55, S60, S65 to S67 are performed for all azimuths d, in step S69, image composition unit 88 (see FIG. 37) adds three-dimensional correction images $I_d''$ for all azimuths d. In this way, image composition unit 88 obtains three-dimensional correction image I" of sample 12 (three-dimensional object 12a) that includes the super-resolution component and in which the optical aberration of observation optical system 10 is removed or reduced in all azimuths d.

Effects of the first embodiment will be described.

In the optical aberration correction program and the optical aberration correction method of the third embodiment, the optical system is observation optical system 10 of structured illumination microscope 2b. Therefore, in addition to the effects of the optical aberration correction program and the optical aberration correction method of the first embodiment, the optical aberration correction program and the optical aberration correction method of the third embodiment have an effect that the three-dimensional correction image having higher resolution can be obtained.

In the optical aberration correction program and the optical aberration correction method of the third embodiment, another three-dimensional original image (three-dimensional original image $I_{d,m}$) that includes the optical aberration of observation optical system 10 of structured illumination microscope 2b and is modulated by interference fringes 77 of structured illumination microscope 2b having azimuth d and order m of the spatial frequency is deconvolved with the optimal optical transfer function (optimal OTF"). Consequently, the optical aberration correction program and the optical aberration correction method of the third embodiment can obtain the three-dimensional correction image having the higher resolution.

In the optical wavefront estimation program and the optical wavefront estimation method of the third embodiment, the optical system is observation optical system 10 of structured illumination microscope 2b. Consequently, the optical wavefront estimation program and the optical wavefront estimation method of the third embodiment have the same effects as the optical wavefront estimation program and the optical wavefront estimation method of the first embodiment.

Fourth Embodiment

With reference to FIGS. 1, 5 to 7, 9, and 42, a microscope system 1 according to a fourth embodiment will be described. Microscope system 1 of the fourth embodiment has the same configuration as microscope system 1 of the first embodiment, but is different from microscope system 1 of the first embodiment mainly in the following points.

Figure 42:
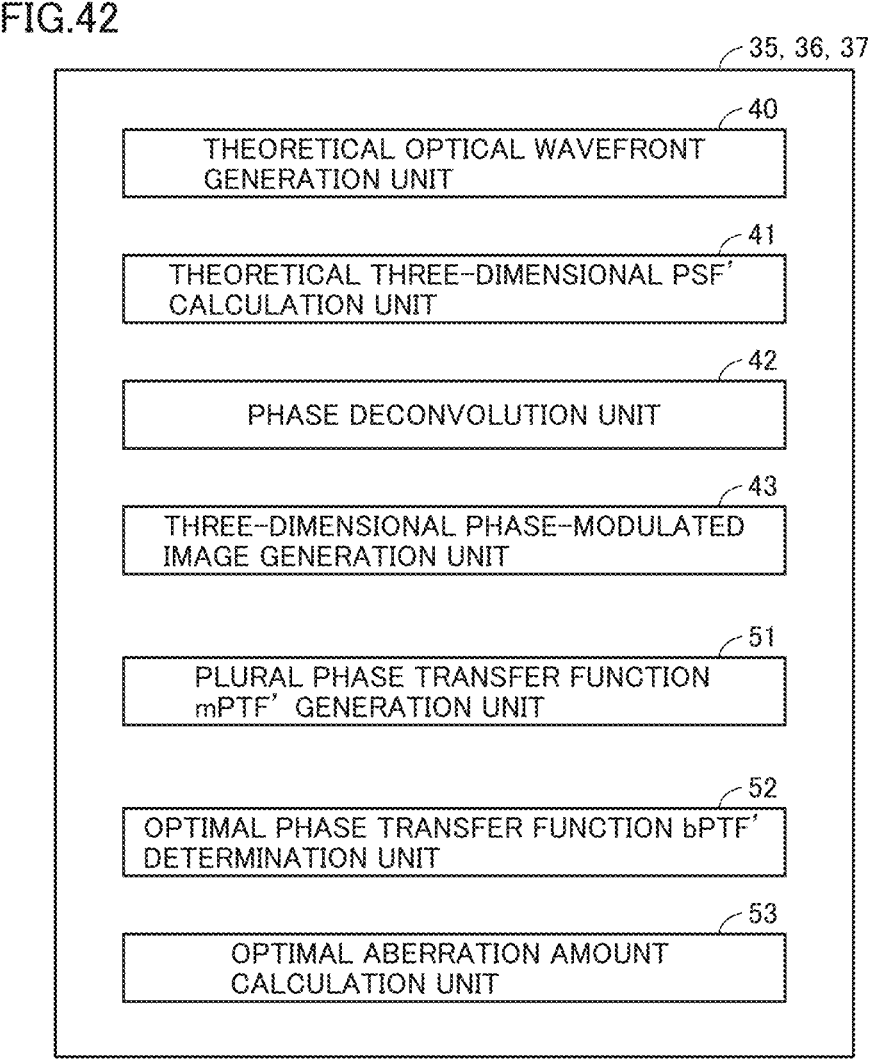
FIG. 42 is a block diagram illustrating functional configurations of a spherical aberration estimation unit, a coma aberration estimation unit, and an astigmatism estimation unit according to a fourth embodiment.

With reference to FIG. 42, in the fourth embodiment, each of spherical aberration estimation unit 35, coma aberration estimation unit 36, and astigmatism estimation unit 37 includes theoretical optical wavefront generation unit 40, theoretical three-dimensional PSF' calculation unit 41, phase deconvolution unit 42, three-dimensional phase-modulated image generation unit 43, a plural provisional phase transfer function mPTF' generation unit 51, an optimal phase transfer function bPTF' determination unit 52, and an optimal aberration amount calculation unit 53.

Figure 44:
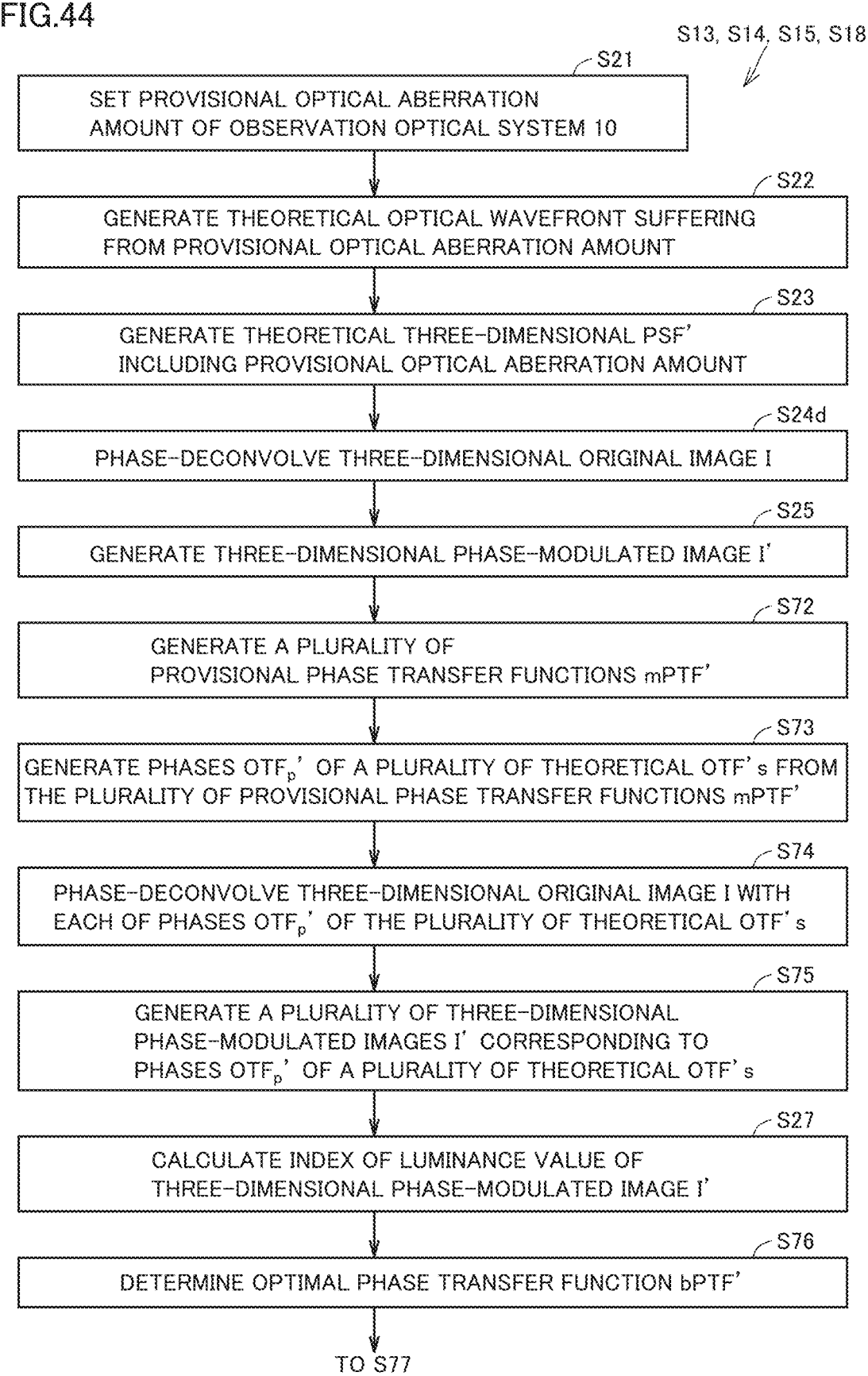
FIG. 44 is a flowchart illustrating each of a step of estimating an optimal spherical aberration amount of the fourth embodiment, a step of estimating an optimal coma aberration amount of the fourth embodiment, a step of estimating an optimal astigmatism amount of the fourth embodiment, and a step of estimating an optimal higher-order optical aberration amount of the fourth embodiment.
Figure 45:
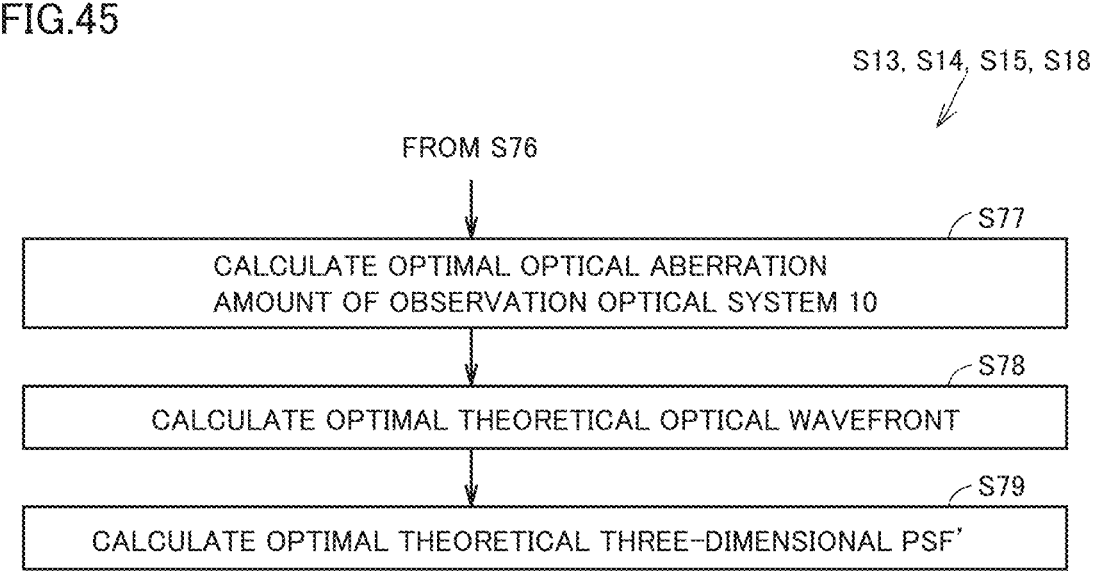
FIG. 45 is a flowchart illustrating each of the step of estimating an optimal spherical aberration amount of the fourth embodiment, the step of estimating the optimal coma aberration amount of the fourth embodiment, the step of estimating the optimal astigmatism amount of the fourth embodiment, and the step of estimating the optimal higher-order optical aberration amount of the fourth embodiment.

Theoretical optical wavefront generation unit 40 performs steps S21, S22, S78 (see FIGS. 44 and 45). Theoretical three-dimensional PSF' calculation unit 41 performs steps S23, S79 (see FIGS. 44 and 45). Phase deconvolution unit 42 performs steps S24d, S73, S74 (see FIGS. 44 and 45). Three-dimensional phase-modulated image generation unit 43 performs steps S25 and S75 (see FIG. 44). Plural provisional phase transfer function mPTF' generation unit 51 performs step S72 (see FIG. 44). Optimal phase transfer function bPTF' determination unit 52 performs steps S27, S76 (see FIG. 44). Optimal aberration amount calculation unit 53 performs step S77 (see FIG. 45).

With reference mainly to FIGS. 10, 13, 21, and 43 to 52, an optical aberration correction method, an optical aberration correction program, an optical wavefront estimation method, and an optical wavefront estimation program of the fourth embodiment will be described. The optical aberration correction method, the optical aberration correction program, the optical wavefront estimation method, and the optical wavefront estimation program of the fourth embodiment are similar to the optical aberration correction method, the optical aberration correction program, the optical wavefront estimation method, and the optical wavefront estimation program of the first embodiment, but are different in the following points.

Figure 43:
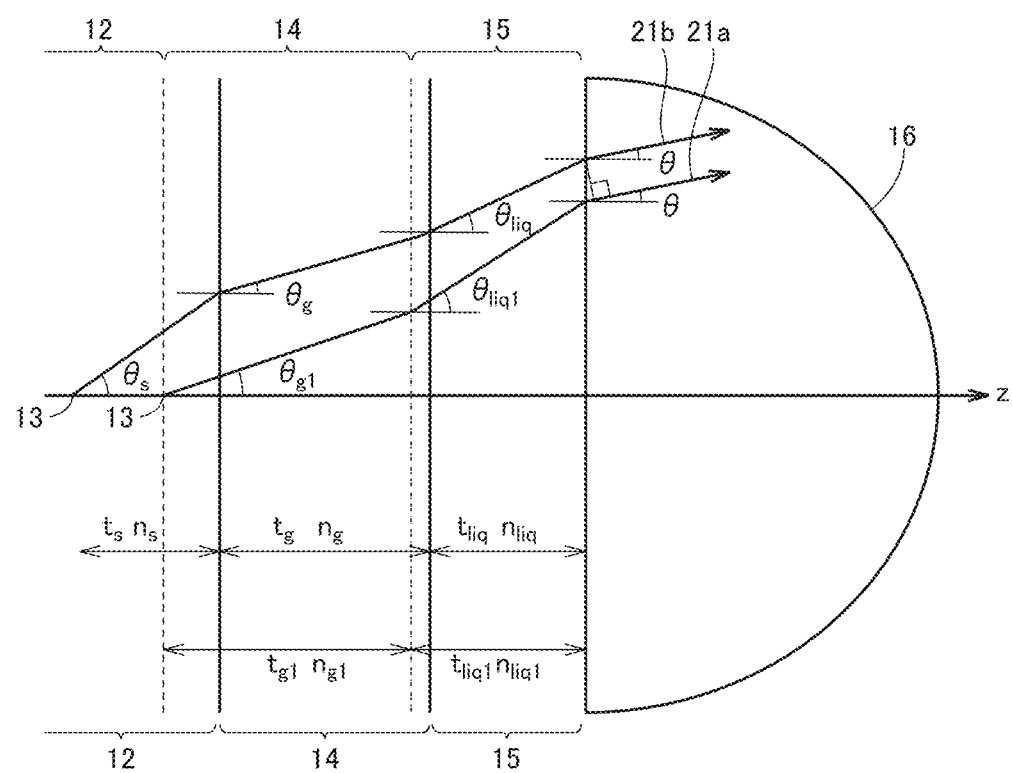
FIG. 43 is a view illustrating a model generating a theoretical optical wavefront suffering from spherical aberration and defocus of an observation optical system in the fourth embodiment.

First, the fourth embodiment is different from the first embodiment in a model generating theoretical optical wavefront $W_s$ suffering from the spherical aberration of observation optical system 10. In the first embodiment, sometimes there is the case where appropriate theoretical optical wavefront $W_s$ cannot be generated when refractive index $n_2$ of sample 12 is large. Accordingly, in the fourth embodiment, a theoretical optical wavefront $W_s+W_a$ suffering from the spherical aberration and defocus of observation optical system 10 is generated based on the model of Gibson and Lanni (S. F. Gibson and F. Lanni, Journal of the Optical Society of America A, 1991, Vol. 8, No. 10, p. 1601-1613). With reference to FIG. 43, theoretical optical wavefront $W_s+W_a$ suffering from the spherical aberration and defocus of observation optical system 10 is given by the difference between the optical path length of optical path 21a of actual observation optical system 10 and the optical path length of optical path 21b of ideal observation optical system 10, and is specifically given by an equation (41).

[Mathematical formula 41]

$$W_s(u, v) + W_d(u, v) = \frac{n_s t_s}{\cos\theta_s(u, v)} + \frac{n_g t_g}{\cos\theta_g(u, v)} + \frac{n_{liq} t_{liq}}{\cos\theta_{liq}(u, v)} - \left(\frac{n_{g1} t_{g1}}{\cos\theta_{g1}(u, v)} + \frac{n_{liq1} t_{liq1}}{\cos\theta_{liq1}(u, v)} + n\gamma\right) \quad (41)$$

γ in the equation (41) is given by an equation (42).

[Mathematical formula 42]

$$\gamma = \sin\theta(t_s \tan\theta_s(u,v) + t_g \tan\theta_g(u,v) + t_{liq} \tan\theta_{liq}(u,v) - t_{g1} \tan\theta_{g1}(u,v) - t_{liq1} \tan\theta_{liq1}(u,v)) \quad (42)$$

In ideal observation optical system 10, immersion medium 15 having a refractive index $n_{liq1}$ and a thickness $t_{liq1}$ designated according to objective lens 16 and cover glass 14 having a refractive index $n_{g1}$ and a thickness $t_{g1}$ designated according to objective lens 16 are used, and bright spot 13 is immediately below cover glass 14. Ideal observation optical system 10 has no spherical aberration. Optical path 21a is an optical path of light that exits from bright spot 13 and enters objective lens 16 at incident angle θ.

In actual observation optical system 10, cover glass 14 has a refractive index $n_g$ and a thickness $t_g$, immersion medium 15 has a refractive index $n_{liq}$ and a thickness $t_{liq}$, bright spot 13 is at a depth $t_s$ from cover glass 14, and sample 12 has a refractive index $n_s$. Actual observation optical system 10 has the spherical aberration, and the spherical aberration amount of observation optical system 10 is given by a difference between $n_{liq}$ and $n_{liq1}$, a difference between $n_g$ and $n_{g1}$, a difference between $t_g$ and $t_{g1}$, $t_s$, and $n_s$. $n_{liq}$, $n_g$, $t_g$, $t_s$, and $n_s$ are parameters related to the spherical aberration amount of observation optical system 10. Optical path 21b is the optical path of the light that exits from bright spot 13 and enters objective lens 16 at incident angle θ. $t_{liq}$ is a parameter related to the defocus.

According to a paper (J. Li, F. Xue, and T. Blu, Journal of the Optical Society of America A, 2017, Vol. 34, No. 6, p. 1029-1034) by J. Li and the like, the right side of the equation (41) can be rewritten as the equation (42). NA represents a numerical aperture of objective lens 16.

[Mathematical formula 43]

$$W_s(u, v) + W_d(u, v) = (z + t_{liq1})\sqrt{n_{liq}^2 - (NA\rho(u, v))^2} + \\ z_p\sqrt{n_s^2 - (NA\rho(u, v))^2} - t_{liq1}\sqrt{(n_{liq1})^2 - (NA\rho(u, v))^2} + \\ t_g\sqrt{n_g^2 - (NA\rho(u, v))^2} - t_{g1}\sqrt{(n_{g1})^2 - (NA\rho(u, v))^2} \quad (43)$$

ρ(u,v) in an equation (43) is expressed by an equation (44).

[Mathematical formula 44]

$$\rho(u, v) = \begin{cases} \frac{\sqrt{u^2 + v^2}}{NA/\lambda}, & \sqrt{u^2 + v^2} \leq \frac{NA}{\lambda} \\ 1, & \sqrt{u^2 + v^2} > \frac{NA}{\lambda} \end{cases} \quad (44)$$

In the fourth embodiment, theoretical optical wavefront $W_s+W_d$ suffering from the spherical aberration and defocus of observation optical system 10 is generated as described above. For this reason, in the fourth embodiment, some expressions of the first embodiment are changed. For example, in the fourth embodiment, the equation (11) in the first embodiment is replaced with an equation (45).

[Mathematical formula 45]

$$P'(u, v, z) = P(u, v)e^{i\frac{2\pi\{W_s(u,v)+W_d(u,v,z)\}}{\lambda}} \quad (45)$$

In the fourth embodiment, the equation (19) in the first embodiment is replaced with an equation (46).

[Mathematical formula 46]

$$P'(u, v, z) = P(u, v)e^{i\frac{2\pi\{W_s(u,v)+W_d(u,v,z)+W_c(u,v)\}}{\lambda}} \quad (46)$$

In the fourth embodiment, the equation (21) in the first embodiment is replaced with an equation (47).

[Mathematical formula 47]

$$P'(u, v, z) = P(u, v)e^{i\frac{2\pi\{W_s(u,v)+W_d(u,v,z)+W_c(u,v)+W_a(u,v)\}}{\lambda}} \quad (47)$$

In the fourth embodiment, the equation (22) in the first embodiment is replaced with an equation (48).

[Mathematical formula 48]

$$A_t(u, v) = \left[\frac{\sin\theta_{liq}(u, v)\cos\theta_s(u, v)}{\sin(\theta_{liq}(u, v) + \theta_s(u, v))}\right]\left[1 + \frac{1}{\cos(\theta_s(u, v) - \theta_{liq}(u, v))}\right] \quad (48)$$

In the fourth embodiment, the equation (23) in the first embodiment is replaced with an equation (49).

[Mathematical formula 49]

$$A_w(u, v) = \frac{n_{liq}\tan\theta_s(u, v)}{n_s\tan\theta_{liq}(u, v)} \quad (49)$$

In the fourth embodiment, the equation (25) in the first embodiment is replaced with an equation (50).

[Mathematical formula 50]

$$P''(u, v, z) = P(u, v)A_t(u, v)A_w(u, v)e^{i\frac{2\pi\{W_s(u,v)+W_d(u,v,z)+W_c(u,v)+W_a(u,v)\}}{\lambda}} \quad (50)$$

Figure 46:
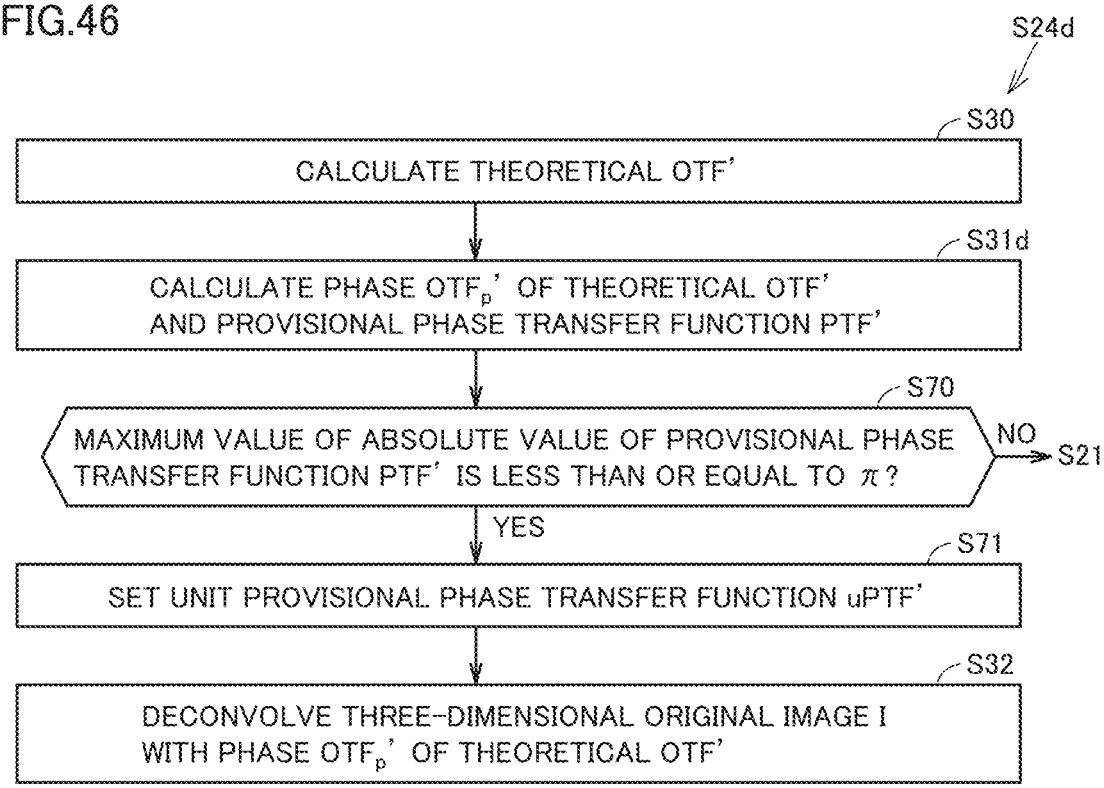
FIG. 46 is a flowchart illustrating a step of phase-deconvolving a three-dimensional original image of the fourth embodiment.

Secondly, as illustrated in FIGS. 44 to 46, the fourth embodiment is different from the first embodiment in the method for obtaining the optimal theoretical optical wavefront and the optimal theoretical three-dimensional PSF'.

Step S13 of estimating the optimal spherical aberration amount of observation optical system 10 in the fourth embodiment will be described mainly with reference to FIGS. 10 and 44 to 46. In step S21 of step S13, the provisional optical aberration amount (for example, the provisional spherical aberration amount) of observation optical system 10 is set on computer 3. For example, the provisional optical aberration amount (for example, the provisional spherical aberration amount) of observation optical system 10 is set by setting refractive index $n_{liq}$ of immersion medium 15, refractive index $n_g$ and thickness $t_g$ of cover glass 14, depth $t_s$ of bright spot 13 from cover glass 14, and refractive index $n_s$ of sample 12 to arbitrary values.

In step S22 of step S13, theoretical optical wavefront generation unit 40 (see FIG. 42) generates theoretical optical wavefront $W_s+W_a$ suffering from the spherical aberration and defocus of observation optical system 10 using the equations (43) and (44).

In step S23 of step S13, theoretical three-dimensional PSF' calculation unit 41 (see FIG. 42) calculates the theoretical three-dimensional PSF' from theoretical optical wavefront $W_s+W_a$ suffering from the spherical aberration and the defocus. Specifically, theoretical three-dimensional PSF' calculation unit 41 calculates pupil function P'(u,v,z) corresponding to position z of focal plane 20 using the equation (45). Theoretical three-dimensional PSF' calculation unit 41 calculates two-dimensional light intensity $PSF_z'$(u,v,z) at position z of focal plane 20 from pupil function P'(x,y,z) using an equation (12). Theoretical three-dimensional PSF' calculation unit 41 calculates a theoretical three-dimensional PSF'(x,y,z) as the multilayer body (aggregate) of the two-dimensional light intensity $PSF_z'$ at a plurality of positions z of focal plane 20.

With reference to FIGS. 44 and 46, in step S24d, phase deconvolution unit 42 (see FIG. 42) performs the phase deconvolution on three-dimensional original image I. Step S24d includes: step S30 of calculating the theoretical OTF'; step S31d of calculating the phase $OTF_p'$ of the theoretical OTF' and the provisional phase transfer function PTF'; step S71 of setting a unit provisional phase transfer function uPTF'($k_x,k_y,k_z$); and step S32 of deconvolving three-dimensional original image I with the phase $OTF_p'$ of the theoretical OTF'. Step S24d may further include step S70 of determining whether the maximum value of the absolute value of provisional phase transfer function PTF'($k_x,k_y,k_z$) is less than or equal to π between step S31d and step S71.

In step S30, phase deconvolution unit 42 (see FIG. 42) performs the three-dimensional Fourier transform on the theoretical three-dimensional PSF'(x,y,z) using the equation (13) to calculate the theoretical OTF'($k_x,k_y,k_z$) of observation optical system 10 including the provisional optical aberration amount (for example, the provisional spherical aberration amount). In step S31d, phase deconvolution unit 42 calculates the phase $OTF_p'$($k_x,k_y,k_z$) of the theoretical OTF' (the phase of the provisional optical transfer function) and provisional phase transfer function PTF'($k_x,k_y,k_z$) using equations (14) and (51). Provisional phase transfer function PTF'($k_x,k_y,k_z$) is an angle component of phase $OTF_p'$($k_x,k_y,k_z$) of the theoretical OTF'. Provisional phase transfer function PTF'($k_x,k_y,k_z$) is calculated from the theoretical OTF' ($k_x,k_y,k_z$) or the phase $OTF_p'$($k_x,k_y,k_z$) of the theoretical OTF'.

[Mathematical formula 51]

$$OTF'(k_x,k_y,k_z)=e^{i[PTF'(k_x,k_y,k_z)]}=e^{i\arg[OTF'(k_x,k_y,k_z)]} \quad (51)$$

In step S70, phase deconvolution unit 42 (see FIG. 42) determines whether the maximum value of the absolute value of provisional phase transfer function PTF'($k_x,k_y,k_z$) within cutoff frequencies $k_{xmax}$, $k_{ymax}$, $k_{zmax}$ of observation optical system 10 is less than or equal to π.

When the maximum value of the absolute value of provisional phase transfer function PTF'($k_x,k_y,k_z$) is larger than π, the aberration-corrected image and the optical wavefront are distorted due to the phase wrapping. Therefore, when phase deconvolution unit 42 (see FIG. 42) determines that the maximum value of the absolute value of provisional phase transfer function PTF'($k_x,k_y,k_z$) within cutoff frequencies $k_{xmax}$, $k_{ymax}$, $k_{zmax}$ of observation optical system 10 is larger than π, the processing returns to step S21, and another provisional optical aberration amount (for example, another provisional spherical aberration amount) of observation optical system 10 is set on computer 3.

Specifically, another provisional optical aberration amount (for example, another provisional spherical aberration amount) is set by changing at least one of refractive index $n_{liq}$ of immersion medium 15, refractive index $n_g$ and thickness $t_g$ of cover glass 14, depth $t_s$ of bright spot 13 from cover glass 14, and refractive index $n_s$ of sample 12. As an example, another provisional optical aberration amount (for example, another provisional spherical aberration amount) is set by changing refractive index $n_{liq}$ of immersion medium 15. Steps S21 to S23, S30, S31d, S70 are repeatedly performed until the maximum value of the absolute value of provisional phase transfer function PTF'($k_x,k_y,k_z$) within cutoff frequencies $k_{xmax}$, $k_{ymax}$, $k_{zmax}$ of observation optical system 10 becomes less than or equal to π.

When phase deconvolution unit 42 (see FIG. 42) determines that the maximum value of the absolute value of provisional phase transfer function PTF'($k_x,k_y,k_z$) within cutoff frequencies $k_{xmax}$, $k_{ymax}$, $k_{zmax}$ of observation optical system 10 is less than or equal to π, phase deconvolution unit 42 sets provisional phase transfer function PTF'($k_x,k_y,k_z$) as unit provisional phase transfer function uPTF'($k_x,k_y,k_z$) (step S71). When step S70 does not exist, provisional phase transfer function PTF' calculated in step S31d is set as unit provisional phase transfer function uPTF'($k_x,k_y,k_z$).

The phase $OTF_p'$ (the phase of the provisional optical transfer function) of the theoretical OTF' corresponding to unit provisional phase transfer function uPTF'($k_x,k_y,k_z$) is already obtained in step S31d. In step S32, phase deconvolution unit 42 (see FIG. 42) deconvolves three-dimensional original image I with phase $OTF_p'$ of the theoretical OTF' corresponding to unit temporary phase transfer function uPTF'($k_x,k_y,k_z$). Step S32 of the fourth embodiment is similar to step S32 of the first embodiment. Then, in step S25, three-dimensional phase-modulated image generation unit 43 (see FIG. 42) generates three-dimensional phase-modulated image I'($k_x,k_y,k_z$) corresponding to unit temporary phase transfer function uPTF'(x,y,z). In three-dimensional phase-modulated image I'(x,y,z) generated in step S25, the three-dimensional original image is corrected by the provisional optical aberration amount (for example, the provisional spherical aberration amount) corresponding to unit provisional phase transfer function uPTF'($k_x,k_y,k_z$). Step S25 of the fourth embodiment is similar to step S25 of the first embodiment.

In step S72, plural provisional phase transfer function mPTF' generation unit 51 (see FIG. 42) generates a plurality of provisional phase transfer functions mPTF'($k_x,k_y,k_z$) from unit provisional phase transfer function uPTF'($k_x,k_y,k_z$). For example, as illustrated in an equation (52), the plurality of provisional phase transfer functions mPTF'($k_x,k_y,k_z$) are generated by multiplying unit provisional phase transfer function uPTF'($k_x,k_y,k_z$) by various real numbers.

[Mathematical formula 52]

$$mPTF'(k_x,k_y,k_z)=\beta uPTF'(k_x,k_y,k_z) \qquad (52)$$

In step S73, phase deconvolution unit 42 (see FIG. 42) generates the phases $OTF_p'$ (the phases of the provisional optical transfer functions) of the plurality of theoretical OTF's corresponding to the plurality of provisional phase transfer functions mPTF'($k_x,k_y,k_z$) by using an equation (53). Each of the phases $OTF_p'$ of the plurality of theoretical OTF's is generated from a corresponding one of the plurality of provisional phase transfer functions mPTF'($k_x,k_y,k_z$).

[Mathematical formula 53]

$$OTF_p'(k_x,k_y,k_z)=e^{i[mPTF'(k_x,k_y,k_z)]} \qquad (53)$$

In step S74, phase deconvolution unit 42 (see FIG. 42) deconvolves three-dimensional original image I with each of the phases $OTF_p'$ (the phase of the provisional optical transfer function) of the plurality of theoretical OTF's generated in step S73. Step S74 of the fourth embodiment is similar to step S32 of the fourth embodiment. Then, in step S75, three-dimensional phase-modulated image generation unit 43 (see FIG. 42) generates the plurality of three-dimensional phase-modulated images I'($k_x,k_y,k_z$) corresponding to the plurality of provisional phase transfer functions mPTF'(x,y,z). Step S75 of the fourth embodiment is similar to step S25 of the fourth embodiment. Each of the plurality of three-dimensional phase-modulated images I'(x, y,z) generated in step S75 is corrected by the provisional optical aberration amount, and the provisional optical aberration amount corresponds to the corresponding provisional phase transfer function in the plurality of provisional phase transfer functions mPTF'($k_x,k_y,k_z$).

In step S27, optimal phase transfer function bPTF' determination unit 52 (see FIG. 42) calculates the index of the luminance value of each of three-dimensional phase-modulated image I' (step S25) corresponding to unit temporary phase transfer function uPTF'($k_x,k_y,k_z$) and the plurality of three-dimensional phase-modulated images I' (step S75) corresponding to the plurality of temporary phase transfer functions mPTF'($k_x,k_y,k_z$). Step S27 of the fourth embodiment is similar to step S27 of the first embodiment.

In step S76, optimal phase transfer function bPTF' determination unit 52 (see FIG. 42) determines optimal phase transfer function bPTF'($k_x,k_y,k_z$) most approximate to phase transfer function PTF'($k_x,k_y,k_z$) of observation optical system 10 from unit provisional phase transfer function uPTF' ($k_x,k_y,k_z$) and the plurality of provisional phase transfer functions mPTF'($k_x,k_y,k_z$). Specifically, optimal phase transfer function bPTF' determination unit 52 determines the provisional phase transfer function corresponding to three-dimensional phase-modulated image I' having the maximum index of the luminance value calculated in step S27 in unit provisional phase transfer function uPTF'($k_x,k_y,k_z$) and the plurality of provisional phase transfer functions mPTF'($k_x$, $k_y,k_z$) as the optimal phase transfer function bPTF'($k_x,k_y,k_z$). For example, as illustrated in an equation (54), optimal phase transfer function bPTF' determination unit 52 determines the provisional phase transfer function obtained by multiplying unit provisional phase transfer function uPTF' by δ as optimal phase transfer function bPTF'($k_x,k_y,k_z$).

[Mathematical formula 54]

$$bPTF'(k_x,k_y,k_z)=\delta uPTF'(k_x,k_y,k_z) \qquad (54)$$

In step S77 of step S13, optimal optical aberration amount calculation unit 53 (see FIG. 42) calculates the optimal optical aberration amount (for example, the optimal spherical aberration amount) of observation optical system 10 corresponding to optimal phase transfer function bPTF'. In the case where the optical aberration amount (for example, the spherical aberration amount) of observation optical system 10 is set by changing refractive index $n_{liq}$ of immersion medium 15, the optimal optical aberration amount (for example, the spherical aberration amount) corresponding to optimal phase transfer function bPTF' is given by, for example, $n_{liqb}$ expressed by an equation (55). In the equation (55), $n_{liq}u$ is the refractive index of immersion medium 15 corresponding to unit provisional phase transfer function uPTF', and $n_{liq1}$ is the refractive index of immersion medium 15 in the ideal observation optical system having no optical aberration (for example, the spherical aberration).

[Mathematical formula 55]

$$n_{liqb}=\delta(n_{liqu}-n_{liq1})+n_{liq1} \qquad (55)$$

In step S78, theoretical optical wavefront generation unit 40 generates the optimal theoretical optical wavefront corresponding to optimal phase transfer function bPTF' from the optimal optical aberration amount. Step S78 of generating the optimal theoretical optical wavefront is similar to step S22 of generating the theoretical optical wavefront of the fourth embodiment.

In step S79, theoretical three-dimensional PSF' calculation unit 41 calculates the optimal theoretical three-dimensional PSF' corresponding to optimal phase transfer function bPTF'. Step S79 of calculating the optimal theoretical three-dimensional PSF' is similar to step S23 of calculating the theoretical three-dimensional PSF' of the fourth embodiment.

With mainly reference to FIGS. 10 and 44 to 46, step S14 of estimating the optimal coma aberration amount of observation optical system 10 in the fourth embodiment will be described. Step S14 in the fourth embodiment is similar to step S14 in the first embodiment, but is different in including step S24$d$ and steps S72 to S79.

In step S77 of step S14, optimal optical aberration amount calculation unit 53 (see FIG. 42) calculates the optimal optical aberration amount (for example, the optimal coma aberration amount) of observation optical system 10 corresponding to optimal phase transfer function bPTF'. Similarly to step S21 of step S14 of the first embodiment, the optical aberration amount (for example, the coma aberration amount) of observation optical system 10 changes by changing at least one of coefficients $c_u$, $c_v$. When optimal phase transfer function bPTF' determination unit 52 determines the provisional phase transfer function in which unit provisional phase transfer function uPTF' is multiplied by $\delta$ as optimal phase transfer function bPTF'($k_x,k_y,k_z$), the optimal optical aberration amount (for example, the coma aberration amount) corresponding to optimal phase transfer function bPTF' is given by, for example, coefficients $c_{ub}$, $c_{vb}$ illustrated in equations (56) and (57). In the equation (56), $c_{uu}$ is coefficient $c_u$ corresponding to unit temporary phase transfer function uPTF'. In the equation (57), $c_{vu}$ is coefficient $c_v$ corresponding to unit provisional phase transfer function uPTF'.

[Mathematical formula 56]

$$c_{ub}=\delta c_{uu} \tag{56}$$

[Mathematical formula 57]

$$c_{vb}=\delta c_{vu} \tag{57}$$

With reference to FIGS. 44 to 46, step S15 of estimating the optimal astigmatism amount of observation optical system 10 of the fourth embodiment will be described. Step S15 in the fourth embodiment is similar to step S15 in the first embodiment, but is different in including step S24$d$ and steps S72 to S79.

In step S77 of step S15, optimal optical aberration amount calculation unit 53 (see FIG. 42) calculates the optimal optical aberration amount (for example, the optimal amount of astigmatism) of observation optical system 10 corresponding to optimal phase transfer function bPTF'. Similarly to step S21 of step S15 of the first embodiment, the optical aberration amount (for example, the amount of astigmatism) of observation optical system 10 changes by changing coefficient $a_u$. When optimal phase transfer function bPTF' determination unit 52 determines the provisional phase transfer function in which unit provisional phase transfer function uPTF' is multiplied by $\delta$ as optimal phase transfer function bPTF'($k_x,k_y,k_z$), the optimal optical aberration amount (for example, the amount of astigmatism) corresponding to optimal phase transfer function bPTF' is given by, for example, coefficient $a_{ub}$ illustrated in an equation (58). In the equation (58), $a_{uu}$ is coefficient $a_u$ corresponding to unit provisional phase transfer function uPTF'.

[Mathematical formula 58]

$$a_{ub}=\delta a_{uu} \tag{58}$$

Step S16 (see FIGS. 10 and 13) of calculating the three-dimensional correction image in the fourth embodiment is similar to step S16 (see FIGS. 10 and 13) of calculating the three-dimensional correction image in the first embodiment, and the equations (22), (23), (25) are replaced with the equations (48), (49), (50), respectively. Step S17 (see FIG. 21) of calculating the optimal optical wavefront in the fourth embodiment is similar to step S17 (see FIG. 21) of calculating the optimal optical wavefront in the first embodiment, and $W_s(u,v)$ in the equation (30) is given by the right side of the equation (43).

Figure 47:
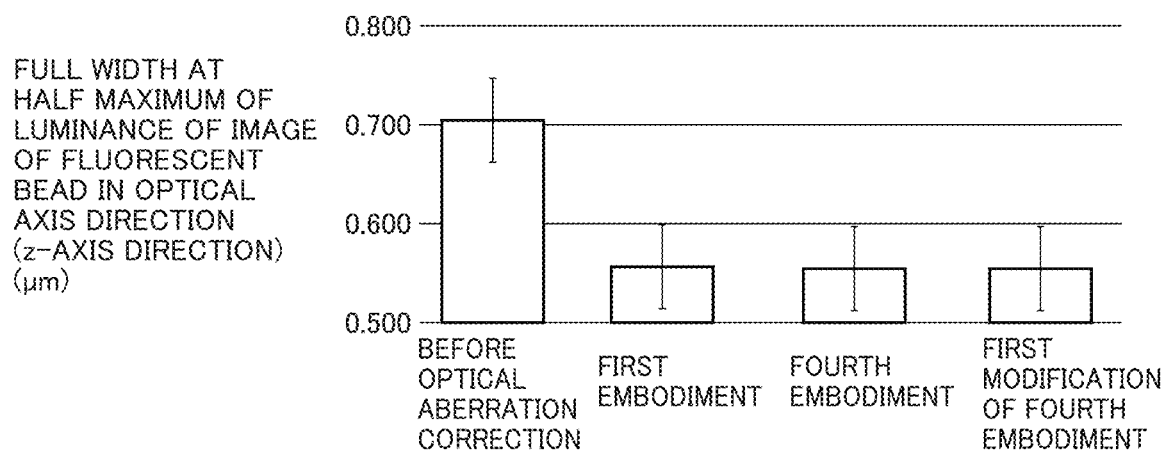
FIG. 47 is a view illustrating the full width at half maximum of the luminance of the image of the fluorescent bead in the optical axis direction (z-axis direction) before the correction of the optical aberration, after the optical aberration correction of the first embodiment, after the optical aberration correction of the fourth embodiment, and after the optical aberration correction of a first modification of the fourth embodiment.
Figure 48:
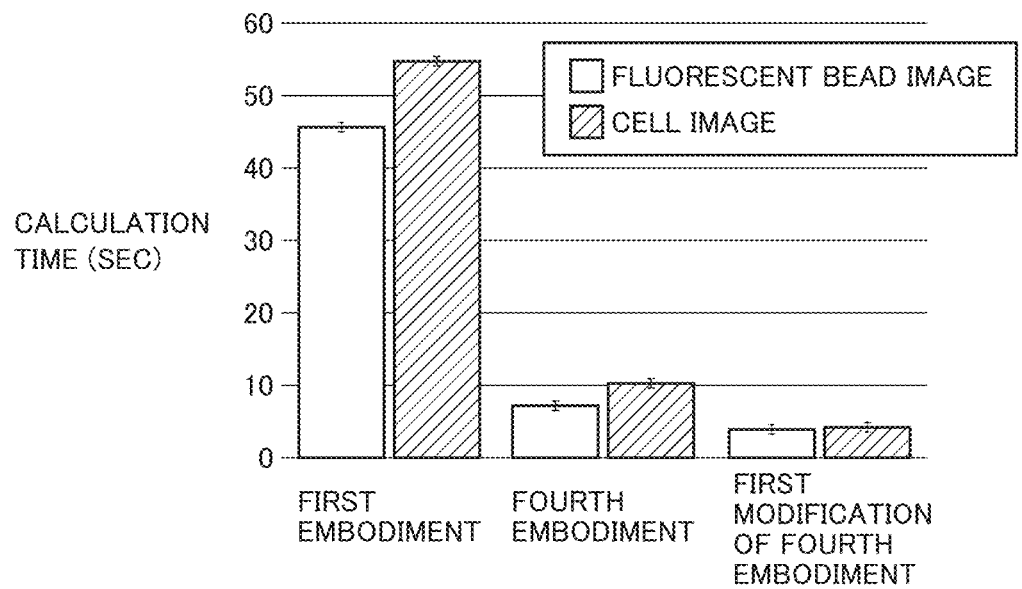
FIG. 48 is a view illustrating a calculation time required to obtain a three-dimensional image in which aberration is corrected in the first embodiment, the fourth embodiment, and a first modification of the fourth embodiment.
Figure 49:
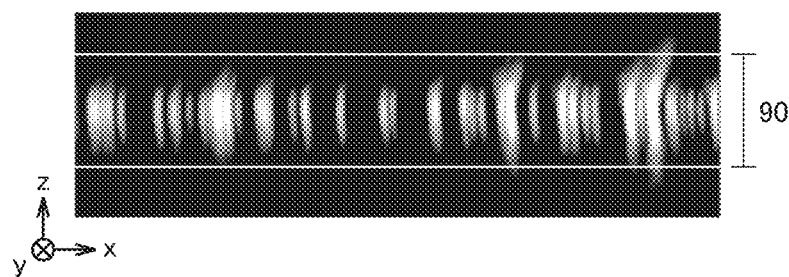
FIG. 49 is a view illustrating an example of a region in which an average value of amplitudes of high-frequency components is relatively large in a three-dimensional original image in the first modification of the fourth embodiment.
Figure 50:
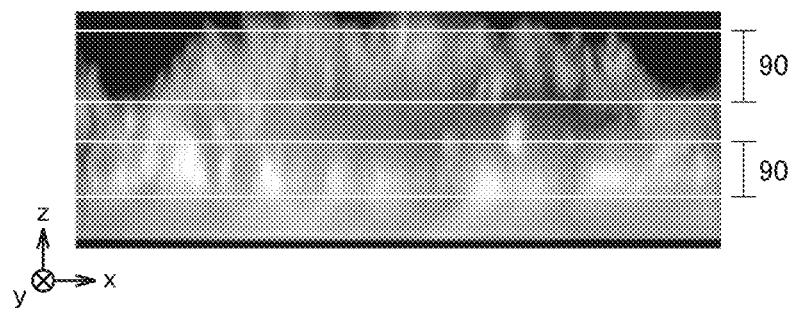
FIG. 50 is a view illustrating another example of a region in which the average value of the amplitudes of the high frequency components is relatively large in the three-dimensional original image in the first modification of the fourth embodiment.

With reference to FIGS. 47 and 48, the operation of the fourth embodiment will be described. With reference to FIG. 47, the full width at half maximum of the luminance of the aberration-corrected image of the fluorescent bead obtained by the optical aberration correction method and the optical aberration correction program of the fourth embodiment is improved to the same extent as the full width at half maximum of the luminance of the aberration-corrected image of the fluorescent bead obtained by the optical aberration correction method and the optical aberration correction program of the first embodiment. According to the optical aberration correction method and the optical aberration correction program of the fourth embodiment, the quality of the three-dimensional correction image is improved more than the quality of the three-dimensional original image, and is improved to near the diffraction limit. According to the optical wavefront estimation method and the optical wavefront estimation program of the fourth embodiment, optical wavefront 22 suffering from the optical aberration of observation optical system 10 can be estimated with higher accuracy.

With reference to FIG. 48, the calculation time required to obtain the aberration-corrected image using the optical aberration correction method and the optical aberration correction program of the fourth embodiment is significantly shorter than the calculation time required to obtain the aberration-corrected image using the optical aberration correction method and the optical aberration correction program of the first embodiment. This is because the optical aberration correction method and the optical aberration correction program of the fourth embodiment include steps S72 to S79 (see FIG. 44) and thus the number of times of performing steps S22, S23 requiring a lot of calculation time can be significantly reduced. According to the optical aberration correction method and the optical aberration correction program of the fourth embodiment, the optical aberration of observation optical system 10 included in the three-dimensional original image can be corrected in a shorter time (for example, in real time). According to the optical wavefront estimation method and the optical wavefront estimation program of the fourth embodiment, optical wavefront 22 suffering from the optical aberration of observation optical system 10 can be estimated in a shorter time (for example, in real time).

Modifications of the fourth embodiment will be described.

With reference to FIGS. 47 to 50, in the optical aberration correction method, the optical aberration correction program, the optical wavefront estimation method, and the optical wavefront estimation program of the first modification of the fourth embodiment, the optimal theoretical three-dimensional PSF' may be calculated using only region 90 in which the average value of the amplitudes of the high-frequency components within the cutoff frequencies $k_{xmax}$, $k_{ymax}$, $k_{zmax}$ of observation optical system 10 is relatively large in the three-dimensional original image. For example, the high-frequency component of the three-dimensional original image within cutoff frequencies $k_{xmax}$, $k_{ymax}$, $k_{zmax}$ is the spatial frequency component satisfying $0.75k_{xmax} \leq k_x \leq k_{xmax}$, $0.75k_{ymax} \leq k_y \leq k_{ymax}$, and $0.75k_{zmax} \leq k_z \leq k_{zmax}$.

The optical aberration of observation optical system 10 appears more clearly in region 90. The calculation sufficiently performed on not the entire three-dimensional original image, but only on a part of the three-dimensional original image, according to the optical aberration correction method and the optical aberration correction program of the first modification of the fourth embodiment, so that the calculation time required to obtain the aberration-corrected image (see FIG. 47) can be further reduced while improving the quality (for example, the full width at half maximum of the luminance of the image of the fluorescent bead) of the three-dimensional correction image (see FIG. 48). According to the optical wavefront estimation method and the optical wavefront estimation program of the first modification of the fourth embodiment, optical wavefront 22 that suffers from the optical aberration of observation optical system 10 can be estimated with higher accuracy in a shorter time.

In the optical aberration correction method of the second modification of the fourth embodiment, similarly to the fourth modification of the first embodiment, theoretical optical wavefront $W_{ze}$ may be generated using only the Zernike polynomial represented by the equation (31). In the second modification of the fourth embodiment, step S12 (see FIG. 10) of estimating the optical aberration of observation optical system 10 does not include steps S13, S14, S15, but includes step S18 (see FIG. 26) (however, the "higher-order optical aberration" in step S18 is replaced with the "optical aberration"). When optimal phase transfer function bPTF' determination unit 52 determines the provisional phase transfer function in which unit provisional phase transfer function uPTF' is multiplied by δ as optimal phase transfer function bPTF'($k_x, k_y, k_z$), the optimal optical aberration amount corresponding to optimal phase transfer function bPTF' is given by, for example, multiplying amplitude $M_j$ of expansion mode j of the Zernike polynomial by δ.

Figure 51:
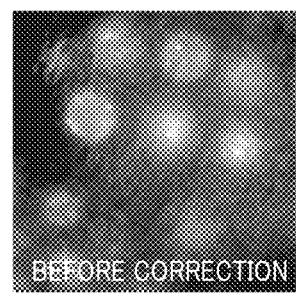
FIG. 51 is a view illustrating an image of fluorescent beads before optical aberration correction according to a second modification of the fourth embodiment.
Figure 52:
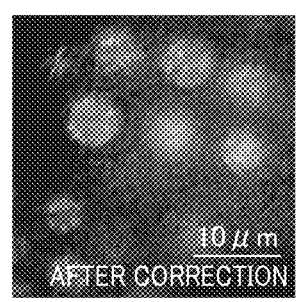
FIG. 52 is a view illustrating an image of fluorescent beads after the optical aberration correction of the second modification of the fourth embodiment.

In the second modification of the fourth embodiment, similarly to the fourth embodiment, the calculation time required to obtain the aberration-corrected image is significantly shortened. Furthermore, in the second modification of the fourth embodiment, the higher-order optical aberration included in the three-dimensional original image can be corrected in a shorter time within a predetermined time. Consequently, as illustrated in FIGS. 51 and 52, according to the optical aberration correction method and the optical aberration correction program of the second modification of the fourth embodiment, the quality of the three-dimensional correction image is further improved. According to the optical wavefront estimation method and the optical wavefront estimation program of the second modification of the fourth embodiment, optical wavefront 22 suffering from the optical aberration of observation optical system 10 can be estimated with higher accuracy.

In the third modification of the fourth embodiment, the $k_x$-axis and the $k_y$-axis of unit provisional phase transfer function uPTF'($k_x, k_y, k_z$) related to the x-axis coma aberration may be transposed to obtain unit provisional phase transfer function uPTF'($k_x, k_y, k_z$) related to the y-axis coma aberration. Steps S22, S23 requiring a lot of calculation time during the calculation of unit provisional phase transfer function uPTF'($k_x, k_y, k_z$) related to the y-axis coma aberration are omitted, so that the optical aberration of observation optical system 10 included in the three-dimensional original image can be corrected in a shorter time. Similarly, the $k_x$-axis and the $k_y$-axis of unit provisional phase transfer function uPTF'($k_x, k_y, k_z$) related to the x-axis astigmatism may be transposed to obtain unit provisional phase transfer function uPTF'($k_x, k_y, k_z$) related to the y-axis astigmatism. According to the optical aberration correction method and the optical aberration correction program of the third modification of the fourth embodiment, the optical aberration of observation optical system 10 included in the three-dimensional original image can be corrected in a shorter time (for example, in real time). According to the optical wavefront estimation method and the optical wavefront estimation program of the third modification of the fourth embodiment, optical wavefront 22 suffering from the optical aberration of observation optical system 10 can be estimated in a shorter time (For example, in real time).

The fourth embodiment has the following effects in addition to the effects of the first embodiment.

The optical aberration correction program of the fourth embodiment causes computer 3 to execute: obtaining (for example, steps S31d, S71 to S73) phases of the plurality of provisional optical transfer functions of the optical system (observation optical system 10) respectively corresponding to the plurality of provisional optical aberration amounts of the optical system (phase $OTF_p'$ of the theoretical OTF'); deconvolving three-dimensional original image 28 of sample 12 including the optical aberration of the optical system with each of the phases of the plurality of provisional optical transfer functions to generate the plurality of three-dimensional phase-modulated images I' (for example, steps S25, S32, S74, S75); obtaining (for example, steps S76 to S79,) the optimal theoretical three-dimensional point spread function (optimal theoretical three-dimensional PSF') that is most approximate to the three-dimensional point spread function of the optical system based on indices of luminance values of the plurality of three-dimensional phase-modulated images I'; calculating (for example, steps S34, S35, S37) the optimal optical transfer function (optimal OTF'') of the optical system corresponding to the optimal theoretical three-dimensional point spread function; and calculating (for example, steps S38, S39) the three-dimensional correction image by deconvolving three-dimensional original image 28 of sample 12 or another three-dimensional original image that includes optical aberration of the optical system (observation optical system 10) and is different from three-dimensional original image 28 of sample 12 with the optimal optical transfer function.

The optical aberration correction method according to the fourth embodiment includes: obtaining (for example, steps S31d and S71 to S73) phases of the plurality of provisional optical transfer functions of the optical system respectively corresponding to the plurality of provisional optical aberration amounts of the optical system (observation optical system 10) (phase $OTF_p'$ of the theoretical OTF'); deconvolving three-dimensional original image 28 of sample 12 including the optical aberration of the optical system with each of the phases of the plurality of provisional optical transfer functions to generate the plurality of three-dimensional phase-modulated images I' (for example, steps S25, S32, S74, S75); obtaining (for example, in steps S76 to S79) the optimal theoretical three-dimensional point spread function (optimal theoretical three-dimensional PSF') that is most approximate to the three-dimensional point spread function of the optical system based on the indices of the luminance values of the plurality of three-dimensional phase-modulated images I': calculating (for example, steps S34, S35, S37) the optimal optical transfer function (optimal OTF") of the optical system corresponding to the optimal theoretical three-dimensional point spread function; and calculating (for example, steps S38, S39) the three-dimensional correction image by deconvolving three-dimensional original image 28 of sample 12 or another three-dimensional original image that includes optical aberrations of the optical system (observation optical system 10) and is different from three-dimensional original image 28 of sample 12 with the optimal optical transfer function.

In the first embodiment, the luminance distribution of sample 12 and the PSF of the optical system (observation optical system 10) are not alternately and sequentially and iteratively calculated. Consequently, the three-dimensional correction image in which the optical aberration of the optical system is removed or reduced can be calculated in a shorter time. In addition, in the first embodiment, the optimal theoretical three-dimensional point spread function (optimal theoretical three-dimensional PSF') most approximate to the three-dimensional point spread function of the optical system is obtained based on the indices of the luminance values of the plurality of three-dimensional phase-modulated images I'. Accordingly, the more accurate optimal theoretical three-dimensional point spread function can be obtained. The three-dimensional correction image in which the optical aberration of the optical system is removed or reduced can be calculated with higher accuracy.

In the optical aberration correction program and the optical aberration correction method of the fourth embodiment, obtaining (for example, steps S31$d$ and S71 to S73) the phases (phases $OTF_p'$ of the theoretical OTF's) of the plurality of provisional optical transfer functions includes: generating (for example, steps S31$d$, S71) unit provisional phase transfer function uPTF' of the optical system (observation optical system 10) that is one angular component of the phases of the plurality of provisional optical transfer functions, generating (for example, step S72) the plurality of provisional phase transfer functions mPTF' of optical system from unit provisional phase transfer function uPTF'; and generating (for example, steps S31$d$, S73) the phases (phases $OTF_p'$ of the theoretical OTF's) of the plurality of provisional optical transfer functions respectively corresponding to unit provisional phase transfer function uPTF' and the plurality of provisional phase transfer functions mPTF'. Obtaining (for example, in steps S76 to S79) the optimal theoretical three-dimensional point spread function (optimal theoretical three-dimensional PSF') includes: determining (for example, step S76) the optimal phase transfer function that is most approximate to the phase transfer function of the optical system based on the indices of the luminance values of the plurality of three-dimensional phase-modulated images from the unit provisional phase transfer function and the plurality of provisional phase transfer functions; calculating (for example, step S77) the optimal optical aberration amount corresponding to the optimal phase transfer function; and calculating (for example, step S79) the optimal theoretical three-dimensional point spread function corresponding to the optimal optical aberration amount.

Consequently, the number of times of performing steps S22, S23 requiring a lot of calculation time can be greatly reduced. According to the optical aberration correction program and the optical aberration correction method of the fourth embodiment, the three-dimensional correction image in which the aberration of the optical system (observation optical system 10) is removed or reduced can be calculated in a shorter time (for example, in real time) and with higher accuracy.

In the optical aberration correction program and the optical aberration correction method of the fourth embodiment, the maximum value of the absolute value of unit provisional phase transfer function uPTF' within the cutoff frequency of the optical system (observation optical system 10) is less than or equal to $\pi$. Consequently, the distortion of the aberration-corrected image caused by phase wrapping can be prevented. The three-dimensional correction image in which the aberration of the optical system (observation optical system 10) is removed or reduced can be calculated with higher accuracy.

In the optical aberration correction program and the optical aberration correction method of the fourth embodiment, the three-dimensional original image deconvolved to generate the plurality of three-dimensional phase-modulated images is region 90 in which the average value of the amplitudes of the high-frequency components within the cutoff frequency of the optical system (observation optical system 10) is relatively large in the three-dimensional original image. The calculation may be executed on not the entire three-dimensional original image, but on only a part of the three-dimensional original image, so that the time required to correct the aberration of the three-dimensional original image can be further reduced. The three-dimensional correction image in which the aberration of the optical system (observation optical system 10) is removed or reduced can be calculated in a shorter time (for example, in real time) and with higher accuracy.

The optical wavefront estimation program of the fourth embodiment causes computer 3 to perform: obtaining (for example, steps S31$d$, S71 to S73) the phases of the plurality of provisional optical transfer functions of the optical system (observation optical system 10) corresponding to the plurality of provisional optical aberration amounts of the optical system (phase $OTF_p'$ of the theoretical OTF'); deconvolving (for example, steps S25, S32, S74, S75) three-dimensional original image 28 of sample 12 including optical aberration of the optical system with each of the phases of the plurality of provisional optical transfer functions to generate the plurality of three-dimensional phase-modulated images I'; obtaining (for example, in steps S76 to S79) the optimal theoretical three-dimensional point spread function (optimal theoretical three-dimensional PSF') that is most approximate to the three-dimensional point spread function of the optical system based on the indices of the luminance values of the plurality of three-dimensional phase-modulated images I'; calculating (for example, steps S34, S35, S37) the optimal optical transfer function (optimal OTF") of the optical system corresponding to the optimal theoretical three-dimensional point spread function; and calculating (for example, steps S17, S78) the optimal optical wavefront corresponding to the optimal theoretical three-dimensional point spread function.

An optical wavefront estimation method according to the fourth embodiment includes: obtaining (for example, steps S31d, S71 to S73) the phases of the plurality of provisional optical transfer functions of the optical system (observation optical system 10) corresponding to the plurality of provisional optical aberration amounts of the optical system (phase $OTF_p'$ of the theoretical OTF'); deconvolving (for example, steps S25, S32, S74, S75) three-dimensional original image 28 of sample 12 including optical aberration of the optical system with each of the phases of the plurality of provisional optical transfer functions to generate the plurality of three-dimensional phase-modulated images I'; obtaining (for example, steps S76 to S79,) the optimal theoretical three-dimensional point spread function (optimal theoretical three-dimensional PSF') that is most approximate to the three-dimensional point spread function of the optical system based on the indices of the luminance values of the plurality of three-dimensional phase-modulated images I'; calculating (for example, steps S34, S35, S37) the optimal optical transfer function (optimal OTF") of the optical system corresponding to the optimal theoretical three-dimensional point spread function; and calculating (for example, steps S17, S78) the optimal optical wavefront corresponding to the optimal theoretical three-dimensional point spread function.

In the first embodiment, the luminance distribution of sample 12 and the PSF of the optical system (observation optical system 10) are not alternately and sequentially and iteratively calculated. Consequently, optical wavefront 22 suffering from the optical aberration of the optical system can be calculated in a shorter time. In addition, in the first embodiment, the optimal theoretical three-dimensional point spread function (optimal theoretical three-dimensional PSF') most approximate to the three-dimensional point spread function of the optical system is obtained based on the indices of the luminance values of the plurality of three-dimensional phase-modulated images I'. Therefore, the optimal theoretical three-dimensional point spread function can be more accurately obtained from the plurality of theoretical three-dimensional point spread functions. Optical wavefront 22 suffering from the optical aberration of the optical system can be estimated with higher accuracy.

In the optical wavefront estimation program and the optical wavefront estimation method of the fourth embodiment, obtaining (for example, steps S31d, S71 to S73) the phases of the plurality of provisional optical transfer functions (phases $OTF_p'$ of the theoretical OTF's) includes: generating (for example, steps S31d, S71) unit provisional phase transfer function uPTF' of the optical system (observation optical system 10) that is one angular component of the phases of the plurality of provisional optical transfer functions; generating (for example, step S72) the plurality of provisional phase transfer functions mPTF' of optical system from unit provisional phase transfer function uPTF'; and generating (for example, steps S31d and S73) the phases of the plurality of provisional optical transfer functions (phase $OTF_p'$ of the theoretical OTF') corresponding to unit provisional phase transfer function uPTF' and the plurality of provisional phase transfer functions mPTF'. Obtaining (for example, in steps S76 to S79) the optimal theoretical three-dimensional point distribution function (optimal theoretical three-dimensional PSF') includes: determining (for example, step S76) the optimal phase transfer function that is most approximate to the phase transfer function of the optical system based on the indices of the luminance values of the plurality of three-dimensional phase-modulated images from the unit provisional phase transfer function and the plurality of provisional phase transfer functions; calculating (for example, step S77) the optimal optical aberration amount corresponding to the optimal phase transfer function; and calculating (for example, step S78) the optimal theoretical optical wavefront corresponding to the optimal optical aberration amount.

Consequently, the number of times of performing steps S22, S23 requiring a lot of calculation time can be greatly reduced. According to the optical wavefront estimation program and the optical wavefront estimation method of the fourth embodiment, optical wavefront 22 suffering from the optical aberration of the optical system (observation optical system 10) can be estimated in a shorter time (for example, in real time) and with higher accuracy.

In the optical wavefront estimation program and the optical wavefront estimation method of the fourth embodiment, the maximum value of the absolute value of unit provisional phase transfer function uPTF' within the cutoff frequency of the optical system (observation optical system 10) is less than or equal to π. Consequently, the distortion of optical wavefront 22 due to phase wrapping can be prevented. Optical wavefront 22 suffering from the optical aberration of the optical system (observation optical system 10) can be estimated with higher accuracy.

In the optical wavefront estimation program and the optical wavefront estimation method of the fourth embodiment, the three-dimensional original image deconvolved to generate the plurality of three-dimensional phase-modulated images is region 90 in which the average value of the amplitudes of the high-frequency components within the cutoff frequency of the optical system (observation optical system 10) is relatively large in the three-dimensional original image. The calculation is performed not on the entire three-dimensional original image, but on only a part of the three-dimensional original image, so that the time for calculating optical wavefront 22 suffering from the aberration of observation optical system 10 can be further reduced. Optical wavefront 22 suffering from the optical aberration of the optical system can be estimated in a shorter time (for example, in real time).

It should be considered that the disclosed first to fourth embodiments and the modifications thereof are examples in all respects and not restrictive. As long as there is no contradiction, at least two of the disclosed first to fourth embodiments and the modifications thereof may be combined. For example, the model generating theoretical optical wavefront $W_s$ of the fourth embodiment may be adopted in the first embodiment. In the first embodiment, step S24d and steps S72 to S79 of the fourth embodiment may be adopted. The fourth embodiment may be applied to structured illumination microscope (SIM) 2b of the third embodiment. The scope of the present disclosure is defined by not the above description but the claims, and it is intended that all modifications within the meaning and scope of the claims are included in the present invention.

REFERENCE SIGNS LIST 1, 1a, 1b: microscope system, 2: microscope, 2b: structured Illumination microscope, 3, 3a, 3b, 3c: computer, 4: display device, 6, 6b: light source, 7, 7b: illumination light, 8, 8b: illumination optical system, 9a: lens, 9b: lens, 10: observation optical system, 11: sample support stage, 12: sample, 12a: three-dimensional object, 12b: surrounding medium, 13: bright spot, 14: cover glass, 15: immersion medium, 16: objective lens, 17: imaging lens, 18: imaging device, 19: dichroic mirror, 20: focal plane, 21: light, 22: optical wavefront, 23: pupil surface, 25: reflected light, 27, 27b: two-dimensional original image, 28, 28b: three-dimensional original image, 30, 30a, 30b, 30c: processor, 31: microscope controller, 32: three-dimensional original image generation unit, 32b: image reconstruction unit, 33: optical aberration correction unit, 34: optical wavefront estimation unit, 35: spherical aberration estimation unit, 36: coma aberration estimation unit, 37: astigmatism estimation unit, 38: aberration-corrected image generation unit, 39: optical wavefront generation unit, 40: theoretical optical wavefront generation unit, 41: theoretical three-dimensional PSF' calculation unit, 42: phase deconvolution unit, 43: three-dimensional phase-modulated image generation unit, 44: optimal theoretical three-dimensional PSF' determination unit, 45: optimal theoretical optical wavefront determination unit, 46: amplitude change calculation unit, 47: optimal three-dimensional PSF" calculation unit, 48, 48b: deconvolution unit, 49: three-dimensional inverse Fourier transform unit, 50: normalized optimal three-dimensional PSF''' calculation unit, 51: plural provisional phase transfer function generation unit, 52: optimal phase transfer function determination unit, 53: optimal aberration amount calculation unit, 55, 55a, 55b, 55c, 55d: storage device, 64: optical fiber, 65: collimator lens, 66: optical branching element, 67: drive device, 70: relay lens, 71, 72, 73: lens, 77: interference fringe, 81, 82, 83, 84a, 84b, 84c, 84d, 84e: two-dimensional original SIM image, 81g, 81h, 81i, 81j, 81k: three-dimensional original SIM image, 86: three-dimensional original SIM image generation unit, 87: image extraction unit, 88: image composition unit, 90: region

The invention claimed is:

1. A non-transitory storage medium storing thereon an optical aberration correction program, the optical aberration correction program causes, when executed by a computer with a processor, the computer to perform:
obtaining, by the processor, phases of a plurality of provisional optical transfer functions of an optical system corresponding to a plurality of provisional optical aberration amounts of the optical system, the optical system including a lens;
generating, by the processor, a plurality of three-dimensional phase-modulated images by deconvolving a three-dimensional original image of a sample with each of the phases of the plurality of provisional optical transfer functions, the three-dimensional original image of the sample obtained by an optical apparatus including the optical system and an imaging device and including an optical aberration of the optical system;
obtaining, by the processor, an optimal theoretical three-dimensional point spread function of the optical system corresponding to a three-dimensional phase-modulated image whose index of luminance value is maximum among the plurality of three-dimensional phase-modulated images;
determining, by the processor, an optical transfer function of the optical system corresponding to the optimal theoretical three-dimensional point spread function;
generating, by the processor, a three-dimensional correction image by deconvolving the three-dimensional original image or another three-dimensional original image that includes the optical aberration of the optical system and is different from the three-dimensional original image with the optical transfer function; and
sending the three-dimensional correction image for display or for storing the three-dimensional correction image.

2. The non-transitory storage medium according to claim 1, wherein
the obtaining the optimal theoretical three-dimensional point spread function includes selecting the optimal theoretical three-dimensional point spread function corresponding to the three-dimensional phase-modulated image whose index of the luminance value is maximum from a plurality of theoretical three-dimensional point spread functions of the optical system, and
each of the plurality of theoretical three-dimensional point spread functions includes a corresponding one of the plurality of provisional optical aberration amounts.

3. The non-transitory storage medium according to claim 1, wherein
the obtaining the phases of the plurality of provisional optical transfer functions includes generating a unit provisional phase transfer function of the optical system that is an angular component of one of the phases of the plurality of provisional optical transfer functions, generating a plurality of provisional phase transfer functions of the optical system from the unit provisional phase transfer function, and generating the phases of the plurality of provisional optical transfer functions corresponding to the unit provisional phase transfer function and the plurality of provisional phase transfer functions, and
the obtaining the optimal theoretical three-dimensional point spread function includes: selecting an optimal phase transfer function corresponding to the three-dimensional phase-modulated image whose index of the luminance value is maximum from the unit provisional phase transfer function and the plurality of provisional phase transfer functions; determining an optical aberration amount corresponding to the optimal phase transfer function; and determining the optimal theoretical three-dimensional point spread function corresponding to the optical aberration amount.

4. The non-transitory storage medium according to claim 1, wherein the optical transfer function is normalized by an amplitude of an optical transfer function of the optical system when the optical aberration of the optical system does not exist.

5. The non-transitory storage medium according to claim 1, wherein the optimal theoretical three-dimensional point spread function includes at least two of spherical aberration, coma aberration, and astigmatism of the optical system.

6. The non-transitory storage medium according to claim 1, wherein the optical system is an observation optical system of a structured illumination microscope.

7. The non-transitory storage medium according to claim 6, wherein the deconvolving the three-dimensional original image or the another three-dimensional original image that includes the optical aberration of the optical system and is different from the three-dimensional original image with the optical transfer function is deconvolving the another three-dimensional original image modulated by an interference fringe of the structured illumination microscope that includes the optical aberration of the observation optical system of the structured illumination microscope and has azimuths and orders of spatial frequencies with the optical transfer function.

8. A non-transitory storage medium storing thereon an optical wavefront estimation program, the optical wavefront estimation program causes, when executed by a computer with a processor, the computer to perform:
obtaining, by the processor, phases of a plurality of provisional optical transfer functions of an optical system corresponding to a plurality of provisional optical aberration amounts of the optical system, the optical system including a lens;

generating, by the processor, a plurality of three-dimensional phase-modulated images by deconvolving a three-dimensional original image of a sample with each of the phases of the plurality of provisional optical transfer functions, the three-dimensional original image of the sample obtained by an optical apparatus including the optical system and an imaging device and including an optical aberration of the optical system;

obtaining, by the processor, an optimal theoretical three-dimensional point spread function of the optical system corresponding to a three-dimensional phase-modulated image whose index of luminance value is maximum among the plurality of three-dimensional phase-modulated images;

generating, by the processor, an optical wavefront corresponding to the optimal theoretical three-dimensional point spread function; and sending the optical wavefront for storing the optical wavefront.

9. The non-transitory storage medium according to claim 8, wherein the obtaining the optimal theoretical three-dimensional point spread function includes selecting the optimal theoretical three-dimensional point spread function corresponding to the three-dimensional phase-modulated image whose index of the luminance value is maximum from a plurality of theoretical three-dimensional point spread functions of the optical system, and each of the plurality of theoretical three-dimensional point spread functions includes a corresponding one of the plurality of provisional optical aberration amounts.

10. The non-transitory storage medium according to claim 8, wherein the obtaining the phases of the plurality of provisional optical transfer functions includes generating a unit provisional phase transfer function of the optical system that is an angular component of one of the phases of the plurality of provisional optical transfer functions, generating a plurality of provisional phase transfer functions of the optical system from the unit provisional phase transfer function, and generating the phases of the plurality of provisional optical transfer functions corresponding to the unit provisional phase transfer function and the plurality of provisional phase transfer functions, and the obtaining the optimal theoretical three-dimensional point spread function includes: selecting an optimal phase transfer function corresponding to the three-dimensional phase-modulated image whose index of the luminance value is maximum from the unit provisional phase transfer function and the plurality of provisional phase transfer functions; determining an optical aberration amount corresponding to the optimal phase transfer function; and generating the optimal theoretical optical wavefront corresponding to the optimal optical aberration amount.

* * * * *